United States Patent
Tai

(10) Patent No.: US 12,477,222 B2
(45) Date of Patent: Nov. 18, 2025

(54) IMAGE-CAPTURING APPARATUS AND CONTROL METHOD OF IMAGE-CAPTURING APPARATUS

(71) Applicant: CANON KABUSHIKI KAISHA, Tokyo (JP)

(72) Inventor: Katsunori Tai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 18/616,018

(22) Filed: Mar. 25, 2024

(65) Prior Publication Data
US 2024/0334056 A1    Oct. 3, 2024

(30) Foreign Application Priority Data
Mar. 29, 2023  (JP) .................. 2023-053952

(51) Int. Cl.
*H04N 23/68* (2023.01)
*H04N 23/61* (2023.01)
*H04N 23/69* (2023.01)

(52) U.S. Cl.
CPC ......... *H04N 23/6811* (2023.01); *H04N 23/61* (2023.01); *H04N 23/69* (2023.01)

(58) Field of Classification Search
CPC ........ H04N 23/61; H04N 23/64; H04N 23/69; H04N 23/695
See application file for complete search history.

(56) References Cited

U.S. PATENT DOCUMENTS 10,567,641 B1 * 2/2020 Rueckner .............. H04N 23/62
2012/0320224 A1 * 12/2012 Miyoshi ................ H04N 23/81
348/207.1

FOREIGN PATENT DOCUMENTS

JP   2009043169 A    2/2009
JP   2014127744 A *  7/2014 ............ H04N 23/64

* cited by examiner

*Primary Examiner* — Daniel M Pasiewicz
(74) *Attorney, Agent, or Firm* — Cowan, Liebowitz & Latman, P.C.

(57) ABSTRACT

An image-capturing apparatus includes an image-capturing unit, an observation direction detecting unit configured to detect an observation direction of a user with respect to the image-capturing apparatus, a setting unit configured to set a clipping range that is a partial region corresponding to the observation direction of a first moving image image-captured by the image-capturing unit, based on the observation direction that is detected by the observation direction detecting unit, a generating unit configured to generate a second moving image, in which the clipping range set by the setting unit is clipped from the first moving image, and a marker detecting unit configured to detect a marker, set in advance, from the first moving image. The setting unit sets the clipping range such that a certain region, including the marker detected from the first moving image by the marker detecting unit, is not included therein.

11 Claims, 49 Drawing Sheets

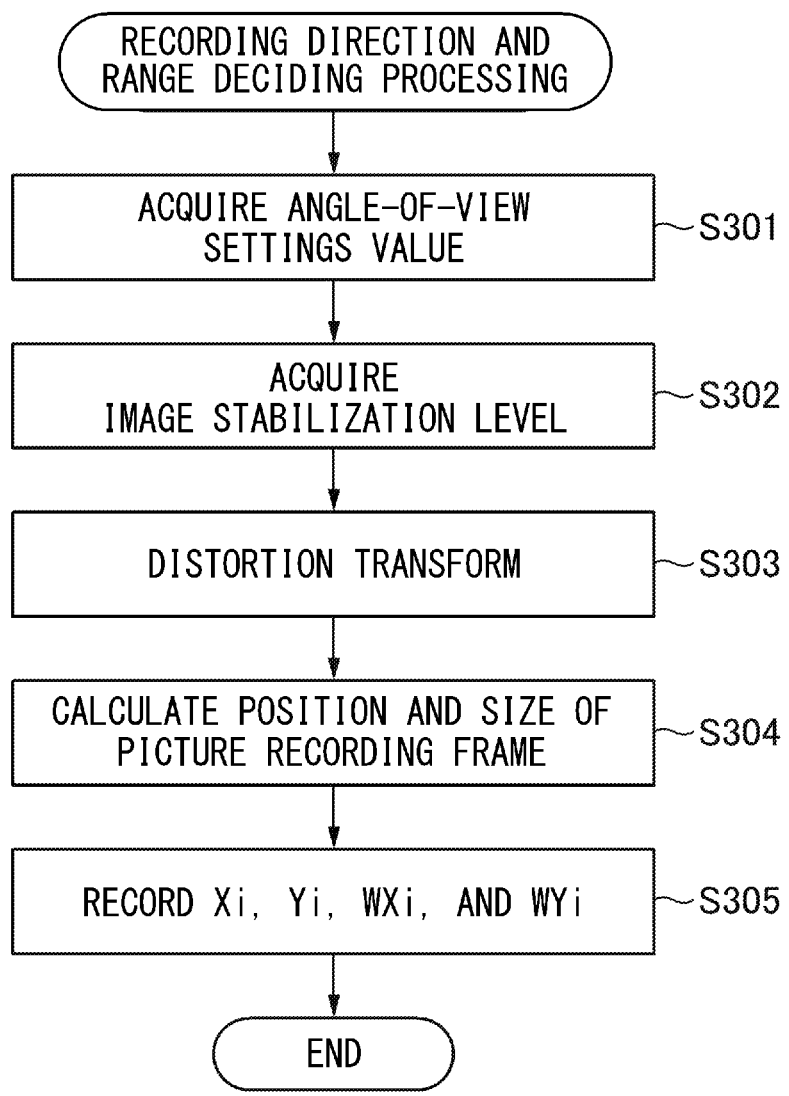

CHART 1          CHART 2

CHART 1    CHART 2

FIG. 8K
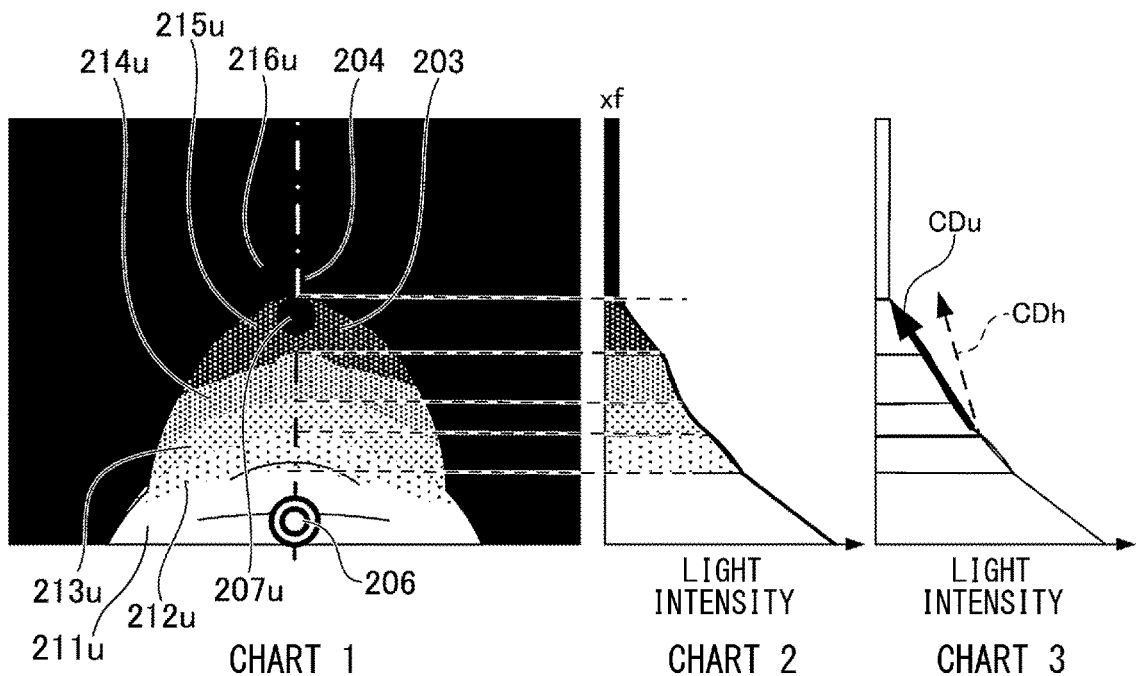
CHART 1     CHART 2     CHART 3
FIG. 9A  V SIGNAL
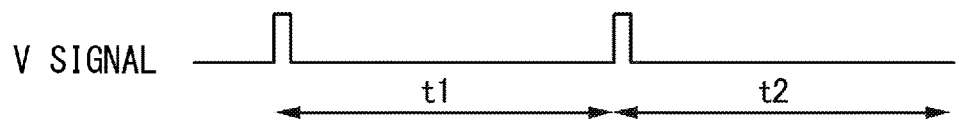
FIG. 9B  H POSITION OF IMAGE SIGNAL
FIG. 9C  IR-ON
FIG. 9D  IMAGE-CAPTURING DATA
FIG. 9E

DEVELOPING REGION

IMAGE ON IMAGE-CAPTURING DEVICE

SUBJECT

AFTER IMAGE STABILIZATION PROCESSING

AFTER DISTORTION CORRECTION PROCESSING

CLIPPING AND DEVELOPING

FIG. 23

| FRAME | CLIPPING RANGE | CHANGE-ONGOING FLAG |
|---|---|---|
| 1 | X1, Y1, WX1, WY1 | OFF |
| 2 | X2, Y2, WX2, WY2 | OFF |
| 3 | X3, Y3, WX3, WY3 | OFF |
| : | : | : |
| i | Xi, Yi, WXi, WYi | OFF |
| i+1 | X(i+1), Y(i+1), WX(i+1), WY(i+1) | ON |
| i+2 | X(i+2), Y(i+2), WX(i+2), WY(i+2) | ON |
| : | : | : |
| j | Xj, Yj, WXj, WYj | ON |
| j+1 | X(j+1), Y(j+1), WX(j+1), WY(j+1) | ON |
| j+2 | X(j+2), Y(j+2), WX(j+2), WY(j+2) | OFF |

IMAGE-CAPTURING APPARATUS AND CONTROL METHOD OF IMAGE-CAPTURING APPARATUS

BACKGROUND OF THE INVENTION

Field of the Invention

The present invention relates to an image-capturing apparatus and a control method of the image-capturing apparatus.

Description of the Related Art

Conventionally, image-capturing by a camera requires a camera operator to continuously direct the camera in an image-capturing direction. Accordingly, the camera operator may not be able to handle tasks other than the act of image-capturing, due to being preoccupied by image-capturing operations, and may not be able to concentrate on the experience of being in that place, due to being made to concentrate on image-capturing.

For example, with respect to image-capturing operations, there is a problem in that a parent who is a camera operator will not be able to play with his/her children while performing image-capturing of the children, and will not be able to perform image-capturing while playing with the children.

Also, with respect to concentration on image-capturing, there is a problem in that a camera operator who is a sports spectator will not be able to cheer while performing image-capturing, or remember what happened in the game, and will not be able to perform image-capturing while concentrating on watching the game. In the same way, there is a problem in that a camera operator who is performing image-capturing while on a group tour will not be able to experience sensations on the same level as other members, and image-capturing will tend to be neglected if priority is given to sensing the experience.

One method of solving such a problem is to fix an action camera on the head using a head-fixation accessory, and perform image-capturing in a direction being observed, thereby performing image-capturing without the camera operator being preoccupied by image-capturing operations. There also is a method in which image-capturing is performed over a wide range using an omnidirectional-shooting camera so as to concentrate on the experience while participating in the experience, and then clipping and editing necessary picture portions from the omnidirectional picture that has been image-captured after the experience, thereby preserving a picture of what has been experienced.

However, the method of the former requires a troublesome act of wearing a head-fixation accessory to which a main unit of an action camera 901 has been fixed, such as illustrated in FIG. 27A, on the head. Also, when the camera operator wears the action camera 901 on the head using a head-fixation accessory 902 such as illustrated in FIG. 27B, there are problems such as the appearance being unflattering, the hair of the camera operator being mussed up, and so forth. Further, the camera operator may be distracted by the presence of the head-fixation accessory 902 and the action camera 901 worn on the head due to the weight and so forth thereof, and be concerned of how others are viewing his/her appearance. Accordingly, there have been problems that in a state such as illustrated in FIG. 27B, the camera operator may not be able to concentrate on the experience, and may feel resistance to the state illustrated in FIG. 27B itself to where image-capturing itself seems torturous.

Conversely, the method of the latter requires a series of work such as image conversion, specifying clipping positions, and so forth. For example, there is known an omnidirectional-shooting camera 903 that includes a lens 904 and a shooting button 905, as illustrated in FIG. 28. The lens 904 is one of a pair of fisheye lenses for omnidirectional shooting, configured on both faces of a housing of the omnidirectional-shooting camera 903, and the omnidirectional-shooting camera 903 performs omnidirectional shooting using this pair of fisheye lenses. That is to say, omnidirectional shooting is performed by compositing projected images of this pair of fisheye lenses.

FIGS. 29A to 29C are diagrams illustrating an example of conversion work performed on a picture that is image-captured by the omnidirectional-shooting camera 903.

FIG. 29A is an example of a picture obtained by omnidirectional shooting using the omnidirectional-shooting camera 903, and includes a camera operator 906, a child 907, and a tree 908, which are subjects. This picture is picture from a hemispherical optical system obtained by compositing projected images of the pair of fisheye lenses, and accordingly the camera operator 906 is greatly deformed. The torso portion of the child 907 which is the subject that the camera operator 906 was trying to perform image-capturing of is greatly deformed to the right and left, and spread out, since the torso portion was at the peripheral portion of the hemispherical optical system. Meanwhile, image-capturing of the tree 908 is performed with little distortion, due to being a subject situated to a front side of the lens 904.

In order to create a picture having a field of view like people usually see, out of the picture in FIG. 29A, part of the picture needs to be clipped and subjected to planar transform and displayed.

FIG. 29B is a picture in which the picture positioned to the front of the lens 904 has been obtained by clipping, with respect the picture in FIG. 29A. The picture in FIG. 29B is a field of view like people usually see, with the tree 908 in the middle of the picture. However, the child 907 that is what the camera operator 906 was trying to perform image-capturing of is not included in FIG. 29B, and accordingly the clipping position needs to be changed. Here, the clipping position specifically needs to be changed leftward and downward by 30° from the tree 908 situated to the front in FIG. 29A. A picture obtained by performing this clipping work and then performing planar transform and displaying is illustrated in FIG. 29C. In this way, the work of clipping necessary portions and performing planar transform needs to be performed in order to obtain the picture in FIG. 29C that the camera operator was trying to perform image-capturing for, from the picture in FIG. 29A. Accordingly, while the camera operator can concentrate on the experience while experiencing (while performing image-capturing), there is a problem that the amount of work thereafter is massive.

As a method for solving such a problem, a technique is conceivable in which the attitude of the head of the camera operator performing image-capturing with a camera is estimated, and trimming of a portion that the camera operator was watching in the picture that is image-captured by the camera is automatically performed, thereby recording a visual experience of the camera operator. However, in a case of the camera operator unavoidably shifting his/her line of sight (direction of head) to a mobile terminal such as a smartphone or the like during experiencing (during image-capturing) for confirmation or operation, there is a possibility that objects, which the camera operator originally does not intend to record in the experience, will enter the field of view. As a result, the objects regarding which recording is not desirable may conceivably be in the angle of view in the picture following trimming, as well. Accordingly, there is a need for technology to perform control such that objects, regarding which recording as images or pictures is not desirable, are not included in a trimming frame. Japanese Patent Application Publication No. 2009-43169 discloses technology in which, when an unwanted human figure is in a scenery image that is shot, a facial region thereof is detected, and a region from that region to a nearest image corner is set as a setting-forbidden region for a trimming frame. Thus, control is performed in Japanese Patent Application Publication No. 2009-43169 such that an unwanted human figure is not included in the trimming frame.

In a case in which an unwanted human figure is in a scenery image, the technology disclosed in Japanese Patent Application Publication No. 2009-43169 enables a region that does not include a region of the human figure to be set as a trimming frame. However, setting of the trimming frame that does not include the human figure is performed on the basis of human figure region estimation by facial recognition technology, and accordingly excluding objects such as smartphones and tablet terminals from a clipping range is difficult.

Also, in setting the trimming frame, the range from the human figure range to the nearest corner of the image to that region is set as a trimming-forbidden region. Accordingly, in a case in which the human figure region is situated near the center of the image, for example, it is conceivable that the trimming-forbidden region will be over an excessively broad range.

SUMMARY OF THE INVENTION

According to the present invention, in a case in which an object that the camera operator originally does not desire to be recorded in the experience enters the angle of view while performing image-capturing of a moving image, a region that includes the object and that has a sufficient size is set as a trimming-forbidden region. Accordingly, the present invention provides technology whereby the object that is undesirable to be recorded is not included in the angle of view in the trimming results.

According to some embodiments, an image-capturing apparatus including at least one memory and at least one processor which function as an image-capturing unit; an observation direction detecting unit configured to detect an observation direction of a user with respect to the image-capturing apparatus; a setting unit configured to set a clipping range that is a partial region corresponding to the observation direction of a first moving image image-captured by the image-capturing unit, on a basis of the observation direction that is detected by the observation direction detecting unit; a generating unit configured to generate a second moving image, in which the clipping range set by the setting unit is clipped from the first moving image; and a marker detecting unit configured to detect a marker, set in advance, from the first moving image, wherein the setting unit sets the clipping range such that a certain region, including the marker detected from the first moving image by the marker detecting unit, is not included therein.

Further features of the present invention will become apparent from the following description of exemplary embodiments with reference to the attached drawings.

BRIEF DESCRIPTION OF THE DRAWINGS

FIG. 7D is a flowchart of a subroutine for recording direction and range deciding processing of step S300 in FIG. 7A according to the first embodiment;

FIG. 8K is a diagram illustrating a picture of the user in which the double circle and black dot symbols, respectively indicating the neck base portion position and the position of the chin tip portion, are overlaid on a differential picture computed by the same method as in FIG. 8E, in a case in which the face of the user is directed 33° upward from the horizontal direction;

FIGS. 9A to 9E are timing charts showing lighting timings of the infrared LEDs;

FIG. 23 is a diagram exemplifying frame management information;

DESCRIPTION OF THE EMBODIMENTS

Preferred embodiments of the present invention will be described below in detail with reference to the attached drawings.

First Embodiment

FIGS. 1A to 1D are diagrams for describing a camera system made up of a camera main unit 1 including a shooting and detecting unit 10 serving as an image-capturing apparatus according to the present embodiment, and a display device 800 that is configured separately therefrom. Note that while an example is illustrated in the present embodiment regarding a case in which the camera main unit 1 and the display device 800 are separate, but these may be configured integrally. Also, a user who is wearing the camera main unit 1 on his/her neck will be referred to as "user".

Figure 1A:
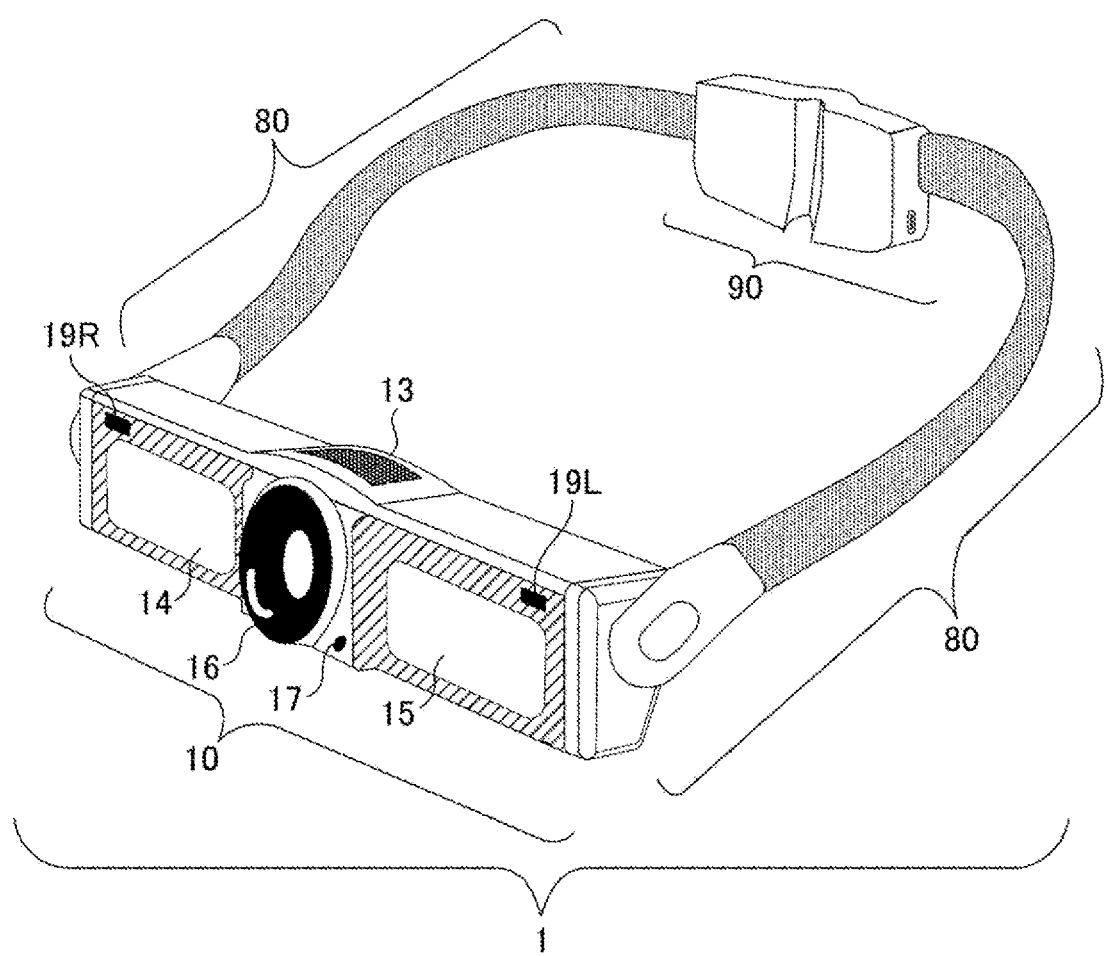
FIG. 1A is a perspective view of a camera main unit including a shooting and detecting unit serving as an image-capturing apparatus according to a first embodiment.

FIG. 1A is an external view of the camera main unit 1.

In FIG. 1A, the camera main unit 1 includes the shooting and detecting unit 10, a battery unit 90, and connecting portions 80 that connect the shooting and detecting unit 10 and the battery unit 90.

The shooting and detecting unit 10 includes a facial direction detection window 13, a start switch 14, a stop switch 15, an image-capturing lens 16, a light-emitting diode (LED) 17, and microphones 19L and 19R.

The facial direction detection window 13 transmits infrared light cast from an infrared LED lighting circuit 21, built into the shooting and detecting unit 10, for detecting positions of parts of the face of the user, and light reflected therefrom.

The start switch 14 is a switch for starting image-capturing.

The stop switch 15 is a switch for stopping image-capturing.

The image-capturing lens 16 guides light to be image-captured to a solid-state image-capturing device 42 (FIG. 5) inside the shooting and detecting unit 10.

The LED 17 is an LED that indicates that image-capturing is being performed, gives warnings, and so forth.

The microphones 19L and 19R are microphones for picking up sound from the vicinity, with the microphone 19L picking up sound from the vicinity to the left side of the user (the right side in FIG. 1A) and the microphone 19R picking up sound from the vicinity to the right side of the user (the left side in FIG. 1A).

Figure 1B:
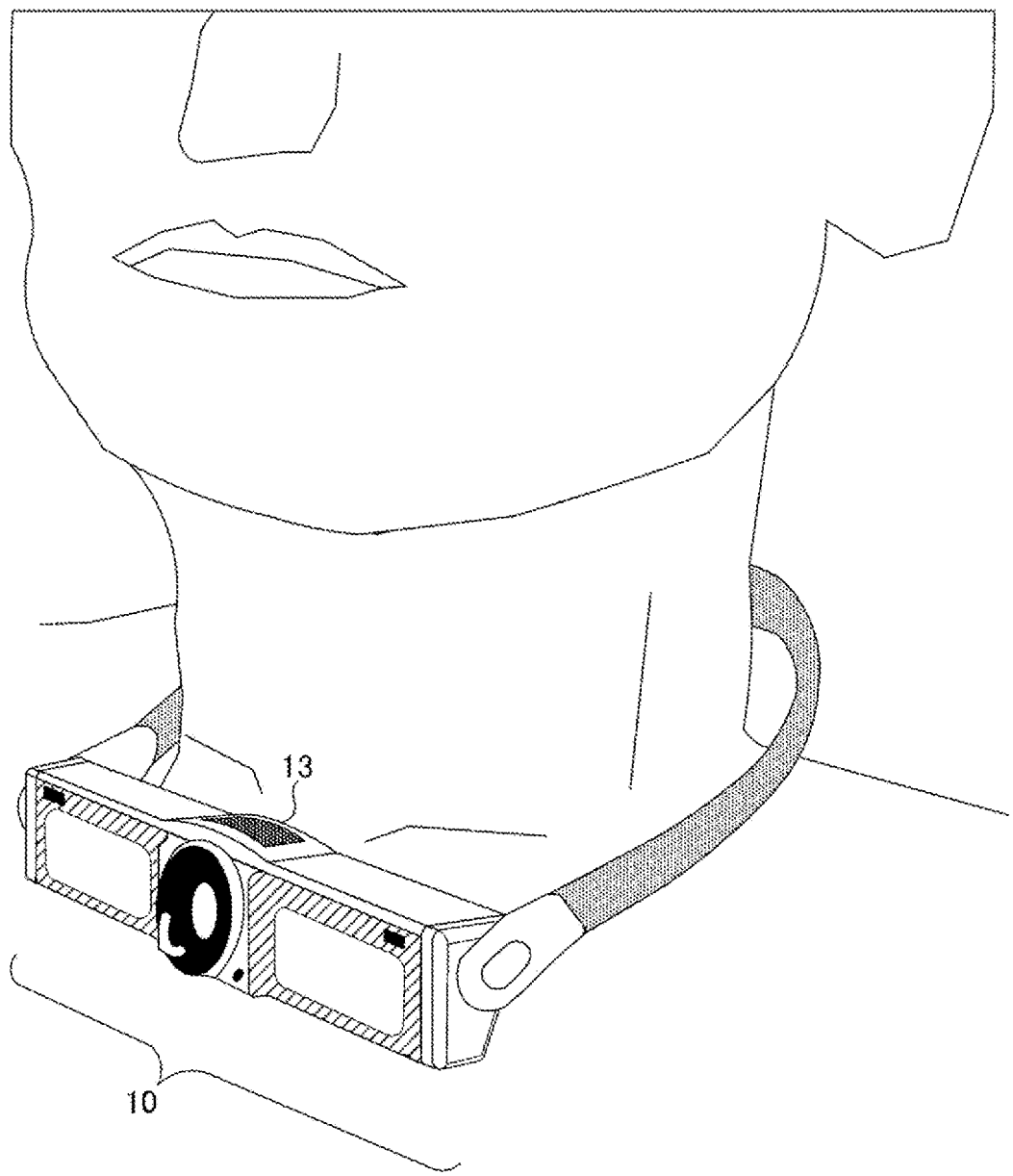
FIG. 1B is a diagram illustrating a user wearing the camera main unit.

FIG. 1B is a diagram illustrating the user wearing the camera main unit 1.

When wearing the camera main unit 1 such that the battery unit 90 is situated at the back side of the user, and the shooting and detecting unit 10 is situated at the front side of the body of the user, the camera main unit 1 is biased toward the chest of the user by the connecting portions 80 connected to both ends of the shooting and detecting unit 10 near the right and left end portions thereof, and thus supported. Accordingly, the shooting and detecting unit 10 is positioned around the front of the collarbones of the user. At this time, the facial direction detection window 13 is positioned below the chin of the user. An infrared light condensing lens 26, which will be described later with reference to FIG. 2E, is disposed within the facial direction detection window 13. An optical axis of the image-capturing lens 16 (image-capturing optical axis) and an optical axis of the infrared light condensing lens 26 (detecting optical axis) are directed in different directions, with a facial direction detecting unit 20, which will be described later, detecting an observation direction of the user, from the positions of various parts of the face. Thus, image capturing in this observation direction by a shooting unit 40, which will be described later, is enabled.

Methods for adjusting a setting position, and so forth, in accordance with individual difference in body figures, difference in clothing, and so forth, will be described later.

Also, disposing the shooting and detecting unit 10 on the front side of the body and the battery unit 90 on the back side in this way disperses weight, and has effects of reducing user fatigue and suppressing shifting under centrifugal force and so forth when the user moves.

Note that while an example is given in the present embodiment in which the shooting and detecting unit 10 is worn so as to be positioned around the front of the collarbones of the user, this is not restrictive. That is to say, the camera main unit 1 may be worn at any part of the body of the user, other than the head, as long as the camera main unit 1 can detect the observation direction of the user by the facial direction detecting unit 20, and can also perform image-capturing in this observation direction by the shooting unit 40.

Figure 1C:
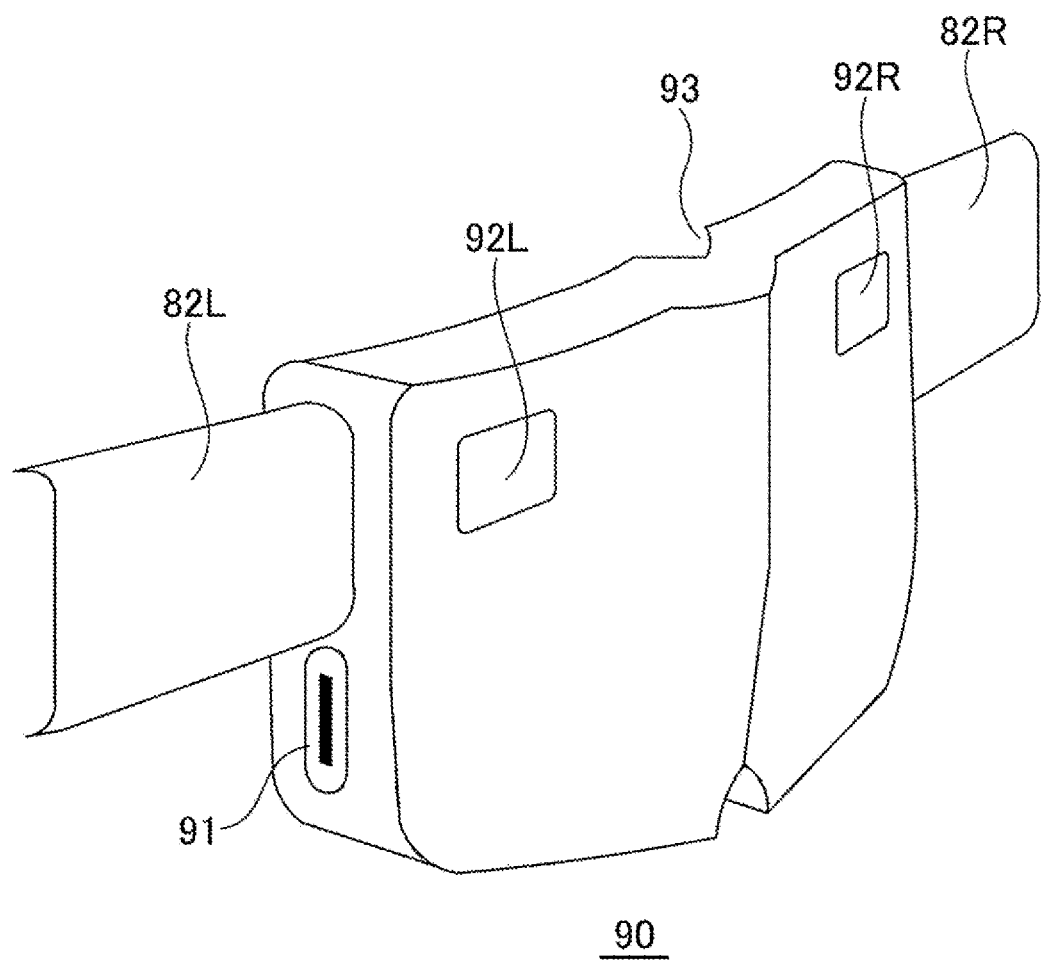
FIG. 1C is a diagram illustrating a battery unit of the camera main unit, as viewed from a rear side in FIG. 1A.

FIG. 1C is a diagram illustrating the battery unit 90, as viewed from a rear side in FIG. 1A.

In FIG. 1C, the battery unit 90 includes a charging cable insertion port 91, adjustment buttons 92L and 92R, and a backbone accommodation notch 93.

The charging cable insertion port 91 is an insertion port for a charging cable that is omitted from illustration. Batteries 94 that are inside are charged, and electric power is supplied to the shooting and detecting unit 10, from an external electric power supply via this charging cable.

The adjustment buttons 92L and 92R are adjustment buttons for adjusting the length of band portions 82L and 82R of the connecting portions 80. The adjustment button 92L is a button for adjusting the band portion 82L to the left side, and the adjustment button 92R is a button for adjusting the band portion 82R to the right side. Note that while the lengths of the band portions 82L and 82R are each independently adjusted by the respective adjustment buttons 92L and 92R in the present embodiment, an arrangement may be made in which the lengths of the band portions 82L and 82R are adjusted at the same time by a single button. Hereinafter, the band portions 82L and 82R will be collectively referred to as "band portions 82".

The backbone accommodation notch 93 is a notch corresponding to the profile of the backbone, so that the battery unit 90 does not press against the backbone portion of the user. Avoiding the protruding portion of the human backbone reduces discomfort in wearing, and at the same time prevents the main unit from moving laterally while being worn.

Figure 1D:
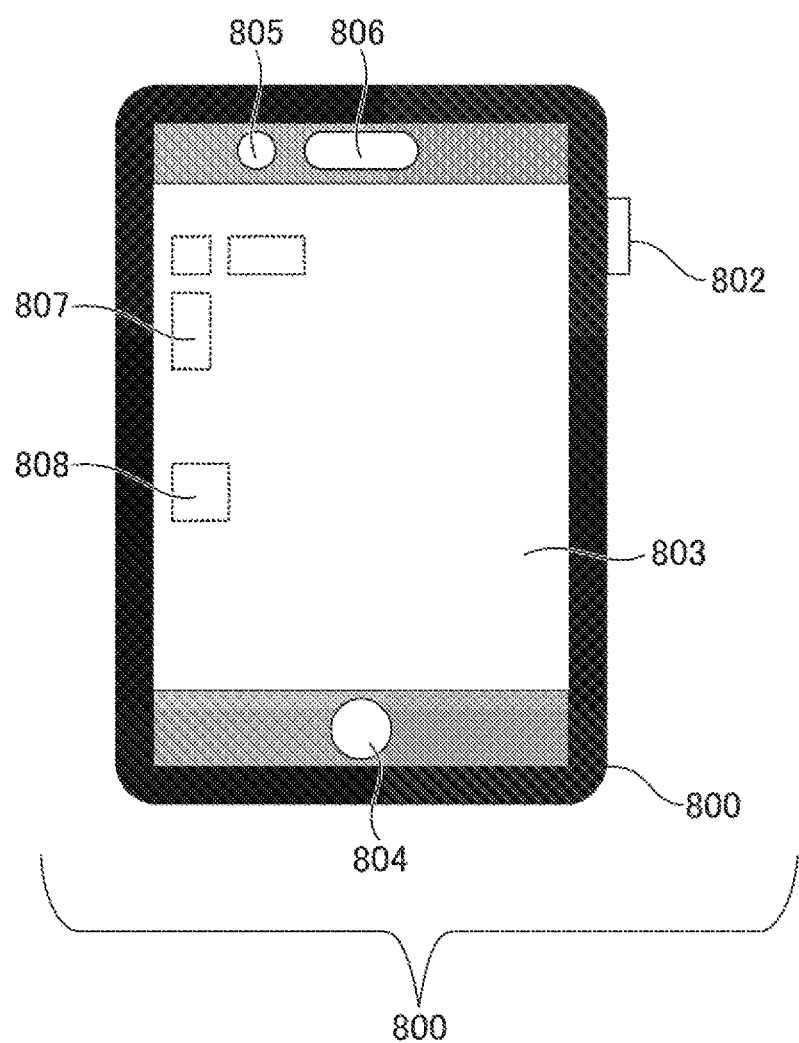
FIG. 1D is an external view of a display device serving as mobile equipment according to the first embodiment, configured separately from the camera main unit.

FIG. 1D is an external view of the display device 800 serving as mobile equipment in the first embodiment, configured separately from the camera main unit 1.

In FIG. 1D, the display device 800 includes a button A 802, a display unit 803, a button B 804, a front camera 805, a face sensor 806, an angular velocity sensor 807, and an acceleration sensor 808. Also provided is a wireless local area network (LAN) that enables high-speed connection to the camera main unit 1, although this is omitted from illustration in FIG. 1D.

The button A 802 is a button that has functions of a power button of the display device 800, accepts on/off operations by long-press operations, and accepts instructions regarding other processing timings by short-press operations.

The display unit 803 enables pictures image-captured by the camera main unit 1 to be confirmed, and menu screens necessary for settings to be displayed. In the present embodiment, a transparent touch sensor may be provided on a top face of the display unit 803, to accept touch operations on a screen being displayed (e.g., a menu screen).

The button B 804 is a button that functions as a calibration button used in calibration processing as described later.

The front camera 805 is a camera that is capable of performing image-capturing of a person who is observing the display device 800.

The face sensor 806 detects the facial forms of the person who is observing the display device 800, and the observation direction thereof. The specific structure of the face sensor 806 is not limited in particular, and can be implemented by various types of sensors, such as a structured light sensor, a time-of-flight (ToF) sensor, a millimeter-wave radar device, or the like, for example.

The angular velocity sensor 807 is indicated by dotted lines, used to represent objects that are hidden from sight within the display device 800. A three directional gyro sensor, for the three dimensions of X, Y, and Z, is installed in the display device 800 according to the present embodiment, in order to also function as a calibrator, which will be described later.

The acceleration sensor 808 detects the attitude of the display device 800.

Note that a common smartphone is used for the display device 800 according to the present embodiment, and the camera system according to the present invention can be implemented by arranging firmware in the smartphone to correspond to firmware at the camera main unit 1 side. Note however, that the camera system according to the present invention can also be implemented by arranging the firmware at the camera main unit 1 side to correspond to an application or operating system (OS) of the smartphone serving as the display device 800.

FIGS. 2A to 2F are diagrams for describing the shooting and detecting unit 10 in detail. In the Figures hereinafter, portions that have already been described will be denoted by the same numerals, thereby indicating that the functions thereof are the same, and description in the present specification will be omitted.

Figure 2A:
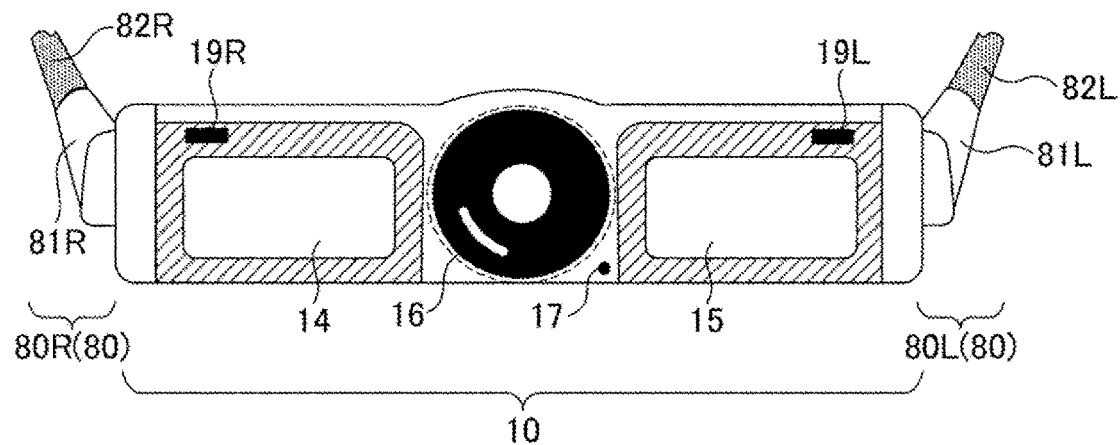
FIG. 2A is a diagram viewing the shooting and detecting unit from a front side.

FIG. 2A is a diagram viewing the shooting and detecting unit 10 from a front side.

The connecting portions 80 connect to the shooting and detecting unit 10 at a right-side connecting portion 80R situated on the right side of the body of the user (to the left side in FIG. 2A) and a left-side connecting portion 80L situated on the left side of the body of the user (to the right side in FIG. 2A). In detail, the connecting portions 80 are each made up of an angle holding portion 81 that is made of a hard material, for holding an angle as to the shooting and detecting unit 10, and a band portion 82. That is to say, the right-side connecting portion 80R includes an angle holding portion 81R and a band portion 82R, and the left-side connecting portion 80L includes an angle holding portion 81L and a band portion 82L.

Figure 2B:
FIG. 2B is a diagram illustrating forms of band portions of connecting portions of the camera main unit.

FIG. 2B is a diagram illustrating forms of the band portions 82 of the connecting portions 80. The angle holding portions 81 are illustrated in outline only in FIG. 2B, in order to show the forms of the band portions 82.

The band portions 82 include connecting faces 83 and an electric cable 84.

The connecting faces 83 are connecting faces of the angle holding portions 81 and the band portions 82, and have cross-sectional forms that are not trues circle, elliptical forms herein. Hereinafter, the connecting faces 83 disposed in lateral symmetry to each other on the right side of the body of the user (to the left side in FIG. 2B) and on the left side of the body of the user (to the right side in FIG. 2B) when wearing the camera main unit 1 will be referred to as "right-side connecting face 83R" and "left-side connecting face 83L". The right-side connecting face 83R and the left-side connecting face 83L are arranged in a downward-splayed form. That is to say, the distance between the right-side connecting face 83R and the left-side connecting face 83L becomes smaller the further in the upward direction from a lower side in FIG. 2B. Thus, when the user wears the camera main unit 1, major axes of the connecting faces 83 of the connecting portions 80 are arranged in directions following the body of the user, which is advantageous in that the band portions 82 are comfortable when coming into contact with the body of the user, and also the shooting and detecting unit 10 does not move in lateral and forward/rearward directions.

The electric cable 84 is a cable that is routed through inside of the band portion 82L, and electrically connects the battery unit 90 and the shooting and detecting unit 10. The electric cable 84 connects the electric power supply of the battery unit 90 to the shooting and detecting unit 10, and externally exchanges electric signals.

Figure 2C:
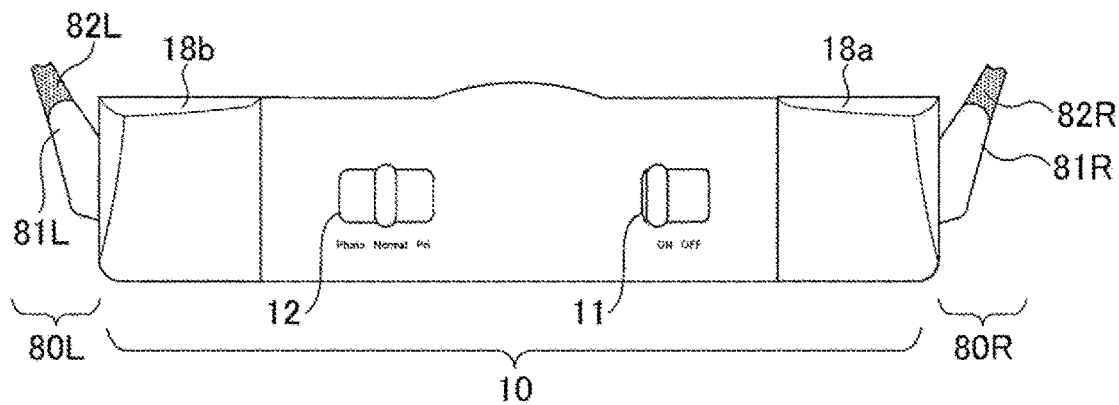
FIG. 2C is a diagram illustrating the shooting and detecting unit as viewed from the rear side.

FIG. 2C is a diagram illustrating the shooting and detecting unit 10 as viewed from a rear side. FIG. 2C is a diagram viewed from the side in contact with the body of the user, i.e., from the opposite side as to FIG. 2A, and accordingly the positional relation between the right-side connecting portion 80R and the left-side connecting portion 80L is reverse from that in FIG. 2A.

The shooting and detecting unit 10 includes a power switch 11, an image-capturing mode switch 12, and chest connecting pads 18, on the rear side thereof.

The power switch 11 is a power switch that switches the power of the camera main unit 1 on/off. The power switch 11 according to the present embodiment is a sliding lever switch, but is not limited to this. For example, the power switch 11 may be a pushbutton switch, or may be a switch that is integrally configured with a slide cover (omitted from illustration) of the image-capturing lens 16.

The image-capturing mode switch 12 (changing means) is a switch for changing the image-capturing mode, and can change modes relating to image-capturing. In the present embodiment, besides switching to still-image mode and moving image mode, the image-capturing mode switch 12 is also capable of switching to a later-described Pri setting mode, in which settings are performed using the display device 800. In the present embodiment, the image-capturing mode switch 12 is a sliding lever switch, by which one of "Photo", "Normal", and "Pri", illustrated in FIG. 2C, can be selected by sliding a lever. The image-capturing mode transitions to still-image mode by sliding to "Photo", transitions to moving image mode by sliding to "Normal", and transitions to Pri setting mode by sliding to "Pri". Note that the image-capturing mode switch 12 is not limited to the form in the present embodiment, as long as it is a switch that is capable of changing image-capturing modes. For example, the image-capturing mode switch 12 may be made up of three buttons of "Photo", "Normal", and "Pri".

The chest connecting pads 18 (fixing means) are parts that come into contact with the body of the user when the shooting and detecting unit 10 is biased against the body of the user. As illustrated in FIG. 2A, the shooting and detecting unit 10 is formed such that when worn, the full length in the lateral (right-and-left) direction is longer than the full length in the upright (up-and-down) direction, and the chest connecting pads 18 are disposed near the right and left end portions of the shooting and detecting unit 10. This arrangement enables lateral rotational blurring to be suppressed from occurring while performing image-capturing with the camera main unit 1. Also, placing the chest connecting pads 18 at the chest enables the power switch 11 and the image-capturing mode switch 12 to be kept from coming into contact with the body. The chest connecting pads 18 further serves to prevent heat of the shooting and detecting unit 10 that has become hot from extended periods of image-capturing, from being conveyed to the body of the user, and to adjust the angle of the shooting and detecting unit 10.

Figure 2D:
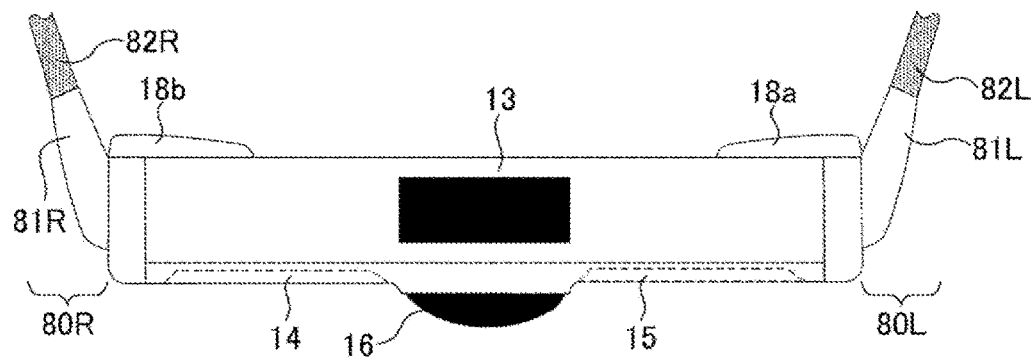
FIG. 2D is a diagram illustrating the shooting and detecting unit as viewed from above.
Figure 2E:
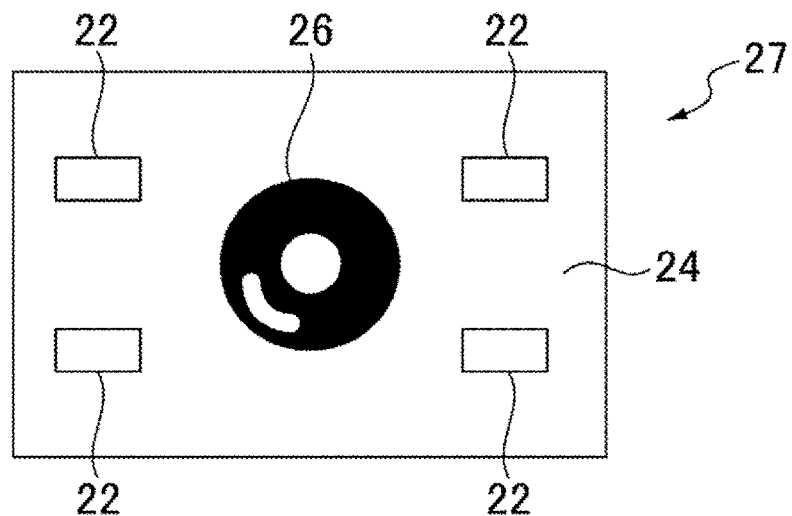
FIG. 2E is a diagram illustrating a configuration of an infrared detection processing device that is disposed in a lower portion of a facial direction detection window of the camera main unit, inside the shooting and detecting unit.

FIG. 2D is a diagram illustrating the shooting and detecting unit 10 as viewed from above.

As illustrated in FIG. 2D, the facial direction detection window 13 is provided at the middle portion of a top face of the shooting and detecting unit 10, and the chest connecting pads 18 protrude from the shooting and detecting unit 10.

FIG. 2E is a diagram illustrating a configuration of an infrared detection processing device 27 that is disposed within the shooting and detecting unit 10, below the facial direction detection window 13.

The infrared detection processing device 27 includes infrared LEDs 22 and the infrared light condensing lens 26.

The infrared LEDs 22 cast infrared light 23 (FIG. 5) toward the user.

The infrared light condensing lens 26 is a lens that images reflected light 25 (FIG. 5), which is reflected at the user and returns when casting the infrared light 23 from the infrared LEDs 22, to a sensor (omitted from illustration) of the infrared detection processing device 27.

Figure 2F:
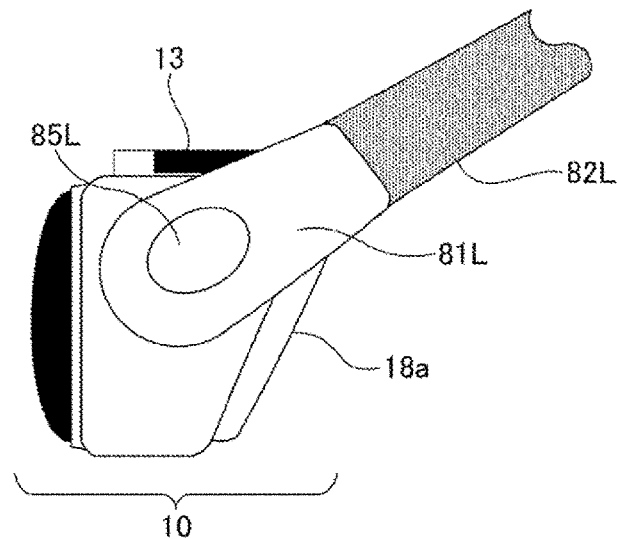
FIG. 2F is a diagram illustrating a state in which the user is wearing the camera main unit, as viewed from a left side of the user.

FIG. 2F is a diagram illustrating a state in which the user is wearing the camera main unit 1, as viewed from a left side.

An angle adjustment button 85L is a button provided to the angle holding portion 81L, and is used for adjusting the angle of the shooting and detecting unit 10. Note that although omitted from illustration in FIG. 2F, an angle adjustment button 85R is provided within the angle holding portion 81R on the opposite side face as well, at a position that is symmetrical with the angle adjustment button 85L. Hereinafter, when collectively referring to the angle adjustment buttons 85R and 85L, these will be referred to as "angle adjustment buttons 85".

The angle adjustment buttons 85 are at positions that would be visible in FIGS. 2A, 2C, and 2D as well, but have been omitted from illustration to simplify description.

The user can change the angle between the shooting and detecting unit 10 and the angle holding portions 81, by moving the angle holding portions 81 in the up and down directions in FIG. 2F while pressing the angle adjustment buttons 85. Also, the protrusion angle of the chest connecting pads 18 is adjustable. The orientation of the image-capturing lens 16 of the shooting and detecting unit 10 can be adjusted to be horizontal with respect to individual differences in the form of the chest position of users, by the action of these two angle changing members (angle adjustment buttons 85 and chest connecting pads 18).

Figure 3A:
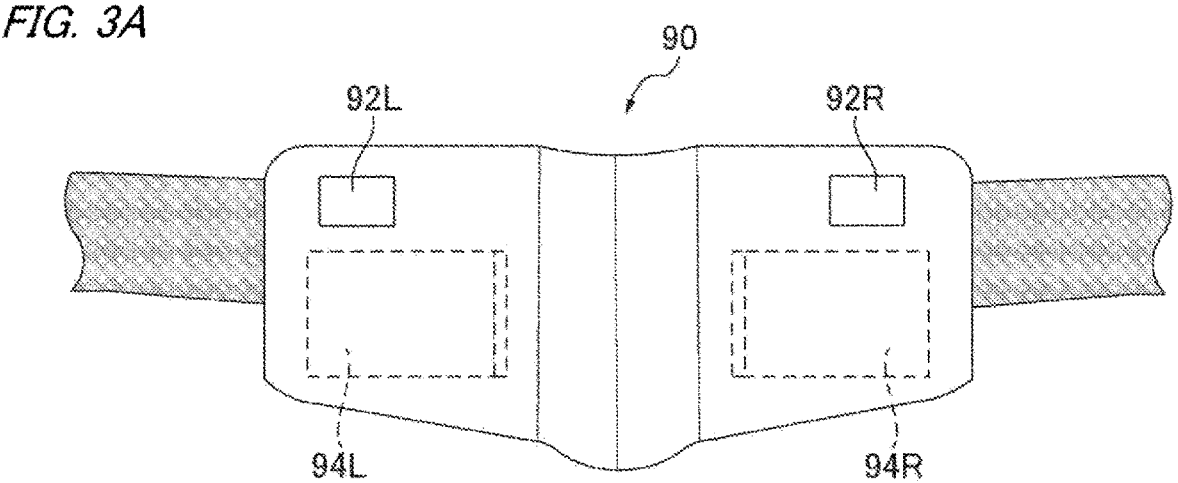
FIGS. 3A to 3C are diagrams for describing details of the battery unit.
Figure 3B:
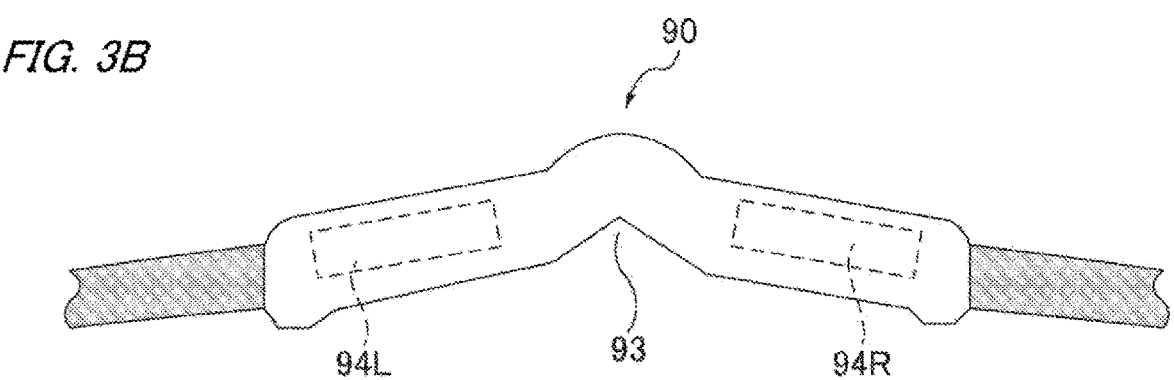
Figure 3C:
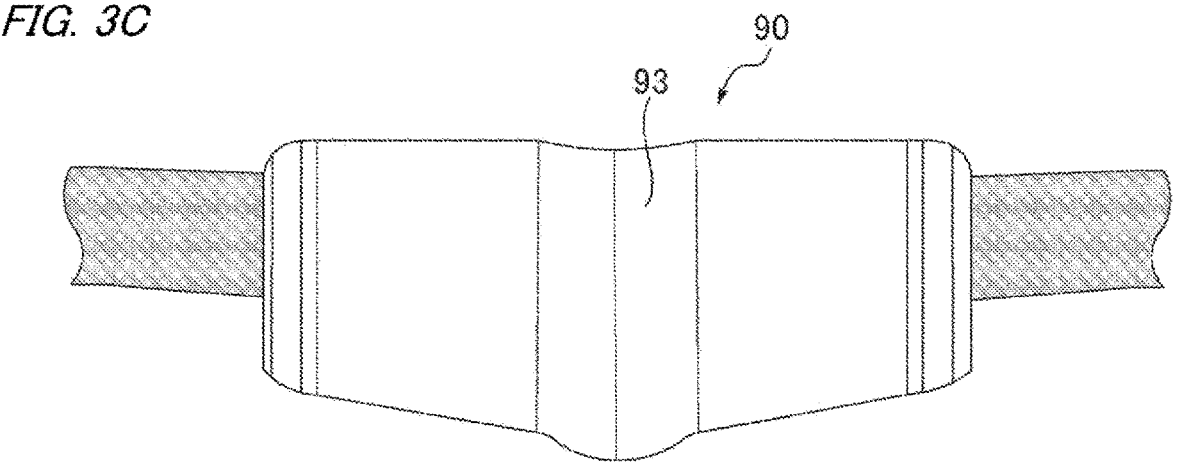

FIGS. 3A to 3C are diagrams for describing details of the battery unit 90.

FIG. 3A is a diagram of the battery unit 90 from the rear face thereof, with parts illustrated in outline.

As illustrated in FIG. 3A, in order to balance the weight of the battery unit 90, the two of a left battery 94L and a right battery 94R (hereinafter also collectively referred to as "batteries 94") are symmetrically installed within. Symmetrically disposing the batteries 94 as to the middle portion of the battery unit 90 in this way balances the weight laterally, and prevents positional deviation of the camera main unit 1. Note that a configuration may be made for the battery unit 90 in which only one battery is installed.

FIG. 3B is a diagram of the battery unit 90 as viewed from above. The batteries 94 are illustrated in outline in FIG. 3B as well.

The relation between the backbone accommodation notch 93 and the batteries 94 can be understood from FIG. 3B. Disposing the batteries 94 symmetrically on both sides of the backbone accommodation notch 93 enables the user to wear the battery unit 90, which is relatively heavy, with little load.

FIG. 3C is a diagram viewing the battery unit 90 from the rear side thereof. FIG. 3C is a diagram viewed from a side that comes into contact with the body of the user, i.e., from the opposite side as to FIG. 3A.

As illustrated in FIG. 3C, the backbone accommodation notch 93 is provided at the middle, following the backbone of the user.

Figure 4:
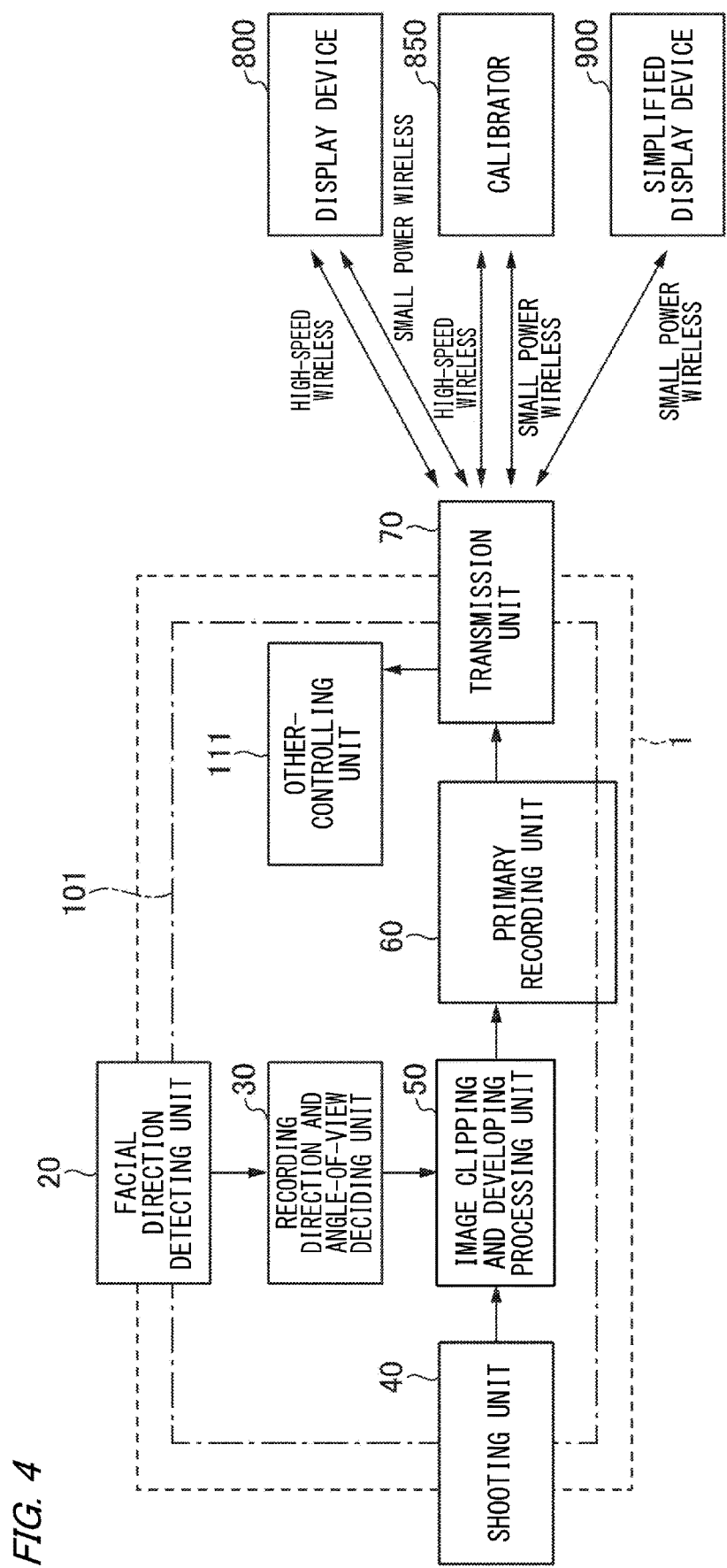
FIG. 4 is a functional block diagram of the camera main unit according to the first embodiment.

FIG. 4 is a functional block diagram of the camera main unit 1. While details will be described later, a general flow of processing that is executed at the camera main unit 1 will be described here with reference to FIG. 4.

In FIG. 4, the camera main unit 1 includes the facial direction detecting unit 20, a recording direction and angle-of-view deciding unit 30, the shooting unit 40, an image clipping and developing processing unit 50, a primary recording unit 60, a transmission unit 70, and an other-controlling unit 111. These functional blocks are executed under control of a general control central processing unit (CPU) 101 (FIG. 5) that performs general control of the camera main unit 1.

The facial direction detecting unit 20 is a functional block executed by the infrared LEDs 22, the infrared detection processing device 27, and so forth, which have been described earlier, detects a facial direction and infers the observation direction, which is then handed to the recording direction and angle-of-view deciding unit 30.

The recording direction and angle-of-view deciding unit 30 performs various types of computation on the basis of the observation direction inferred by the facial direction detecting unit 20, decides information of a position and a range for clipping a picture from the shooting unit 40, and hands this information to the image clipping and developing processing unit 50.

The shooting unit 40 converts the light from the subject into a picture, and hands this picture to the image clipping and developing processing unit 50.

The image clipping and developing processing unit 50 clips the picture from the shooting unit 40 using the information from the recording direction and angle-of-view deciding unit 30, and performs developing thereof, and thereby hands just a picture, taken in the direction that the user is looking, to the primary recording unit 60.

The primary recording unit 60 is a functional block made up of primary memory 103 (FIG. 5) and so forth. The primary recording unit 60 records picture information, and hands the picture information to the transmission unit 70 at a timing when necessary.

The transmission unit 70 wirelessly connects to the display device 800 (FIG. 1D), a calibrator 850, and a simplified display device 900, which are communication partners decided in advance, and performs communication therewith.

The display device 800 is a display device that is capable of connection to the transmission unit 70 by a wireless LAN that is capable of high-speed connection (hereinafter, referred to as "high-speed wireless"). Although wireless communication conforming to the IEEE 802.11ax (Wi-Fi 6) standard is used for the high-speed wireless in the present embodiment, but wireless communication conforming to other standards, such as the Wi-Fi 4 standard or the Wi-Fi 5 standard, for example, may be used. Also, the display device 800 may be equipment developed specifically for the camera main unit 1, or may be a common smartphone, tablet terminal, or the like.

Note that connection between the transmission unit 70 and the display device 800 may use small power wireless, or connection may be made by both high-speed wireless and small power wireless, or connecting by switching therebetween. In the present embodiment, large amounts of data, such as picture files of moving image pictures or the like, which will be described later, are transmitted by high-speed wireless, and lightweight data or data regarding which taking time is not a problem, are transmitted by small power wireless. Although Bluetooth is used here for small power wireless in the present embodiment, other small power wireless may be used, such as near-field communication, short-range communication, or the like.

The calibrator 850 is equipment for performing initial settings or individual settings of the camera main unit 1, and is equipment that is capable of connection to the transmission unit 70 by high-speed wireless, in the same way as the display device 800. The calibrator 850 will be described in detail later. Also, the display device 800 may also have the functions of this calibrator 850.

The simplified display device 900 is a display device that can only connect to the transmission unit 70 by small power wireless, for example.

The simplified display device 900 is a display device that cannot transmit moving image pictures with the transmission unit 70 due to time-related constraints, but can transmit timing for starting/stopping image-capturing, image confirmation such as confirming composure, and so forth. Also, the simplified display device 900 may be equipment developed specifically for the camera main unit 1, or may be a smartwatch or the like, in the same way as the display device 800.

Figure 5:
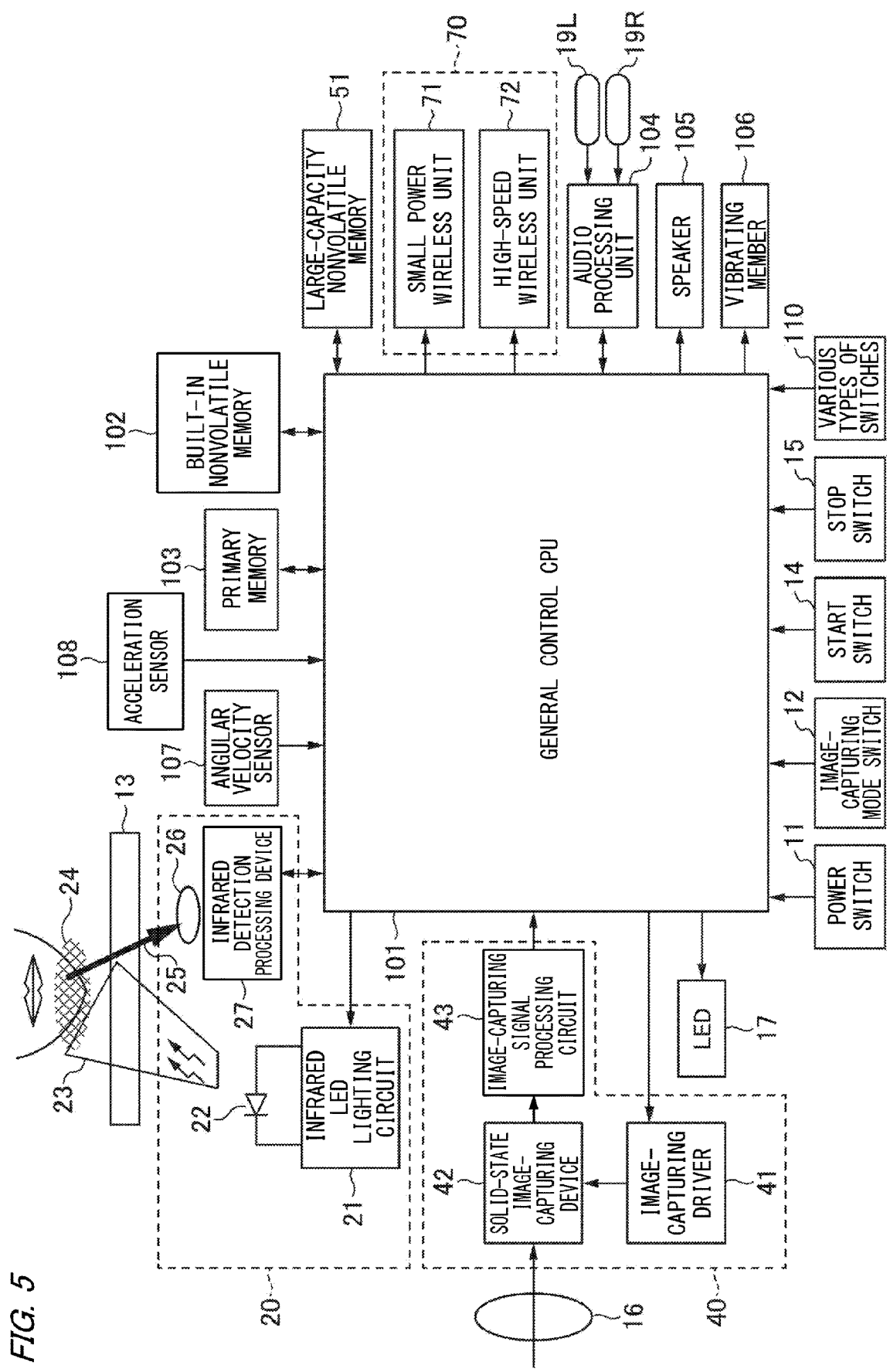
FIG. 5 is a block diagram illustrating a hardware configuration of the camera main unit.

FIG. 5 is a block diagram illustrating a hardware configuration of the camera main unit 1. Configurations and functions described with reference to FIGS. 1A to 1C and so forth are denoted by the same numerals, and detailed description thereof will be omitted.

In FIG. 5, the camera main unit 1 includes the general control CPU 101, the power switch 11, the image-capturing mode switch 12, the facial direction detection window 13, the start switch 14, the stop switch 15, the image-capturing lens 16, and the LED 17.

The camera main unit 1 also includes the infrared LED lighting circuit 21, the infrared LEDs 22, the infrared light condensing lens 26, and the infrared detection processing device 27 that make up the facial direction detecting unit 20 (FIG. 4).

The camera main unit 1 also includes the shooting unit 40 (FIG. 4) that is made up of an image-capturing driver 41, the solid-state image-capturing device 42, and an image-capturing signal processing circuit 43, and the transmission unit 70 (FIG. 4) that is made up of a small power wireless unit 71 and a high-speed wireless unit 72.

Note that while the camera main unit 1 only includes one shooting unit 40 in the present embodiment, arrangements may be made in which two or more shooting units 40 are provided to perform image-capturing of three-dimensional pictures, to perform image-capturing of pictures over a wider angle of view than that which can be acquired by a single shooting unit 40, or to perform image-capturing in a plurality of directions.

The camera main unit 1 also includes various types of memory, such as large-capacity nonvolatile memory 51, built-in nonvolatile memory 102, the primary memory 103, and so forth.

Further, the camera main unit 1 includes an audio processing unit 104, a speaker 105, a vibrating member 106, an angular velocity sensor 107, an acceleration sensor 108, and various types of switches 110.

The general control CPU 101 is connected to the power switch 11 described above with reference to FIG. 2C, and so forth, and controls the camera main unit 1. The recording direction and angle-of-view deciding unit 30, the image clipping and developing processing unit 50, and the other-controlling unit 111, illustrated in FIG. 4, are made up of the general control CPU 101 itself.

The infrared LED lighting circuit 21 performs control of lighting and turning off the infrared LEDs 22 described above with reference to FIG. 2E, and controls the infrared light 23 that is cast from the infrared LEDs 22 toward the user.

The facial direction detection window 13 is made up of a visible light cutout filter, and can transmit very little visible light, but can sufficiently transmit the infrared light 23 and the reflected light 25 thereof that is light of the infrared region.

The infrared light condensing lens 26 is a lens for collecting the reflected light 25.

The infrared detection processing device 27 (infrared light detecting means) has a sensor that detects the reflected light 25 collected by the infrared light condensing lens 26. This sensor images the reflected light 25, which has been collected, as a picture which is then converted into sensor data and handed to the general control CPU 101.

In a case in which the user is wearing the camera main unit 1 as illustrated in FIG. 1B, the facial direction detection window 13 is situated below the chin of the user.

Accordingly, the infrared light 23 cast from the infrared LED lighting circuit 21 is transmitted through the facial direction detection window 13 and is cast onto an infrared light illumination face 24, which is around the chin of the user, as illustrated in FIG. 5. Also, the infrared light 23 reflected at the infrared light illumination face 24 becomes the reflected light 25, is transmitted through the facial direction detection window 13, and is collected at the sensor in the infrared detection processing device 27 by the infrared light condensing lens 26.

The various types of switches 110 are omitted from illustration in FIGS. 1A to 1C and so forth, and while details will be omitted from description, these are switches for executing functions that are unrelated to the present embodiment.

The image-capturing driver 41 includes a timing generator and so forth, and generates and outputs various types of timing signals to various parts related to image-capturing, so as to perform image-capture driving.

The solid-state image-capturing device 42 outputs signals obtained by photoelectric conversion of a subject image, projected from the image-capturing lens 16 described with reference to FIG. 1A, to the image-capturing signal processing circuit 43.

The image-capturing signal processing circuit 43 outputs image-capturing data, generated by performing processing such as clamping and processing such as analog-to-digital (A/D) conversion on signals from the solid-state image-capturing device 42, to the general control CPU 101.

The built-in nonvolatile memory 102 uses flash memory or the like, and stores activation programs for the general control CPU 101, and setting values for various types of program modes. In the present embodiment, the observation field of view (angle of view) can be changed, and the level of effect of image stabilization control can be set, and setting values thereof are recorded in the built-in nonvolatile memory 102 as well.

The primary memory 103 is made up of random-access memory (RAM) or the like, and temporarily stores picture data being processed, temporarily stores computation results from the general control CPU 101, and so forth.

The large-capacity nonvolatile memory 51 records and reads primary image data.

Although description will be made in the present embodiment regarding a case in which the large-capacity nonvolatile memory 51 is semiconductor memory without a mounting/unmounting mechanism, for the sake of simplification of description, this is not restrictive. For example, the large-capacity nonvolatile memory 51 may be made up of a detachable recording medium such as a Secure Digital (SD) card or the like, and may be used in conjunction with the built-in nonvolatile memory 102.

The small power wireless unit 71 performs exchange of data among the display device 800, the calibrator 850, and the simplified display device 900, by small power wireless.

The high-speed wireless unit 72 performs exchange of data among the display device 800, the calibrator 850, and the simplified display device 900, by high-speed wireless.

The audio processing unit 104 includes the microphone 19L on the right side in FIG. 1A and the microphone 19R on the left side in FIG. 1A, for collecting external sound (analog signals), and performs processing of the collected analog signals to generate audio signals.

The LED 17, the speaker 105, and the vibrating member 106 respectively emit light, emit sound, and vibrate, thereby notifying or warning the user of the state of the camera main unit 1.

The angular velocity sensor 107 is a sensor that uses a gyroscope and so forth, and detects movement of the camera main unit 1 itself as gyro data.

The acceleration sensor 108 detects attitude of the shooting and detecting unit 10.

Note that the angular velocity sensor 107 and the acceleration sensor 108 are built into the shooting and detecting unit 10, and that the angular velocity sensor 807 and the acceleration sensor 808, which are separate entities from these, are also provided in the display device 800 which will be described later.

Figure 6:
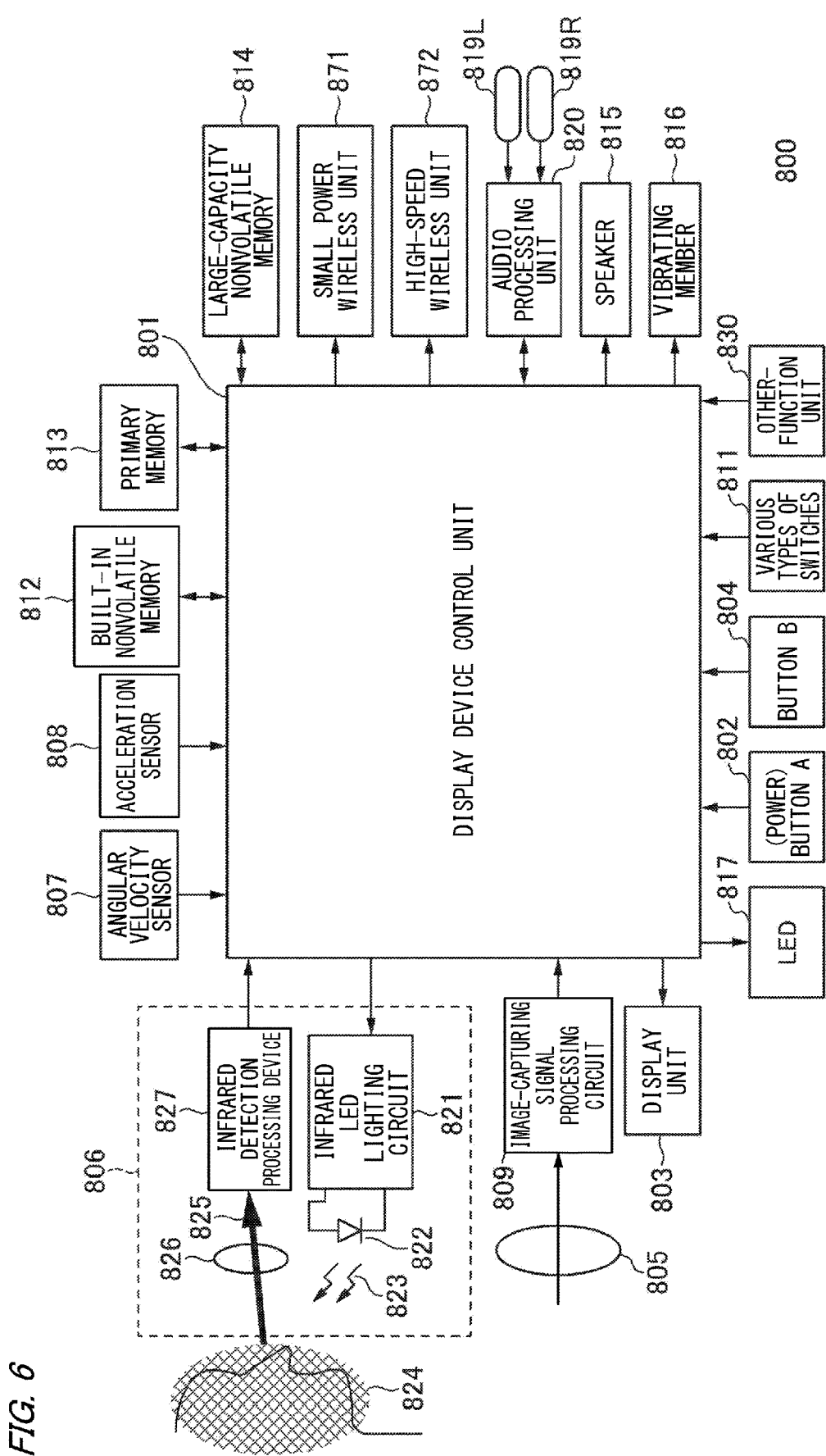
FIG. 6 is a block diagram illustrating a hardware configuration of the display device.

FIG. 6 is a block diagram illustrating a hardware configuration of the display device 800. Parts described with reference to FIG. 1D are denoted by the same signs for the sake of simplification of description, and description thereof will be omitted.

In FIG. 6, the display device 800 includes a display device control unit 801, the button A 802, the display unit 803, the button B 804, the front camera 805, the face sensor 806, the angular velocity sensor 807, the acceleration sensor 808, an image-capturing signal processing circuit 809, and various types of switches 811.

The display device 800 also includes built-in nonvolatile memory 812, primary memory 813, large-capacity nonvolatile memory 814, a speaker 815, a vibrating member 816, an LED 817, an audio processing unit 820, a small power wireless unit 871, and a high-speed wireless unit 872.

The display device control unit 801 is made up of a CPU, and is connected to the button A 802, the face sensor 806, and so forth, described with reference to FIG. 1D, and controls the display device 800.

The image-capturing signal processing circuit 809 bears functions equivalent to those of the image-capturing driver 41, the solid-state image-capturing device 42, and the image-capturing signal processing circuit 43 within the camera main unit 1, but is not very important in the description of the present embodiment, and accordingly these are collectively described for the sake of simplification of description. Data output from the image-capturing signal processing circuit 809 is processed within the display device control unit 801. The processing contents of this data will be described later.

The various types of switches 811 are omitted from illustration in FIG. 1D, and while details will be omitted from description, these are switches for executing functions that are unrelated to the present embodiment.

The angular velocity sensor 807 is a sensor using a gyroscope and so forth, and detects movement of the display device 800 itself.

The acceleration sensor 808 detects the attitude of the display device 800 itself.

Note that the angular velocity sensor 807 and the acceleration sensor 808 are built into the display device 800, as described above, and are separate entities from the angular velocity sensor 107 and the acceleration sensor 108 of the camera main unit 1 described above, although the functions are the same.

The built-in nonvolatile memory 812 uses flash memory or the like, and stores activation programs for the display device control unit 801, and setting values for various types of program modes.

The primary memory 813 is made up of RAM or the like, and temporarily stores picture data being processed, temporarily stores computation results from the image-capturing signal processing circuit 809, and so forth. In the present embodiment, while recording moving image pictures, gyro data detected by the angular velocity sensor 807 at the image-capturing time of each frame is stored in the primary memory 813 in an associated manner with each frame.

The large-capacity nonvolatile memory 814 records and reads image data for the display device 800. In the present embodiment, the large-capacity nonvolatile memory 814 is made up of detachable memory such as a SD card or the like. Note that the large-capacity nonvolatile memory 814 may be made up of non-unmountable memory, like the large-capacity nonvolatile memory 51 in the camera main unit 1.

The speaker 815, the vibrating member 816, and the LED 817 respectively emit sound, vibrate, and emit light, thereby notifying or warning the user of the state of the display device 800.

The audio processing unit 820 includes a left microphone 819L and a right microphone 819R for collecting external sound (analog signals), and performs processing of the collected analog signals to generate audio signals.

The small power wireless unit 871 performs exchange of data with the camera main unit 1 by small power wireless.

The high-speed wireless unit 872 performs exchange of data with the camera main unit 1 by high-speed wireless.

The face sensor 806 includes an infrared LED lighting circuit 821, infrared LEDs 822, an infrared light condensing lens 826, and an infrared detection processing device 827.

The infrared LED lighting circuit 821 is a circuit that has functions that are the same as those of the infrared LED lighting circuit 21 in FIG. 5, and performs control of lighting and turning off of the infrared LEDs 822, and controls the infrared light 823 cast from the infrared LEDs 822 toward the user.

The infrared light condensing lens 826 is a lens for collecting reflected light 825 of the infrared light 823.

The infrared detection processing device 827 has a sensor that detects the reflected light collected by the infrared light condensing lens 826. This sensor converts the reflected light 825, which has been collected, into sensor data, which is then handed to the display device control unit 801.

When the face sensor 806 illustrated in FIG. 1D is directed toward the user, the infrared light 823 cast from the infrared LED lighting circuit 821 is cast onto an infrared light illumination face 824 that is the entire face of the user, as illustrated in FIG. 6. Also, the infrared light 823 reflected at the infrared light illumination face 824 becomes the reflected light 825, and is collected at the sensor in the infrared detection processing device 827 by the infrared light condensing lens 826.

An other-function unit 830 executes telephone functions, usage of other sensors, and so forth, which are functions unique to a smartphone, and that are unrelated to the present embodiment although details are not described herein.

Usages of the camera main unit 1 and the display device 800 will be described below.

Figure 7A:
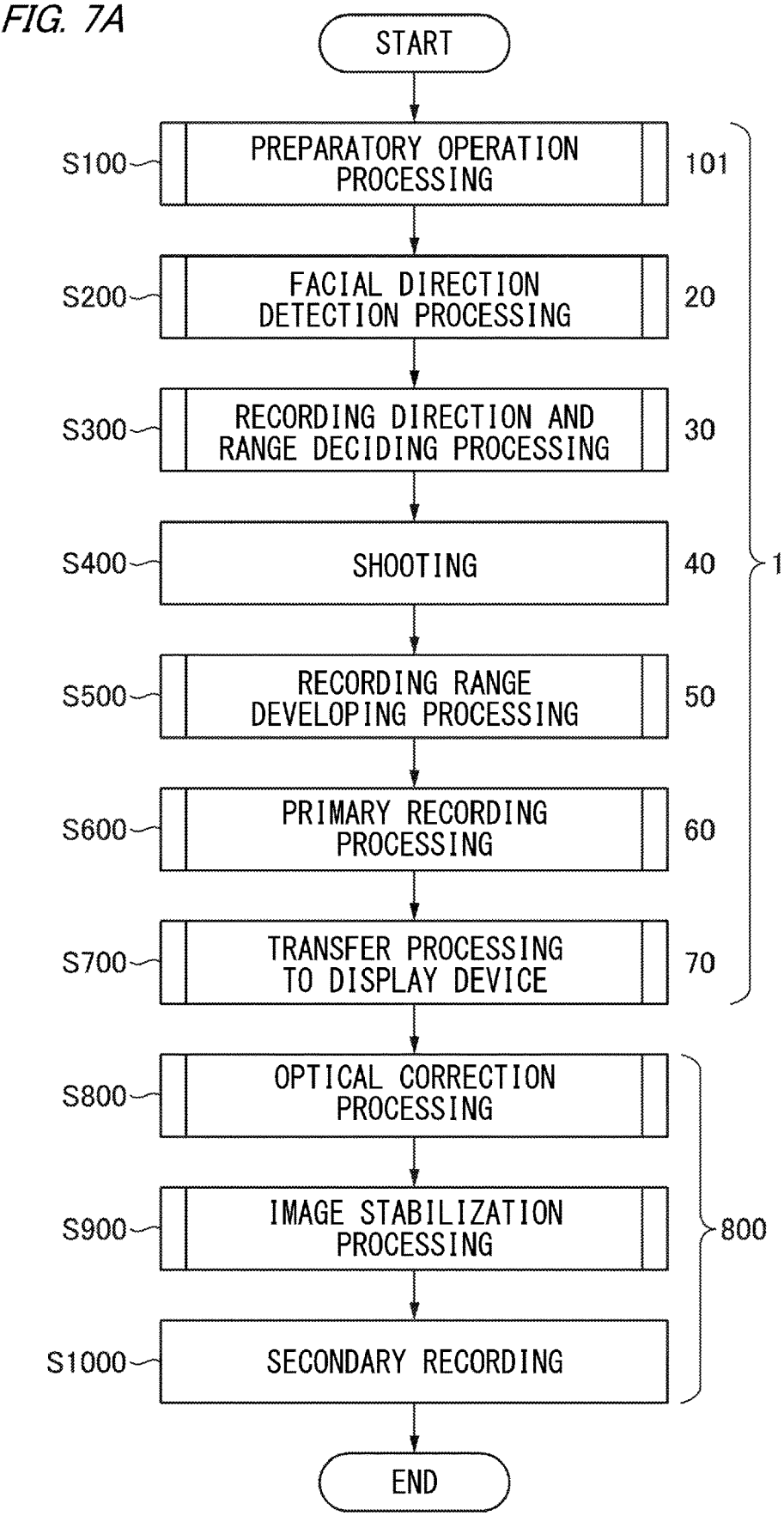
FIG. 7A is a flowchart showing an overview of imaging recording processing according to the first embodiment, which is executed at the camera main unit and the display device.

FIG. 7A is a flowchart illustrating an overview of image-capturing and recording processing according to the present embodiment that is executed at the camera main unit 1 and the display device 800.

As supplementary description, which equipment illustrated in FIG. 4 is performing each step is indicated to the right of the steps in FIG. 7A. That is to say, steps S100 to S700 in FIG. 7A are executed at the camera main unit 1, and steps S800 to S1000 in FIG. 7A are executed at the display device 800.

In step S100, upon the power switch 11 being turned on and power being turned on to the camera main unit 1, the general control CPU 101 is activated and reads an activation program out from the built-in nonvolatile memory 102. Thereafter, the general control CPU 101 executes preparatory operation processing for performing settings of the camera main unit 1 before image-capturing. Details of the preparatory operation processing will be described later with reference to FIG. 7B.

In step S200, facial direction detection processing, in which the observation direction is inferred, is executed by the facial direction detecting unit 20 detecting the facial direction. Details of the facial direction detection processing will be described later with reference to FIG. 7C. This processing is executed at a predetermined framerate.

In step S300, the recording direction and angle-of-view deciding unit 30 executes recording direction and range deciding processing. Details of the recording direction and range deciding processing will be described later with reference to FIG. 7D.

In step S400, the shooting unit 40 performs image-capturing, and generates image-capturing data.

In step S500, the image clipping and developing processing unit 50 executes recording range developing processing, in which the image-capturing data generated in step S400 is subjected to clipping of the picture and developing processing of that range, using recording direction and angle of view information decided in step S300. Details of the recording range developing processing will be described later with reference to FIG. 7E.

In step S600, the primary recording unit 60 executes primary recording processing, in which the picture developed in step S500 is saved in the primary memory 103 as picture data. Details of the primary recording processing will be described later with reference to FIG. 14.

In step S700, the transmission unit 70 executes transfer processing to the display device 800, in which the picture regarding which primary recording has been performed in step S600 is wirelessly transmitted to the display device 800 at a specified timing. Details of the transfer processing to the display device 800 will be described later with reference to FIG. 16.

Step S800 and subsequent steps are executed at the display device 800.

In step S800, the display device control unit 801 executes optical correction processing, in which the picture transferred from the camera main unit 1 in step S700 is subjected to optical correction. Details of the optical correction processing will be described later with reference to FIG. 17.

In step S900, the display device control unit 801 performs image stabilization processing on the picture subjected to optical correction in step S800. Details of image stabilization processing will be described later with reference to FIG. 19.

Note that the order of steps S800 and S900 may be inverted. That is to say, image stabilization correction of the picture may be performed first, and optical correction may be performed later.

In step S1000, the display device control unit 801 performs secondary recording for recording the picture, of which the optical correction processing and the image stabilization processing in steps S800 and S900 have been completed, in the large-capacity nonvolatile memory 814, and this processing ends.

Next, the subroutines in each step described with reference to FIG. 7A will be described in detail, along with the order of processing, with reference to FIGS. 7B to 7F, and other Figures and so forth.

Figure 7B:
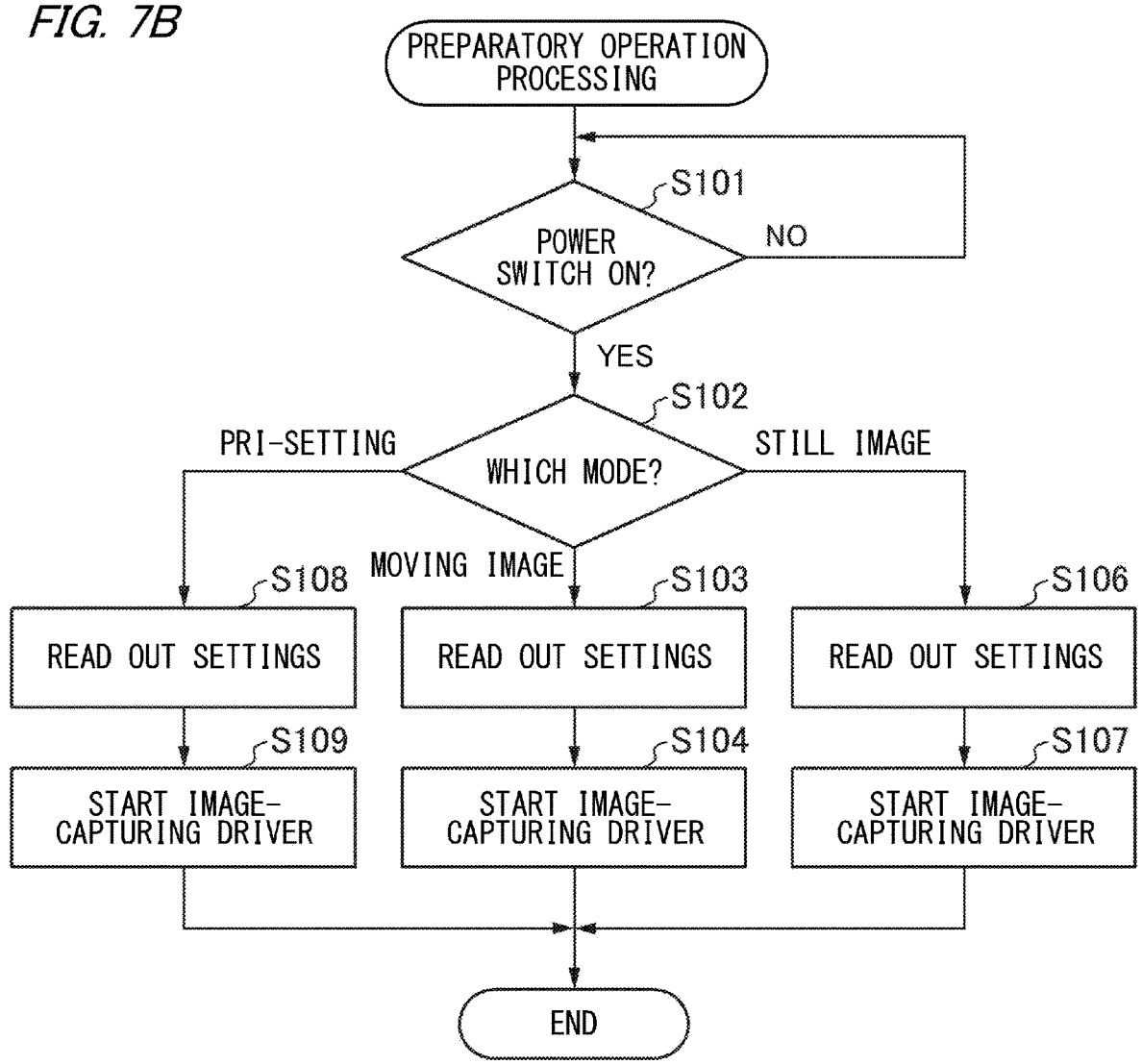
FIG. 7B is a flowchart of a subroutine for preparatory operation processing of step S100 in FIG. 7A according to the first embodiment.

FIG. 7B is a flowchart of a subroutine for the preparatory operation processing of step S100 in FIG. 7A. This processing will be described below using the portions illustrated in FIGS. 2A to 2F and 5.

In step S101, determination is made regarding whether or not the power switch 11 is on. In a case in which the power remains off, the flow stands by, and when the power goes on, the flow advances to step S102.

In step S102, the mode selected by the image-capturing mode switch 12 is determined. In a case in which the results of the determination are that the mode selected by the image-capturing mode switch 12 is the moving image mode, the flow advances to step S103.

In step S103, various types of settings for the moving image mode are read out from the built-in nonvolatile memory 102 and saved in the primary memory 103, following which the flow advances to step S104. The various types of settings in the moving image mode here include an angle-of-view settings value ang (set to 90° in advance in the present embodiment), and image stabilization level specified by "strong" "medium", "off" and so forth.

In step S104, operations of the image-capturing driver 41 are started for the moving image mode, following which the flow exits this subroutine.

In a case in which the results of the determination in step S102 are that the mode selected by the image-capturing mode switch 12 is the still image mode, the flow advances to step S106.

In step S106, various types of settings for the still image mode are read out from the built-in nonvolatile memory 102 and saved in the primary memory 103, following which the flow advances to step S107. The various types of settings in the still image mode here include the angle-of-view settings value ang (set to 45° in advance in the present embodiment), and image stabilization level specified by "strong" "medium", "off", and so forth.

In step S107, operations of the image-capturing driver 41 are started for still image mode, following which the flow exits this subroutine.

In a case in which the results of the determination in step S102 are that the mode selected by the image-capturing mode switch 12 is the Pri setting mode, the flow advances to step S108. The Pri setting mode here is a mode in which settings of the image-capturing mode are made to the camera main unit 1 from external equipment, such as the display device 800 or the like, and is one of the three image-capturing modes that can be switched by the image-capturing mode switch 12. That is to say, the Pri setting mode is a mode for custom shooting. Now, the camera main unit 1 is a small-sized wearable device, and accordingly no operation switches, settings screen, or the like, for changing detailed settings thereof, are provided on the camera main unit 1. Rather, detailed settings of the camera main unit 1 are changed by external equipment such as the display device 800.

A case will be considered in which the user desires to perform the same moving image image-capturing consecutively, once at an angle of view of 90°, and then once at an angle of view of 110°, for example. In the normal moving image mode, the angle of view of 90° is set, and accordingly in a case of performing such image-capturing, there is a need to perform image-capturing first in the normal moving image mode, following which the moving image image-capturing is temporarily ended, a settings screen for the camera main unit 1 is brought up on the display device 800, and operations for switching the angle of view to 110° are performed. However, in a case in which some sort of event is going on, such operations at the display device 800 are bothersome.

Conversely, by setting the Pri setting mode to a mode for performing moving image image-capturing at the angle of view of 110° in advance, the mode can be instantaneously switched to moving image image-capturing at the angle of view of 110° after moving image image-capturing at the angle of view of 90° has ended, simply by sliding the image-capturing mode switch 12 to "Pri". That is to say, the user does not need to interrupt his/her current activities and perform the above-described bothersome operations.

Note that the contents that are set in the Pri setting mode are not limited to angle of view, and may include the image stabilization level that is specified by "strong" "medium", "off", and so forth, settings for speech recognition which are not described in the present embodiment, and so on.

In step S108, various types of settings for the Pri setting mode are read out from the built-in nonvolatile memory 102 and saved in the primary memory 103, following which the flow advances to step S109. The various types of settings in the Pri setting mode here include the angle-of-view settings value ang and the image stabilization level specified by "strong" "medium", "off", and so forth.

In step S109, operations of the image-capturing driver 41 are started for Pri setting mode, following which the flow exits this subroutine.

Now, various types of settings for the moving image mode read out in step S103 will be described with reference to FIG. 13.

Figure 13:
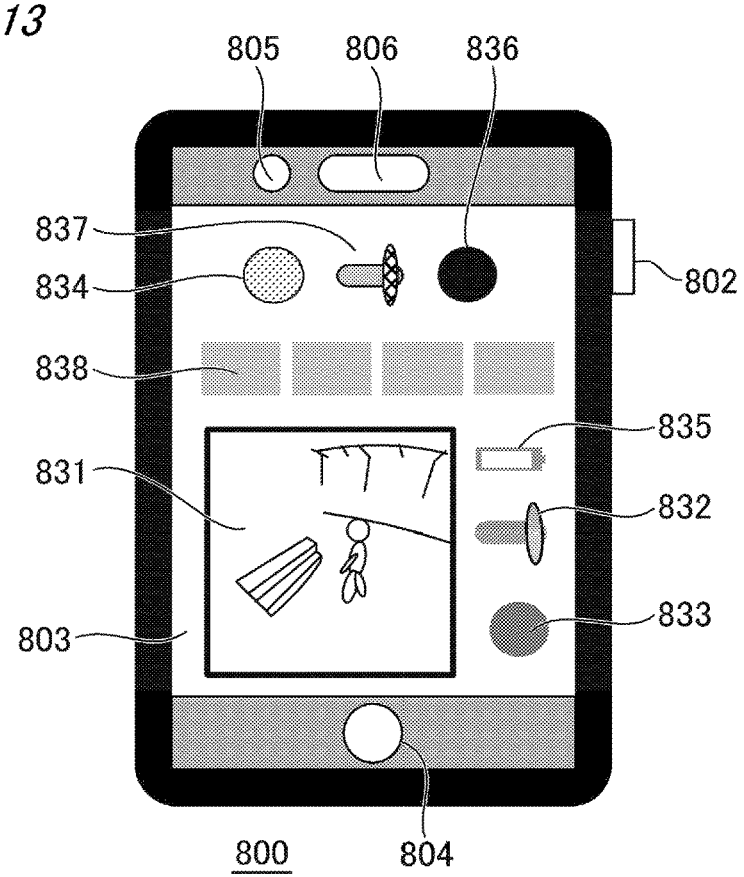
FIG. 13 is a diagram illustrating a menu screen for various types of settings for the moving image mode, which is displayed on a display unit of the display device before performing image-capturing by the camera main unit.

FIG. 13 is a diagram illustrating a menu screen for various types of settings for the moving image mode, which is displayed on the display unit 803 of the display device 800, before performing image-capturing by the camera main unit 1. Note that portions that are the same as those in FIG. 1D are denoted by the same signs, and description thereof will be omitted. Note that the display unit 803 has touch-panel functions, and description will be made hereinafter that the display unit 803 functions with touch operations, including operations such as swiping and so forth.

In FIG. 13, the menu screen includes a preview screen 831, a zoom lever 832, a recording start/stop button 833, a switch 834, a remaining battery charge display 835, a button 836, a lever 837, and an icon display portion 838.

The preview screen 831 enables confirmation of pictures image-captured by the camera main unit 1, and zoom amount and angle of view can be confirmed.

The zoom lever 832 is an operating portion that can perform zoom settings by shifting to the right and left. In the present embodiment, a case will be described in which four values of 45°, 90°, 110°, and 130° can be set as the angle-of-view settings value ang, but an arrangement may be made in which values other than these can be set as the angle-of-view settings value ang by the zoom lever 832.

The recording start/stop button 833 is a toggle switch that has the functions of both the start switch 14 and the stop switch 15.

The switch 834 is a switch for switching image stabilization between "off" and "on".

The remaining battery charge display 835 displays remaining battery charge of the camera main unit 1.

The button 836 is a button to transition to another mode.

The lever 837 is a lever for setting the level of image stabilization. Although only "strong" and "medium" can be set as the level of image stabilization in the present embodiment, other levels of image stabilization, such as "weak" for example, may be made to be settable. Also, the level of image stabilization may be settable to be continuously variable.

The icon display portion 838 displays a plurality of thumbnail icons for previewing.

Figure 7C:
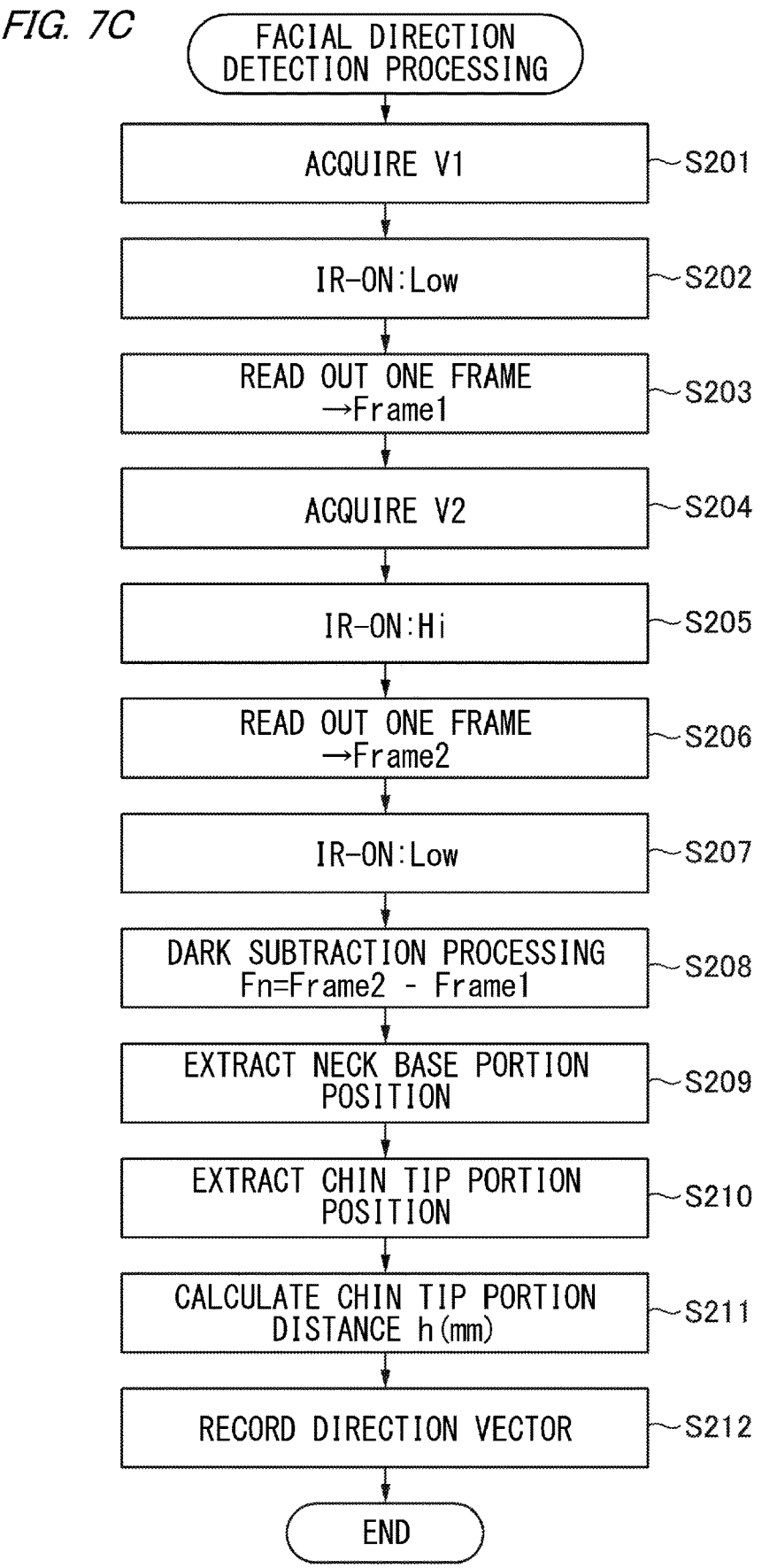
FIG. 7C is a flowchart of a subroutine for facial direction detection processing of step S200 in FIG. 7A according to the first embodiment.

FIG. 7C is a flowchart of a subroutine for facial direction detection processing of step S200 in FIG. 7A. Before describing the details of this processing, a detection method of the facial direction by casting infrared light will be described with reference to FIGS. 8A to 8K.

Figure 8A:
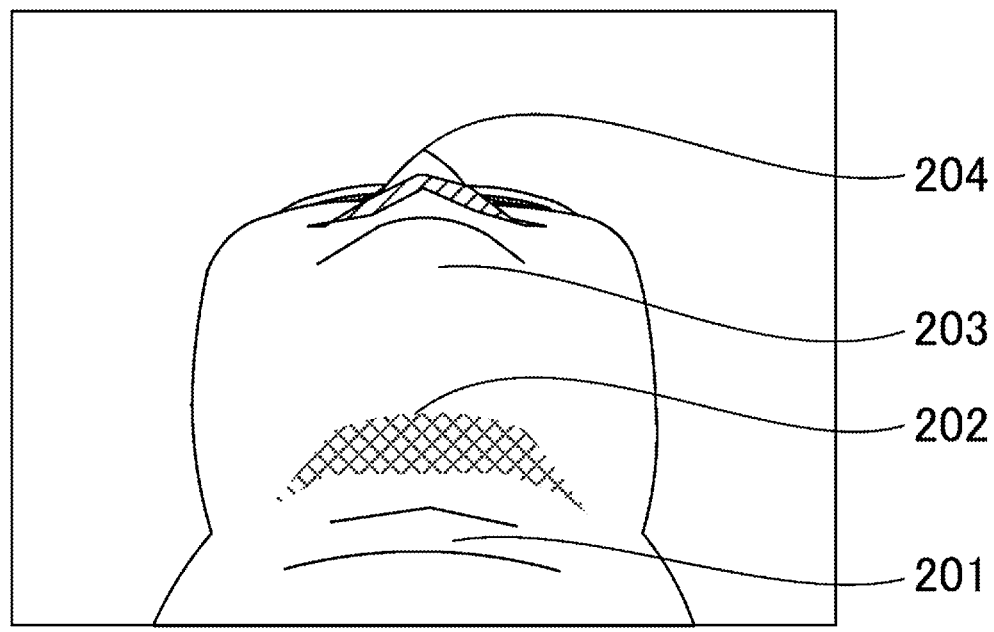
FIG. 8A is a diagram illustrating a picture of the user as seen from the facial direction detection window.

FIG. 8A is a diagram illustrating a picture of the user as seen from the facial direction detection window 13.

Assuming a case in which the facial direction detection window 13 has no visible light cutout filter component and is capable of sufficiently transmitting visible light, and the infrared detection processing device 27 is a visible light image-capturing device, the picture in FIG. 8A is the same as a picture image-captured by that visible light image-capturing device.

A face 204 of the user, including a neck front portion 201 above the collarbones, a chin base portion 202, a chin tip portion 203, and a nose, is in the picture in FIG. 8A.

Figure 8B:
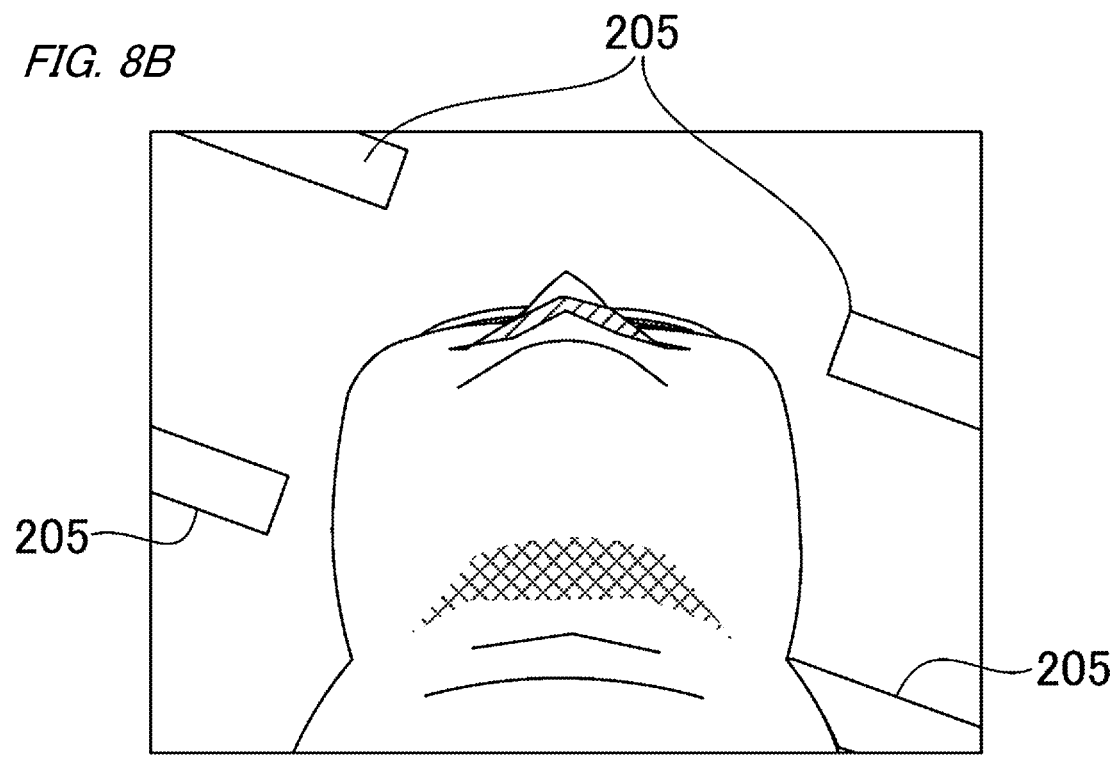
FIG. 8B is a diagram illustrating a case in which fluorescent lamps of a room show up in a picture of the user as a background, as seen from the facial direction detection window.

FIG. 8B is a diagram illustrating a case in which fluorescent lamps of a room show up in the picture of the user as a background, as seen from the facial direction detection window 13.

A plurality of fluorescent lamps 205 in the surroundings of the user are in the picture in FIG. 8B. In this way, various types of backgrounds and so forth are picked up by the infrared detection processing device 27, depending on the usage conditions, and accordingly it is difficult for the facial direction detecting unit 20 and the general control CPU 101 to cut the picture of the facial portion out from the sensor data of the infrared detection processing device 27. Nowadays, there is technology for cutting out such pictures by using artificial intelligence or the like, but this requires the general control CPU 101 to have a high capability level, and is not appropriate for the camera main unit 1 that is portable equipment.

In reality, a visible light cutout filter is included in the configuration of the facial direction detection window 13, and hardly any visible light is transmitted. Accordingly, pictures from the infrared detection processing device 27 are not pictures such as those in FIGS. 8A and 8B.

Figure 8C:
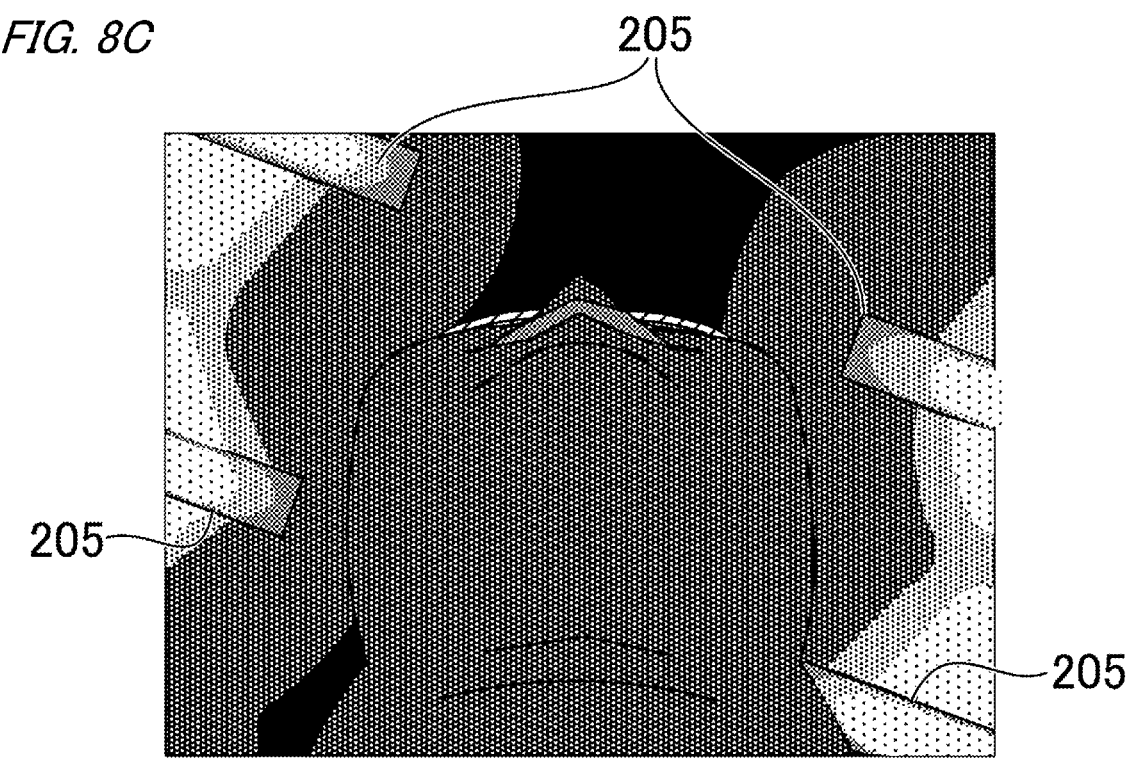
FIG. 8C is a diagram illustrating a picture in a case in which the user and the fluorescent lamps in the background, illustrated in FIG. 8B, are imaged by a sensor of an infrared detection processing device via the facial direction detection window, in a state in which infrared light-emitting diodes (LED) of the infrared detection processing device are not lit.

FIG. 8C is a diagram illustrating a picture in a case in which the user and the fluorescent lamps in the background in FIG. 8B are imaged by the sensor of the infrared detection processing device 27 via the facial direction detection window 13, in a state in which the infrared LEDs 22 are not lit.

In the picture in FIG. 8C, the neck and the chin of the user are dark. Conversely, the fluorescent lamps 205 emit not only visible light but infrared light components as well, and accordingly appear somewhat brightly.

Figure 8D:
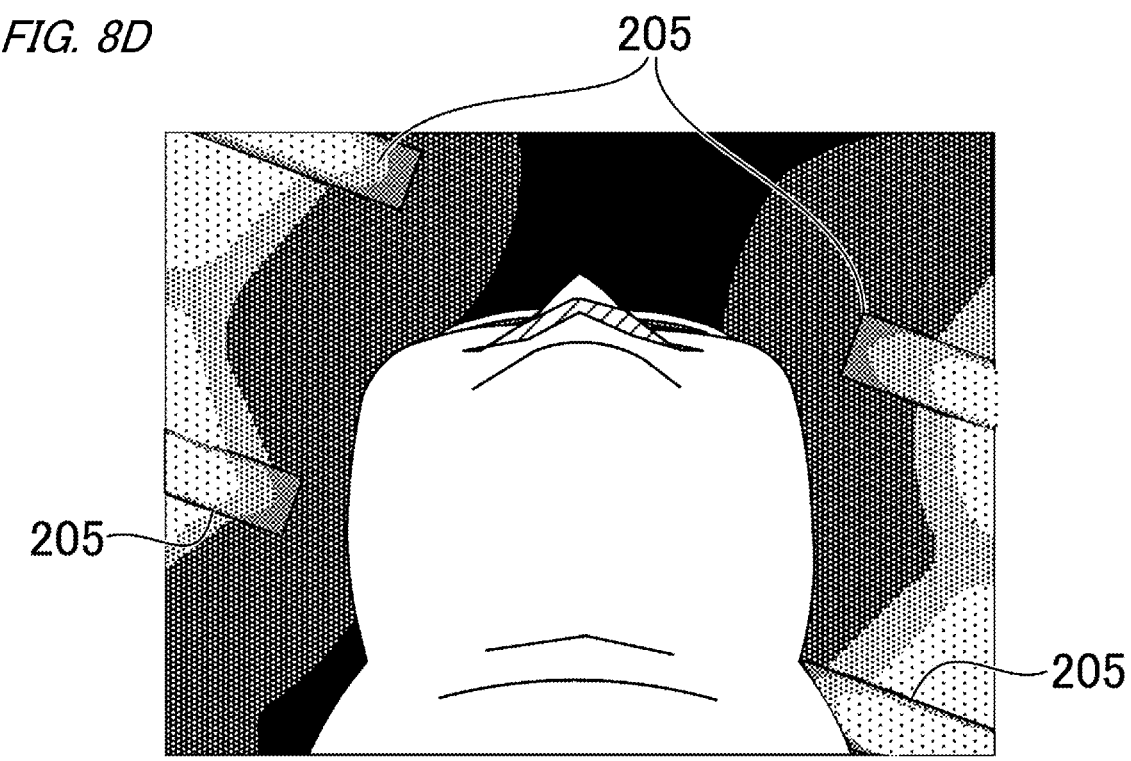
FIG. 8D is a diagram illustrating a picture in a case in which the user and the background fluorescent lamps illustrated in FIG. 8B are imaged by the sensor of the infrared detection processing device via the facial direction detection window, in a state in which the infrared LEDs are lit.

FIG. 8D is a diagram illustrating a picture in a case in which the user and the fluorescent lamps in the background in FIG. 8B are imaged by the sensor of the infrared detection processing device 27 via the facial direction detection window 13, in a state in which the infrared LEDs 22 are lit.

In the picture in FIG. 8D, the neck and chin of the user appear brightly, unlike in FIG. 8C. Meanwhile, the brightness in the vicinity of the fluorescent lamps 205 and so forth is unchanged.

Figure 8E:
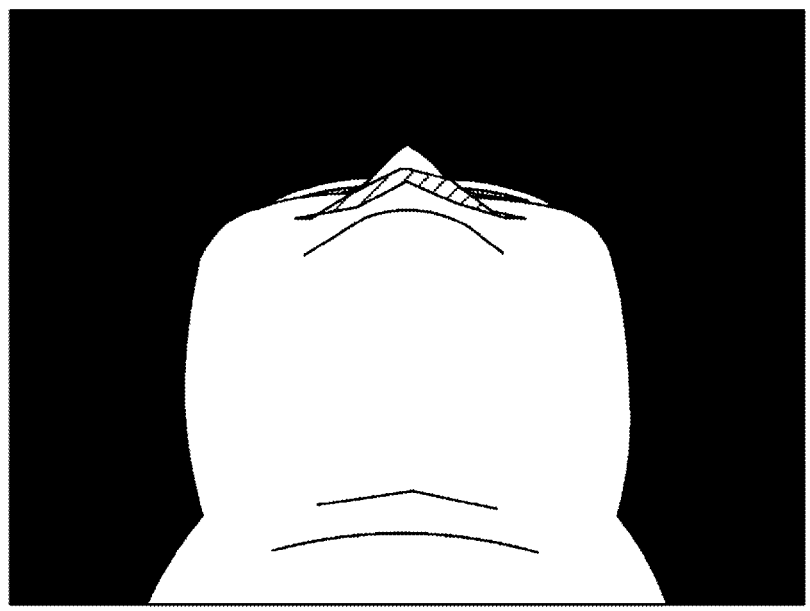
FIG. 8E is a diagram illustrating a differential picture computed from the pictures in FIGS. 8C and 8D.

FIG. 8E is a diagram illustrating a differential picture computed from the pictures in FIGS. 8C and 8D. It can be understood that the face of the user stands out.

In this way, a differential image in which the face of the user is extracted (hereinafter also referred to as "facial picture") is obtained, by the general control CPU 101 computing a difference between images that are imaged at the sensor of the infrared detection processing device 27 with the infrared LEDs 22 lit and unlit, respectively.

The facial direction detecting unit 20 according to the present embodiment employs a method of acquiring a facial picture by extracting reflection intensities of infrared light as two-dimensional images, using the infrared detection processing device 27. The sensor of the infrared detection processing device 27 employs the same structure as a common image-capturing device, and acquires facial images one frame at a time. Vertical synchronization signals (hereinafter referred to as "V signals") for synchronization of these frames are generated at the infrared detection processing device 27 and are output to the general control CPU 101.

FIGS. 9A to 9E are timing charts showing timings of lighting and turning off the infrared LEDs 22.

FIG. 9A shows the timing of V signals being generated at the infrared detection processing device 27. Frame synchronization and timing of lighting and turning off the infrared LEDs 22 are realized by the V signals going to Hi.

In FIG. 9A, t1 represents a first facial image acquisition period, and t2 represents a second facial image acquisition period. In FIGS. 9A, 9B, 9C and 9D, temporal axes on the horizontal axis are matched with each other.

In FIG. 9B, an H position of image signals output from the sensor of the infrared detection processing device 27 is represented on the vertical axis. As illustrated in FIG. 9B, the infrared detection processing device 27 controls actions of the sensor thereof such that the H positions of the image signals are synchronized with the V signals. Note that since the sensor of the infrared detection processing device 27 employs the same structure as a common image-capturing device, as described above, the actions thereof are known, and accordingly detailed description of control will be omitted.

FIG. 9C illustrates a timing of switching between Hi and Low of IR-on signals output from the general control CPU 101 to the infrared LED lighting circuit 21. The general control CPU 101 controls the switching between Hi and Low of IR-on signals so as to be synchronized with the V signals, as shown in FIG. 9C. Specifically, the general control CPU 101 outputs a Low IR-on signal to the infrared LED lighting circuit 21 during the period at t1, and outputs a Hi IR-on signal to the infrared LED lighting circuit 21 during the period at t2.

Now, during the Hi period of the IR-on signal, the infrared LED lighting circuit 21 lights the infrared LEDs 22 and the infrared light 23 is cast on the user. Conversely, during the Low period of the IR-on signal, the infrared LED lighting circuit 21 turns off the infrared LEDs 22.

FIG. 9D shows image-capturing data output from the sensor of the infrared detection processing device 27 to the general control CPU 101. The vertical direction represents signal intensity, indicating the quantity of reflected light 25 received. That is to say, during the period of t1, the infrared LEDs 22 are unlit, and accordingly there is no reflected light 25 from the facial portion of the user in this state, and image-capturing data such as shown in FIG. 8C is acquired. Meanwhile, during the period of t2, the infrared LEDs 22 are lit, and accordingly there is reflected light 25 from the facial portion of the user in this state, and image-capturing data such as shown in FIG. 8D is acquired. Accordingly, the signal intensity during the period of t2 is higher than the signal intensity during the period of t1 by an amount equivalent to the reflected light 25 from the facial portion of the user, as illustrated in FIG. 9D.

FIG. 9E is the difference between the image-capturing data during each of the periods t1 and t2 in FIG. 9D, and image-capturing data in which only the component of the reflected light 25 from the face of the user is extracted, such as in FIG. 8E, is obtained.

FIG. 7C shows the facial direction detection processing in step S200, including the operations described above with reference to FIGS. 8C to 8E and FIGS. 9A to 9E.

First, in step S201, when V signals output from the infrared detection processing device 27 reach a timing V1 at which the period of t1 starts, the flow advances to step S202.

Next, in step S202, the IR-on signal is set to Low, and is output to the infrared LED lighting circuit 21. This turns the infrared LEDs 22 off.

In step S203, one frame worth of image-capturing data output from the infrared detection processing device 27 during the period of t1 is read out, and this data is temporarily saved in the primary memory 103 as Frame 1.

In step S204, when V signals output from the infrared detection processing device 27 reach a timing V2 at which the period of t2 starts, the flow advances to step S205.

In step S205, the IR-on signal is set to Hi, and is output to the infrared LED lighting circuit 21. This lights the infrared LEDs 22.

In step S206, one frame worth of image-capturing data output from the infrared detection processing device 27 during the period of t2 is read out, and this data is temporarily saved in the primary memory 103 as Frame2.

In step S207, the IR-on signal is set to Low, and is output to the infrared LED lighting circuit 21. This turns the infrared LEDs 22 off.

In step S208, Frame1 and Frame2 are read out from the primary memory 103, and light intensity Fn of the reflected light 25 of the user in FIG. 9E, which is the difference obtained by subtracting Frame1 from Frame2, is computed (this processing is generally known as "dark subtraction processing").

In step S209, a neck base portion position (center of neck turning) is extracted from the light intensity Fn.

First, the general control CPU 101 divides the facial picture into a plurality of distance areas, on the basis of the light intensity Fn, which will be described with reference to FIG. 8F.

Figure 8F:
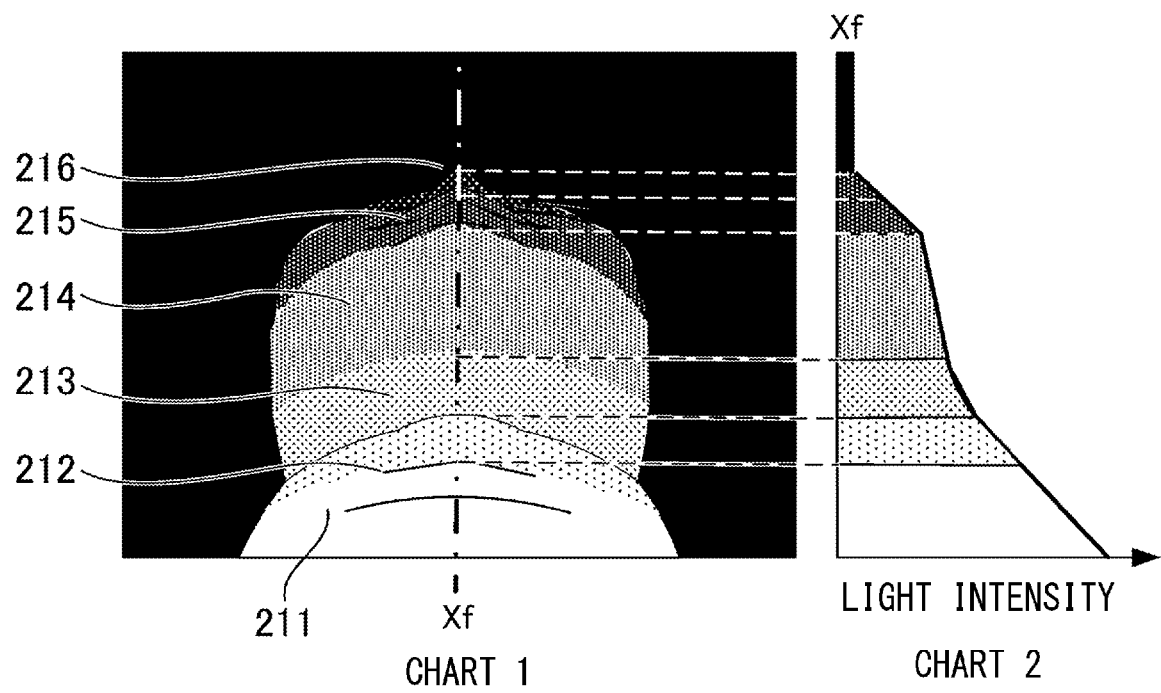
FIG. 8F is a diagram illustrating a case in which shades of the differential picture in FIG. 8E have been adjusted in scale, in accordance with light intensity of reflected light from the infrared light cast on face and neck portions of the user.

FIG. 8F is a diagram illustrating a case in which shades of the differential picture in FIG. 8E have been adjusted in scale, in accordance with light intensity of the reflected light 25 from the infrared light 23 cast on the face and neck portions of the user, in order to see the light quantity distribution with regard to the face and neck portions of the user.

CHART 1 in FIG. 8F is a diagram that indicates distribution of light intensity of the reflected light 25 in the facial picture in FIG. 8E, sectioned into regions by stages of gray, for the sake of simplification of description. An Xf axis, used for description, passes in a direction through the middle portion of the neck of the user and the chin tip portion.

In CHART 2 in FIG. 8F, the horizontal axis indicates the light intensity on the Xf axis in CHART 1 in FIG. 8F, and the vertical axis indicates the Xf axis. The farther toward the right on the horizontal axis, the stronger the light intensity indicated is.

In CHART 1 in FIG. 8F, the facial picture is divided into six regions (distance areas) 211 to 216 in accordance with light intensity.

Region 211 is a region in which the light intensity is the strongest, and is indicated by white in the stages of gray.

Region 212 is a region in which the light intensity is only slightly weaker than in region 211, and is indicated by a gray that is considerably light in the stages of gray.

Region 213 is a region in which the light intensity is even weaker than in region 212, and is indicated by a gray that is light in the stages of gray.

Region 214 is a region in which the light intensity is even weaker than in region 213, and is indicated by a gray that is intermediate in the stages of gray.

Region 215 is a region in which the light intensity is even weaker than in region 214, and is indicated by a gray that is somewhat dark in the stages of gray.

Region 216 is a region in which the light intensity is weakest, and is indicated by a gray that is darkest in the stages of gray. Upward from region 216 is black, with no light intensity.

This light intensity will be described in detail below with reference to FIGS. 10A to 10D.

FIGS. 10A to 10D are diagrams for describing movement of the face of the user in the up-down direction, and illustrate a state of observing the user from the left side.

Figure 10A:
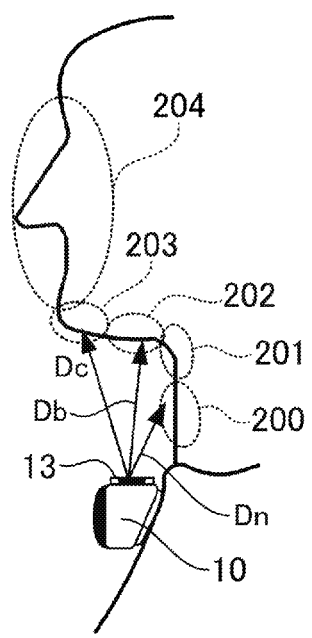
FIGS. 10A to 10D are diagrams for describing movement of the face of the user in an up-down direction.

FIG. 10A is a diagram illustrating the user facing the front. The shooting and detecting unit 10 is situated forward of the collarbones of the user. Also, the infrared light 23 of the infrared LEDs 22 is being cast from the facial direction detection window 13 at the top of the shooting and detecting unit 10 to a lower portion of the head of the user. With Dn representing the distance from the facial direction detection window 13 to a neck base portion 200 above the collarbones of the user, Db representing the distance from the facial direction detection window 13 to the chin base portion 202, and Dc representing the distance from the facial direction detection window 13 to the chin tip portion 203, it can be understood that the distance becomes longer in the order of Dn, Db, and Dc. The light intensity is in inverse proportion to the distance squared, and accordingly, the light intensity when the reflected light 25 from the infrared light illumination face 24 is imaged at the sensor of the infrared detection processing device 27 becomes weaker in the order of the neck base portion 200, the chin base portion 202, and the chin tip portion 203. It can also be understood that the light intensity is even more dark with respect to the face 204 including the nose, which is at a position even farther in distance from the facial direction detection window 13 than Dc. That is to say, it can be understood that in a case such as illustrated in FIG. 10A, a picture with a distribution of light intensity such as illustrated in FIG. 8F will be acquired.

Note that the configuration of the facial direction detecting unit 20 is not limited to the configuration indicated in the present embodiment, as long as the facial direction of the user can be detected. For example, an arrangement may be made in which an infrared light pattern is illuminated by the infrared LEDs 22, and the infrared light pattern reflected from an illumination object is detected by the sensor of the infrared detection processing device 27. In this case, the sensor of the infrared detection processing device 27 preferably is a structured light sensor. Also, the sensor of the infrared detection processing device 27 may be a sensor that performs phase comparison between the infrared light 23 and the reflected light 25, such as for example, a time of flight (ToF) sensor.

Next, extraction of the position of the neck base portion in step S209 of FIG. 7C will be described with reference to FIG. 8G.

Figure 8G:
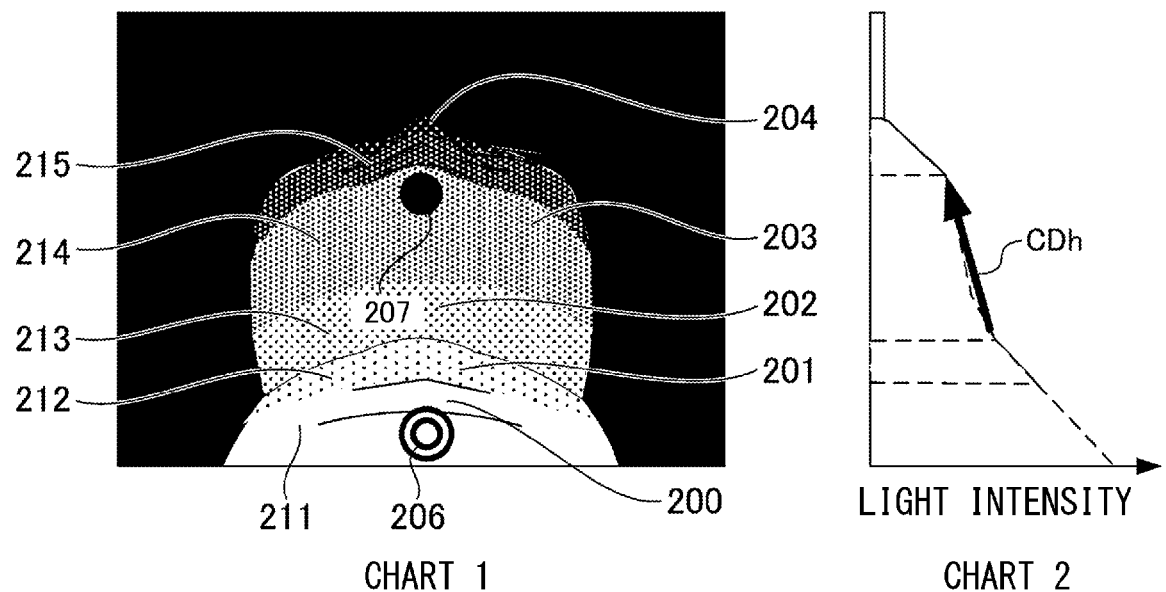
FIG. 8G is a diagram in which signs denoting portions of the body of the user, and double circle and black dot symbols, respectively indicating a neck base portion position and a chin tip portion position, are overlaid on FIG. 8F.

CHART 1 in FIG. 8G is a diagram in which signs denoting portions of the body of the user in FIG. 10A, and double circle and black dot symbols, respectively indicating the position of the neck base portion and the position of the chin tip portion, are overlaid on FIG. 8F.

The white region 211 corresponds to the neck base portion 200 (FIG. 10A), the considerably light gray region 212 corresponds to the neck front portion 201 (FIG. 10A), and the light gray region 213 corresponds to the chin base portion 202 (FIG. 10A). Also, the intermediate gray region 214 corresponds to the chin tip portion 203 (FIG. 10A), and the somewhat dark gray region 215 corresponds to the face lower portion, which is the lips at the lower portion of the face 204 (FIG. 10A) and the vicinity thereof. Further, the darkest gray region 216 corresponds to the face upper portion, which is the nose at the middle portion of the face 204 (FIG. 10A) and the vicinity thereof.

As illustrated in FIG. 10A, the difference between the distances Db and Dc is small as compared to distances from the facial direction detection window 13 to other portions of the user, and accordingly there is little difference in reflected light intensity between the light gray region 213 and the intermediate gray region 214.

Conversely, out of distances from the facial direction detection window 13 to the portions of the user, the distance Dn is the closest distance as illustrated in FIG. 10A, and accordingly the white region 211 that corresponds to the neck base portion 200 is the portion where the reflection intensity is the strongest.

Accordingly, the region 211 is the vicinity of the neck base portion 200, and a position 206 indicated by the double circle in CHART 1 in FIG. 8G, at the lateral middle in the region 211 and closest to the shooting and detecting unit 10, is set to the position of the center of neck turning (hereinafter referred to as "neck base portion position 206") by the general control CPU 101. The processing so far is what is performed in step S209 in FIG. 7C.

Next, extraction of the chin tip portion in step S210 of FIG. 7C will be described with reference to FIG. 8G.

In CHART 1 in FIG. 8G, the intermediate gray region 214 that is lighter than the region 215 corresponding to the face lower portion of the face 204 including the lips is the region including the chin tip portion. It can be understood from CHART 2 in FIG. 8G that the light intensity rapidly weakens at the region 215 adjacent to the region 214, and the change in distance from the facial direction detection window 13 is great. The general control CPU 101 distinguishes the region 214 on the near side from the region 215 where the light intensity rapidly weakens as being the chin tip portion region. Further, the general control CPU 101 calculates (extracts) a position that is at the lateral center of the region 214 and that is farthest from the neck base portion position 206 (the position indicated by the black dot in CHART 1 in FIG. 8G) as a chin tip portion position 207.

Figure 8H:
FIG. 8H is a diagram illustrating a differential picture computed by the same method as in FIG. 8E, when the face of the user is directed in a right direction.
Figure 8I:
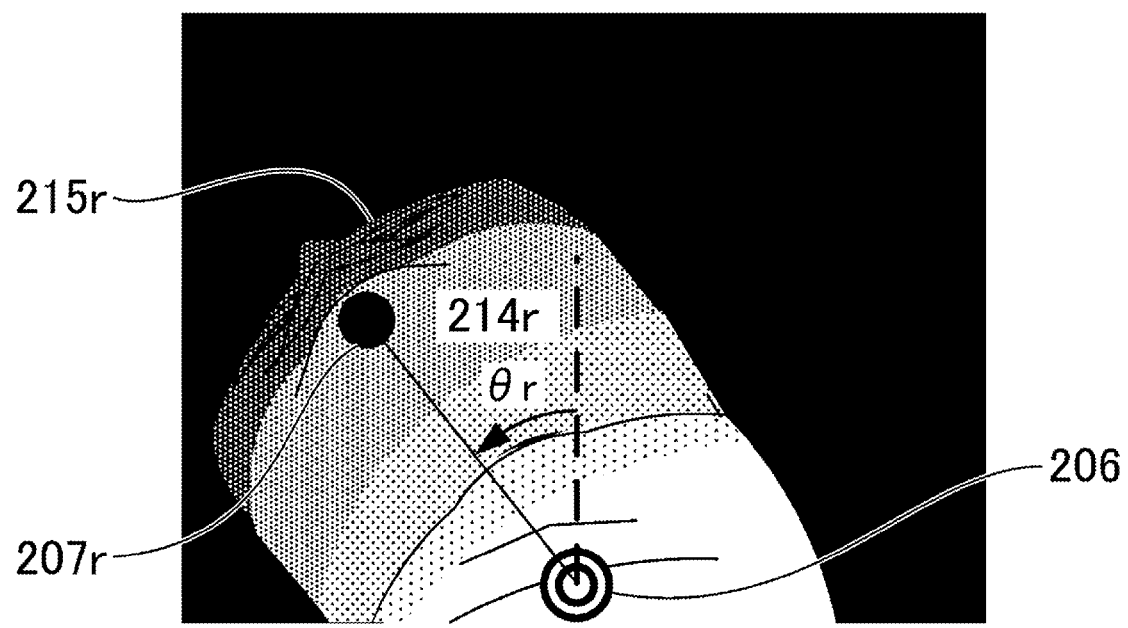
FIG. 8I is a diagram in which the double circle and black dot symbols, respectively indicating the neck base portion position and the position of the chin tip portion, are overlaid on FIG. 8H.

For example, FIGS. 8H and 8I illustrate the change when the face is directed in the right direction.

FIG. 8H is a diagram illustrating a differential picture computed by the same method as in FIG. 8E, when the face of the user is directed in the right direction. FIG. 8I is a diagram in which the double circle and black dot symbols, respectively indicating the neck base portion position 206 that is the center position of neck movement and a chin tip portion position 207r, are overlaid on FIG. 8H.

The user has turned to face the right, and accordingly the region 214 moves to a region 214r illustrated in FIG. 8I, which is to the left direction as viewed upward from the shooting and detecting unit 10 side. The region 215 that corresponds to the face lower portion including the lips in the face 204 also moves to a region 215r, which is to the left direction as viewed upward from the shooting and detecting unit 10 side.

Accordingly, the general control CPU 101 distinguishes the region 214r on the near side from the region 215r where the light intensity rapidly weakens as being the chin tip portion region. Further, the general control CPU 101 calculates (extracts) the position that is at the lateral center of the region 214r and that is farthest from the neck base portion position 206 (the position indicated by the black dot in FIG. 8I) as the chin tip portion position 207r.

Thereafter, the general control CPU 101 finds a movement angle θr indicating how far the chin tip portion position 207r in FIG. 8I has moved in the right direction from the chin tip portion position 207 in CHART 1 in FIG. 8G, turning centered on the neck base portion position 206. The movement angle θr is the angle of the face of the user in the lateral direction, as illustrated in FIG. 8I.

In step S210, the infrared detection processing device 27 of the facial direction detecting unit 20 (three-dimensional detecting sensor) detects the chin tip portion position and the lateral direction angle of the face of the user by the above method.

Next, detection of the face facing in the upward direction will be described.

Figure 10B:
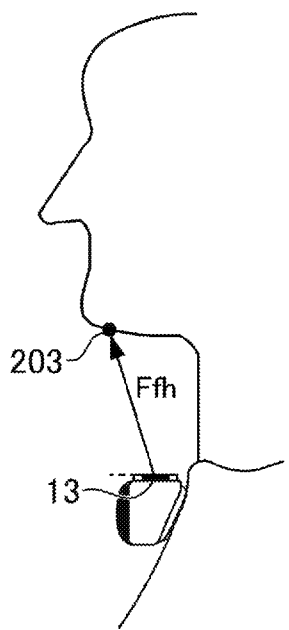
Figure 10C:
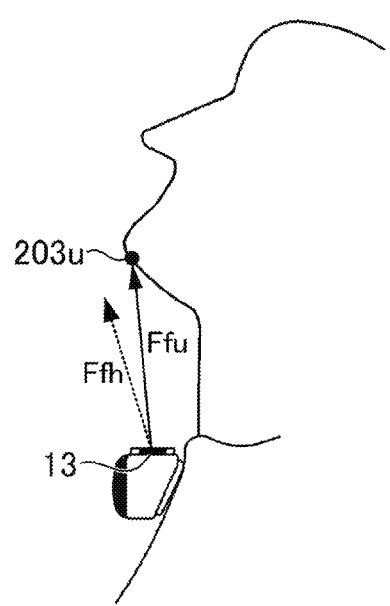

FIG. 10B is a diagram illustrating the face of the user directed in the horizontal direction, and FIG. 10C is a diagram illustrating the face of the user directed 330 upward from the horizontal direction.

In FIG. 10B, the distance from the facial direction detection window 13 to the chin tip portion 203 is denoted by Ffh, and in FIG. 10C, the distance from the facial direction detection window 13 to a chin tip portion 203u is denoted by Ffu.

As illustrated in FIG. 10C, the chin tip portion 203u moves upward along with the face, and it can be understood that Ffu is a longer distance than Ffh.

Figure 8J:
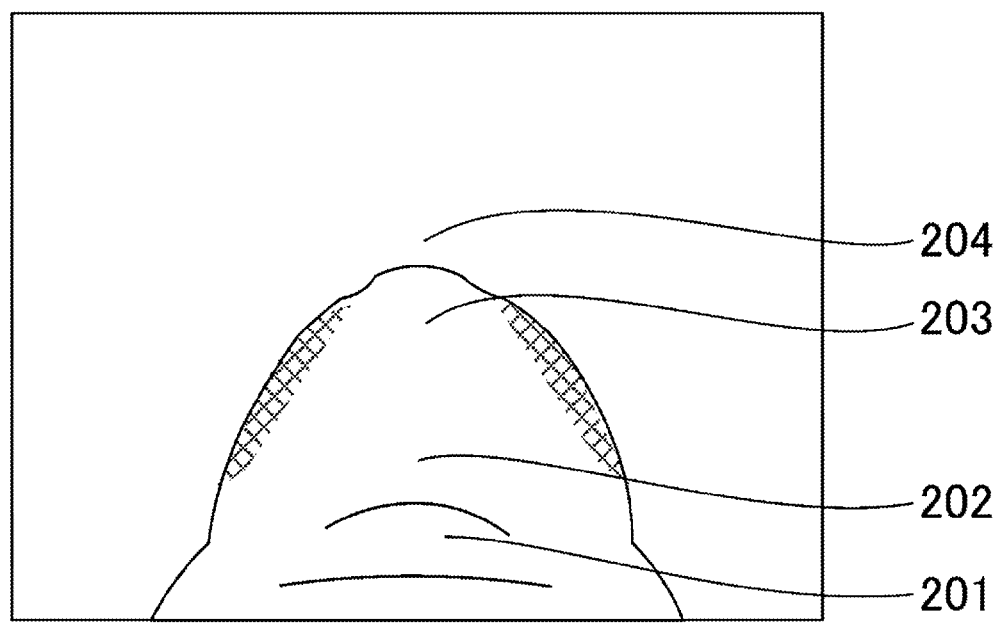
FIG. 8J is a diagram illustrating a picture of the user as seen from the facial direction detection window, in a case in which the face of the user is directed 33° upward from a horizontal direction.

FIG. 8J is a diagram illustrating a picture of the user as seen from the facial direction detection window 13 when the face of the user is directed 330 upward from the horizontal direction. As illustrated in FIG. 10C, since the user is facing upward, the face 204 including the lips and nose is not visible from the facial direction detection window 13, and only as far as the chin tip portion 203 is visible. FIG. 8K illustrates the distribution of light intensity of the reflected light 25 when the user is illuminated by the infrared light 23 at this time. FIG. 8K is a diagram illustrating a picture of the user in which the double circle and black dot symbols, respectively indicating the neck base portion position 206 and a chin tip portion position 207u are overlaid on a differential picture computed by the same method as in FIG. 8E.

Six regions 211u to 216u corresponding to the light intensity in FIG. 8K are regions that are the same as the light intensity regions as in FIG. 8F, with "u" appended thereto. The light intensity of the chin tip portion 203 of the user is the intermediate gray region 214 in FIG. 8F, it can be understood from FIG. 8K that the light intensity of the chin tip portion 203 shifts to the gray side and is in the somewhat dark gray region 215u. In this way, as a result of Ffu being a longer distance than Ffh as illustrated in FIG. 10C, the infrared detection processing device 27 can detect that the light intensity of the reflected light 25 from the chin tip portion 203 of the user has weakened in inverse proportion to the distance squared.

Next, detection of the face facing in the downward direction will be described.

Figure 10D:
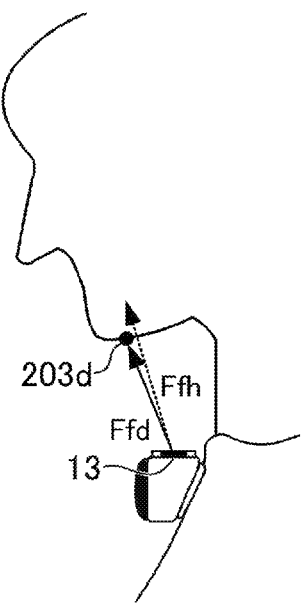

FIG. 10D is a diagram illustrating the face of the user directed 220 downward from the horizontal direction.

In FIG. 10D, a distance from the facial direction detection window 13 to a chin tip portion 203d is denoted by Ffd.

As illustrated in FIG. 10D, the chin tip portion 203d also moves downward along with the face, and it can be understood that Ffd is a shorter distance than Ffh, and that the light intensity of the reflected light 25 from the chin tip portion 203 is stronger.

Returning to FIG. 7C, in step S211, the general control CPU 101 (distance calculating means) calculates the distance from the chin tip portion to the facial direction detection window 13 from the light intensity at the chin tip portion position, detected by the infrared detection processing device 27 of the facial direction detecting unit 20 (three-dimensional detecting sensor). The angle of the face in the up-down direction is also calculated on the basis thereof.

In step S212, the angles in the lateral direction (first detection direction) of the face, and in the up-down direction (second detection direction) perpendicular thereto, which are respectively acquired in steps S210 and S211, are stored in the primary memory 103 as a three-dimensional observation direction vi of the user (i is an optional sign). For example, an observation direction vo in a case in which the user is observing a center portion to the front is vector information of [0°,0°], since a lateral direction θh is 0° and an up-down direction θv is 0°. Also, an observation direction vr in a case in which the user is observing 45° to the right is vector information of [45°,0°].

Note that in step S211, the angle of the face in the up-down direction is calculated by detecting the distance from the facial direction detection window 13, but this method is not restrictive. For example, angular change may be calculated by comparing the level in change of light intensity of the chin tip portion 203. That is to say, angular change of the chin portion may be calculated on the basis of gradient change of a gradient CDu of reflected light intensity from the chin base portion 202 to the chin tip portion 203 in CHART 3 in FIG. 8K, with respect to a gradient CDh of reflected light intensity from the chin base portion 202 to the chin tip portion 203 in CHART 2 in FIG. 8G.

FIG. 7D is a flowchart of a subroutine for recording direction and range deciding processing of step S300 in FIG. 7A. Before describing this processing in detail, an ultrawide angle picture that is the object of decision regarding recording direction and recording range in the present embodiment will be described with reference to FIG. 11A.

The camera main unit 1 according to the present embodiment achieves obtaining a picture of the observation direction by the shooting unit 40 performing image-capturing of an ultrawide angle picture of the vicinity of the shooting and detecting unit 10 using the image-capturing lens 16 that is an ultrawide angle lens, and performing clipping of a part thereof.

Figure 11A:
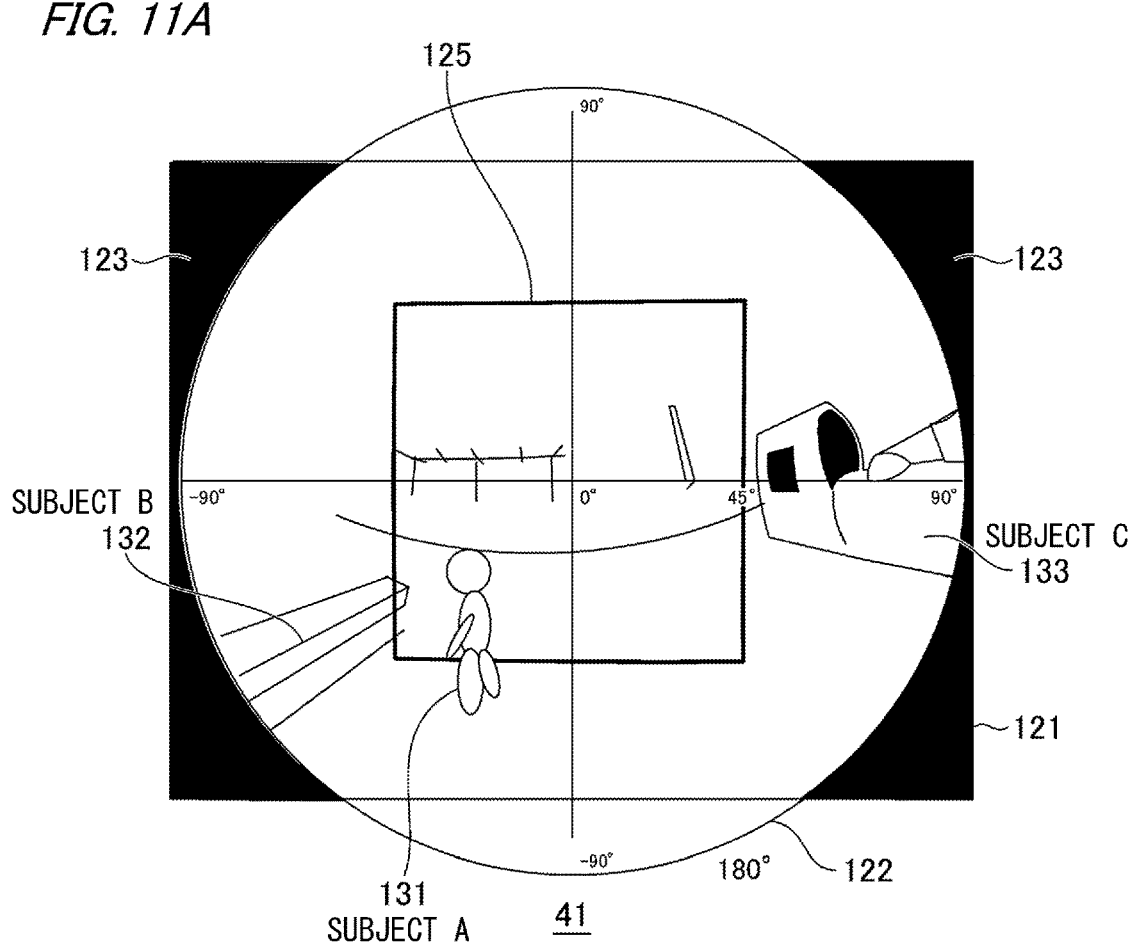
FIG. 11A is a diagram illustrating an aiming field of view in an ultrawide angle picture that is image-captured by a shooting unit of the camera main unit, in a case in which the user is facing toward the front.

FIG. 11A is a diagram illustrating an aiming field of view 125 in an ultrawide angle picture that is image-captured by the shooting unit 40, in a case in which the user is facing toward the front.

As illustrated in FIG. 11A, a pixel region 121 of the solid-state image-capturing device 42 that is capable of image-capturing is a rectangular region. Also, an effective projection portion 122 (predetermined region) is a region in which a circular hemispherical picture that is fisheye-projected on the solid-state image-capturing device 42 by the image-capturing lens 16, is displayed. Note that the image-capturing lens 16 is adjusted such that the center of the pixel region 121 and the center of the effective projection portion 122 agree.

The outermost perimeter of the effective projection portion 122, which is circular in form, indicates the position of 1800 in field-of-view (FoV) angle. In a case in which the user is looking at the center in the horizontal and vertical directions, the aiming field of view 125, which is the region that is image-captured and recorded, is 90°, which is half the angle from the center of the effective projection portion 122. Note that light further on an outer side of the effective projection portion 122 can be introduced to the image-capturing lens 16 according to the present embodiment, and light to around a maximum of around 1920 in FoV angle can be fisheye-projected onto the solid-state image-capturing device 42. Note however, that when the effective projection portion 122 is exceeded, optical performance markedly deteriorates, such as extreme deterioration in resolution, loss in light quantity, increased distortion, and so forth. Accordingly, an example of clipping only within the picture projected on the pixel region 121 (hereinafter referred to simply as "ultrawide angle picture") out of the hemispherical image displayed in the effective projection portion 122 to obtain a picture in the observation direction as a recording region will be described in the present embodiment.

Note that the size of the effective projection portion 122 in the up-down direction is larger than the size of the short sides of the pixel region 121, and accordingly the picture at the upper and lower ends of the effective projection portion 122 extends outside from the pixel region 121 in the present embodiment, but this is not restrictive. For example, a design may be made in which the configuration of the image-capturing lens 16 is changed such that the entire effective projection portion 122 fits within the pixel region 121.

Ineffective pixel regions 123 are pixel regions of the pixel region 121 that are not included in the effective projection portion 122.

The aiming field of view 125 is a region indicating a range for clipping the ultrawide angle picture to obtain the picture in the observation direction of the user, and is defined by lateral and up-down angle of view (45°, FoV angle 90° here) set in advance, centered on the observation direction. In the example in FIG. 11A, the user is facing the front, and accordingly the center of the aiming field of view 125 is the observation direction vo that is the center of the effective projection portion 122.

There are a subject A 131 that is a child, a subject B 132 that is stairs the subject A that is a child is going to climb, and a subject C 133 that is an outdoor playset shaped like a steam locomotive, in the ultrawide angle picture illustrated in FIG. 11A.

Next, the recording direction and range deciding processing in step S300, which is executed to obtain the picture in the observation direction from the ultrawide angle picture described with reference to FIG. 11A above, is shown in FIG. 7D. This processing will be described with reference to FIGS. 12A to 12G, which are specific examples of the aiming field of view 125.

In step S301, the angle-of-view settings value ang set in advances is acquired by being read out from the primary memory 103.

In the present embodiment, all angles of view that can be used by the image clipping and developing processing unit 50 for clipping the ultrawide angle image to obtain the picture in the observation direction, which are 45°, 90°, 110°, and 130°, are saved as angle-of-view settings values ang in the built-in nonvolatile memory 102. Also, one of the angle-of-view settings values ang saved in the built-in nonvolatile memory 102 is set in one of steps S103, S106, and S108, and is saved in the primary memory 103.

Also, in step S301, the observation direction vi decided in step S212 is decided as the recording direction, and a picture of the aiming field of view 125, obtained by clipping the ultrawide angle image by the angle-of-view settings value ang acquired above, centered on this observation direction vi, is saved in the primary memory 103.

For example, in a case in which the angle-of-view settings value ang is 90° and the observation direction vo (vector information [0°,0° ]) is detected in the facial direction detection processing (FIG. 7C), a range of 45° right and left, and 45° up and down, with a center O of the effective projection portion 122 as the center thereof, is set as the aiming field of view 125 (FIG. 11A). That is to say, the general control CPU 101 sets the angle of the facial direction detected by the facial direction detecting unit 20 to the observation direction vi that is vector information indicating the relative position as to the ultrawide angle picture.

Now, in the case of observation direction vo, the effects of optical distortion by the image-capturing lens 16 are negligible, and accordingly the shape of the aiming field of view 125 that is set is the shape of an aiming field of view 125o (FIG. 12A) following later-described distortion transform in step S303, with no change. Hereinafter in a case of observation direction vi, the aiming field of view 125 following distortion transform will be referred to as "aiming field of view 125i".

Next, in step S302, the image stabilization level set in advance is acquired by reading out from the primary memory 103.

In the present embodiment, the image stabilization level is set in one of the steps S103, S106, and S108, as described above, and saved in the primary memory 103.

Also, in step S302, an image-stabilization reserve pixel count Pis is set on the basis of the image stabilization level acquired above.

In image stabilization processing, the amount of blurring of the shooting and detecting unit 10 is tracked, and a picture tracking the picture in the opposite direction from the blurring direction is acquired. Accordingly, in the present embodiment, a reserve region necessary for image stabilization is provided on a perimeter of the aiming field of view 125i.

Also, in the present embodiment, a table for holding the values of the image-stabilization reserve pixel count Pis associated with each of the image stabilization levels is stored in the built-in nonvolatile memory 102. For example, in a case in which the image stabilization level is "medium", a reserve pixel region of 100 pixels, which is the image-stabilization reserve pixel count Pis read out from the above-described table, is set as the reserve region.

Figure 12A:
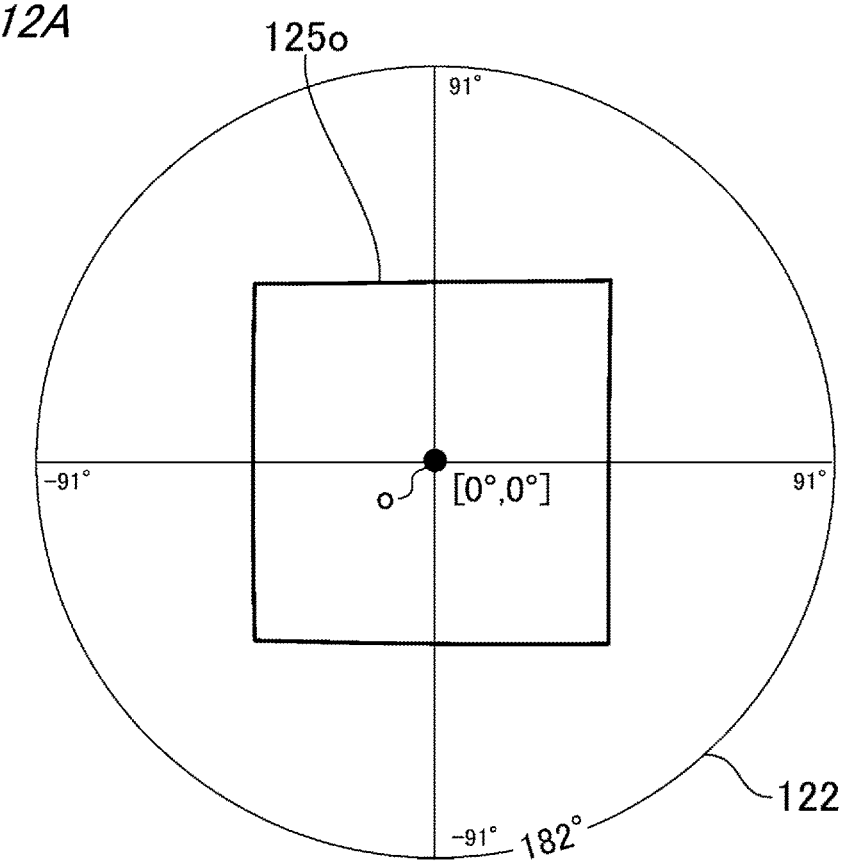
FIG. 12A is a diagram illustrating an example of an aiming field of view in an ultrawide angle picture.
Figure 12B:
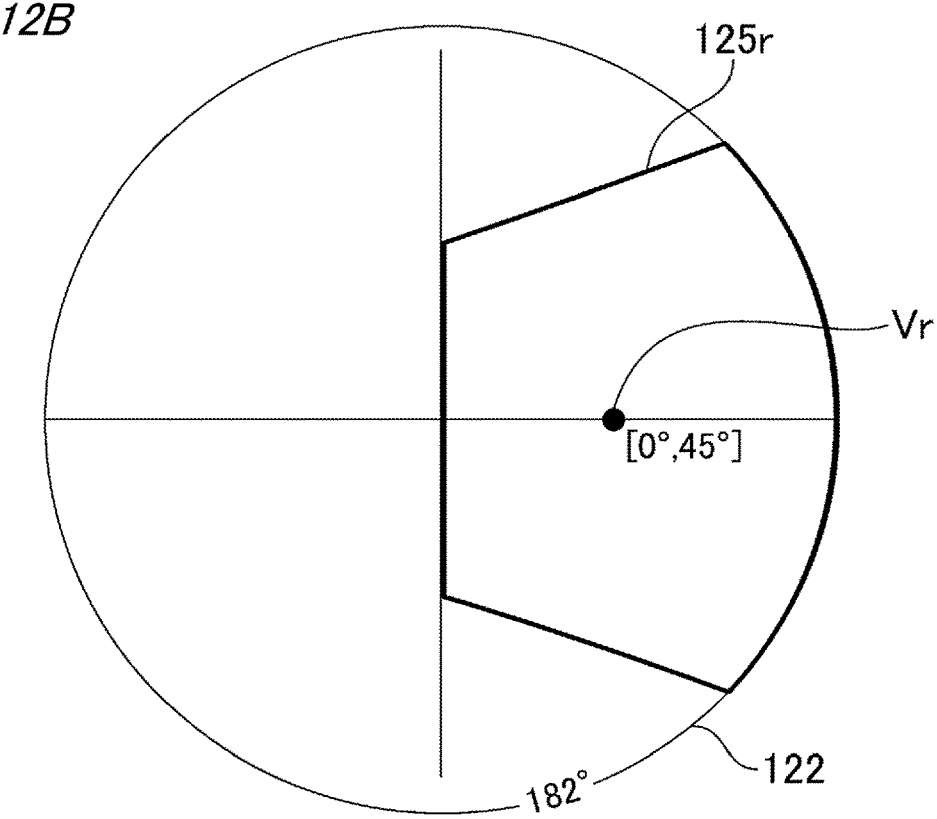
FIG. 12B is a diagram illustrating an example of an aiming field of view in the ultrawide angle picture, in which the angle of view settings value is the same as that in FIG. 12A, but an observation direction is different.
Figure 12C:
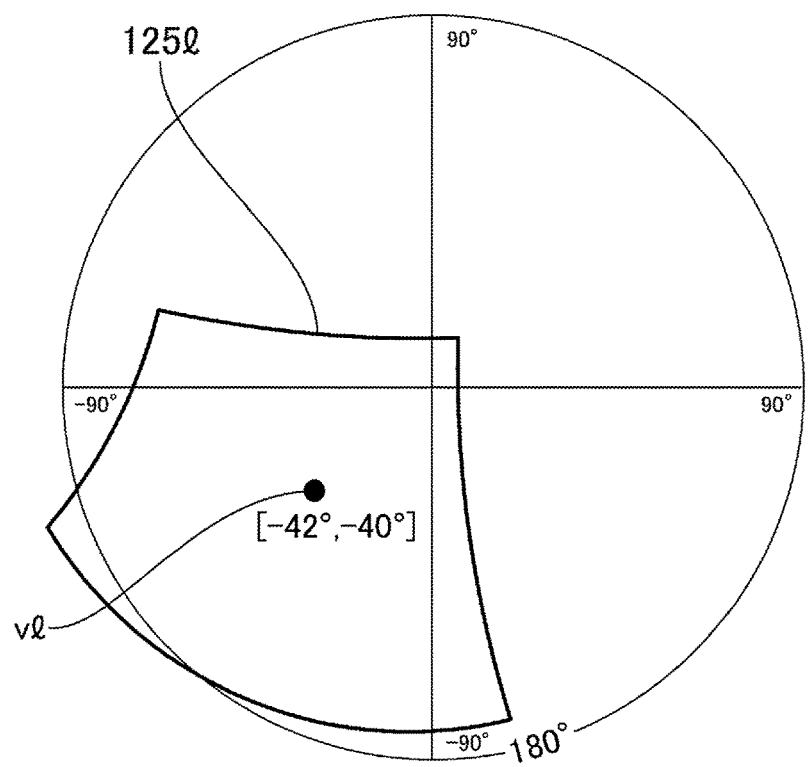
FIG. 12C is a diagram illustrating another example of an aiming field of view in the ultrawide angle picture, in which the angle of view settings value is the same as that in FIG. 12A, but the observation direction is different.
Figure 12D:
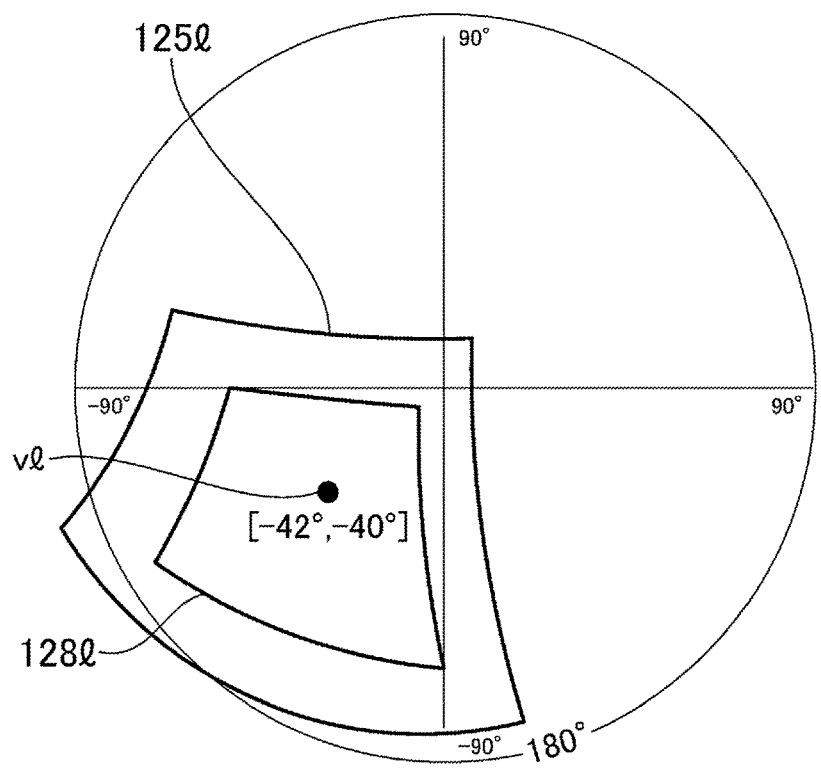
FIG. 12D is a diagram illustrating an example of an aiming field of view in the ultrawide angle picture, in which the observation direction is the same as that in FIG. 12C, but the angle of view settings value is smaller.
Figure 12E:
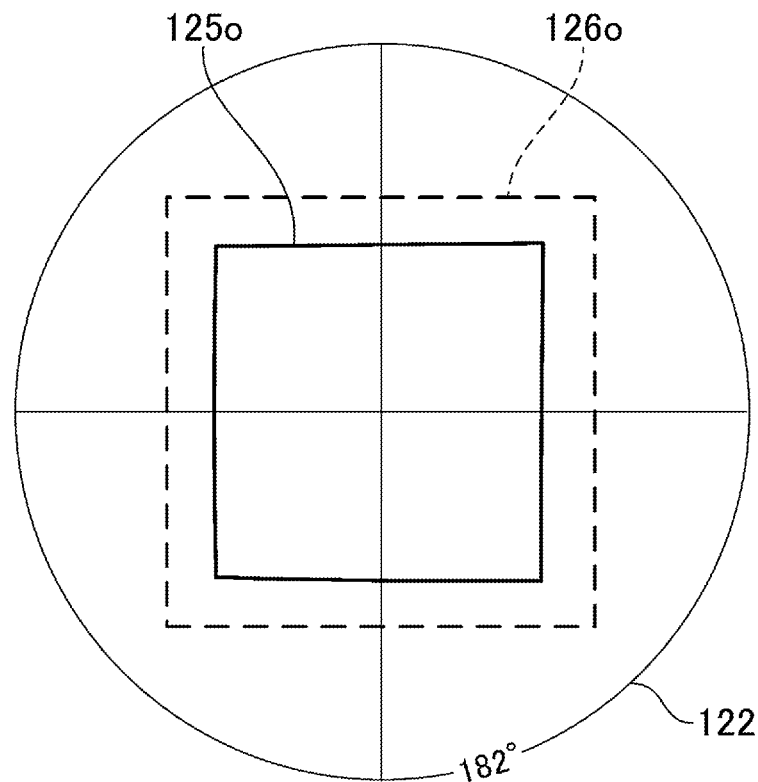
FIG. 12E is a diagram illustrating an example of imparting a reserve region to a perimeter of the aiming field of view illustrated in FIG. 12A.

FIG. 12E is a diagram illustrating an example of imparting a reserve region to the perimeter of the aiming field of view 125o illustrated in FIG. 12A. Description will be made here regarding a case in which the image stabilization level is "medium", i.e., the image-stabilization reserve pixel count Pis is 100 pixels.

A dotted line portion illustrated in FIG. 12E, which is the 100 pixels of leeway (reserve region), i.e., the image-stabilization reserve pixel count Pis imparted to each of the top and bottom, and the right and left, of the aiming field of view 125o, is an image-stabilization reserve pixel frame 126o.

Description made with reference to FIGS. 12A and 12E regarding a case in which the observation direction vi agrees with the center O of the effective projection portion 122 (center of the optical axis of the image-capturing lens 16), for the sake of simplification of description. However, in a case in which the observation direction vi is at a peripheral portion of the effective projection portion 122, there will be effects of optical distortion, and accordingly transform needs to be performed, such as described in the following steps.

In step S303, the shape of the aiming field of view 125 set in step S301 is corrected (distortion transform) taking into consideration the observation direction vi and the optical characteristics of the image-capturing lens 16, thereby generating an aiming field of view 125i. In the same way, the image-stabilization reserve pixel count Pis set in step S302 is also corrected taking into consideration the observation direction vi and the optical characteristics of the image-capturing lens 16.

For example, a case will be assumed in which the angle-of-view settings value ang is 90°, and the user is observing 45° to the right from the center o. In this case, the observation direction vi decided in step S212 is observation direction yr (vector information [45°,0° ]), and with the observation direction yr as the center, a range 45° to the right and left, and 45° up and down, is the aiming field of view 125. However, the aiming field of view 125 is corrected to an aiming field of view 125r illustrated in FIG. 12B, taking into consideration the optical characteristics of the image-capturing lens 16.

As illustrated in FIG. 12B, the aiming field of view 125r becomes wider the closer to the peripheral portion of the effective projection portion 122, and also, the position of the observation direction yr is slightly toward an inner side from the center of the aiming field of view 125r. This is because an optical design close to that of a stereographic projection fisheye lens is made for the image-capturing lens 16 in the present embodiment. Note that this relation changes when the image-capturing lens 16 is designed as an equidistance projection fisheye lens, an equisolid angle projection fisheye lens, an orthographic projection fisheye lens, or the like, and accordingly correction matching the optical characteristics thereof is performed on the aiming field of view 125.

Figure 12F:
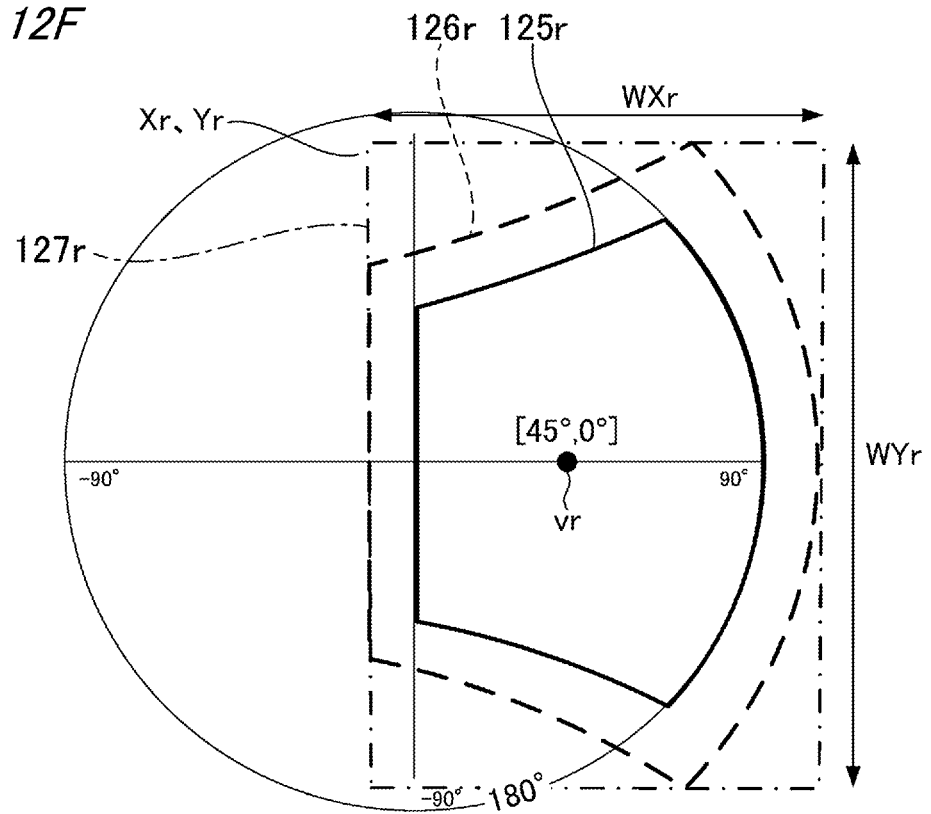
FIG. 12F is a diagram illustrating an example of imparting a reserve region of an image stabilization level, which is the same as that of the reserve region in FIG. 12E, to the perimeter of the aiming field of view illustrated in FIG. 12B.

FIG. 12F is a diagram illustrating an example of imparting a reserve region of image stabilization level "medium", which is the same image stabilization level as the reserve region in FIG. 12E, at a perimeter of the aiming field of view 125r illustrated in FIG. 12B.

In the image-stabilization reserve pixel frame 126o (FIG. 12E), the 100 pixels of leeway that is the image-stabilization reserve pixel count Pis is imparted to each of the top and bottom, and the right and left, of the aiming field of view 125o. Conversely, in an image-stabilization reserve pixel frame 126r (FIG. 12F), the image-stabilization reserve pixel count Pis is corrected, and increases the closer to the peripheral portion of the effective projection portion 122.

In this way, the shape of the reserve region necessary for image stabilization that is provided on the perimeter of the aiming field of view 125r is also subjected to a greater correction amount the closer to the peripheral portion of the effective projection portion 122, in the same way as with the shape of the aiming field of view 125r, as indicated by the image-stabilization reserve pixel frame 126r in FIG. 12F. This also is because optical design close to that of a stereographic projection fisheye lens is made for the image-capturing lens 16 in the present embodiment. Note that this relation changes when the image-capturing lens 16 is designed as an equidistance projection fisheye lens, an equisolid angle projection fisheye lens, an orthographic projection fisheye lens, or the like, and accordingly correction that matches the optical characteristics thereof is performed on the image-stabilization reserve pixel frame 126r.

The processing of sequentially switching the shape of the aiming field of view 125 and the reserve region, taking into consideration the optical characteristics of the image-capturing lens 16, which is executed in step S303, is complicated processing. Accordingly, in the present embodiment, the processing of step S303 is executed using a table that holds the aiming field of view 125i for each observation direction vi, and the shape of the reserve region thereof, which is in the built-in nonvolatile memory 102. Note that depending on the optical design of the image-capturing lens 16 mentioned earlier, a computation expression may be kept in the general control CPU 101, with optical distortion values being calculated by this computation expression.

In step S304, the position and the size of a picture recording frame are calculated.

As described above, in step S303, a reserve region necessary for image stabilization is provided on the perimeter of the aiming field of view 125i, and is calculated as the image-stabilization reserve pixel frame 126i. However, depending on the position of the observation direction vi, the shape becomes quite unusual, like the image-stabilization reserve pixel frame 126r, for example.

The general control CPU 101 is capable of performing developing processing on just a range of such an unusual shape, and clipping the picture. However, using a picture that is not rectangular when recording as picture data in step S600 or transferring to the display device 800 in step S700 is not commonly performed. Accordingly, in step S304, the position and the size of a picture recording frame 127i that is rectangular in shape, which envelops the entirety of this image-stabilization reserve pixel frame 126i, are calculated.

In FIG. 12F, a picture recording frame 127r, indicated by the chain line calculated in step S304 with respect to the image-stabilization reserve pixel frame 126r, is illustrated.

In step S305, the position and the size of the picture recording frame 127i calculated in step S304 are recorded in the primary memory 103.

In the present embodiment, coordinates Xi, Yi of the upper left of the picture recording frame 127i in the ultra-wide angle picture are recorded as the position of the picture recording frame 127*i*, and a lateral width WXi and a vertical width WYi of the picture recording frame 127*i* from the coordinates Xi, Yi are recorded as the size of the picture recording frame 127*i*. For example, coordinates Xr, Yr and lateral width WXr and vertical width WYr illustrated in FIG. 12F are recorded in step S305 with respect to the picture recording frame 127*r* illustrated in FIG. 12F. Note that the coordinates Xi, Yi are XY coordinates with a predetermined reference point, specifically, the optical center of the image-capturing lens 16, as the point of origin.

Once the image-stabilization reserve pixel frame 126*i* and the picture recording frame 127*i* are decided in this way, the flow exits the subroutine for step S300 shown in FIG. 7D.

Note that in the description so far, description has been made using observation directions including horizontal 0°, i.e., observation direction vo (vector information [0°,0°]) and observation direction yr (vector information [45°,0°]) as examples of the observation direction vi, for the sake of simplification of the complicated description of optical distortion transform. However, in reality, the observation direction vi of the user will be in various directions. Accordingly, the recording range developing processing executed in such cases will be described below.

For example, an aiming field of view 125*l* in a case of an angle-of-view settings value ang of 90° and an observation direction vl [−42°,−40°] will be as illustrated in FIG. 12C.

Figure 12G:
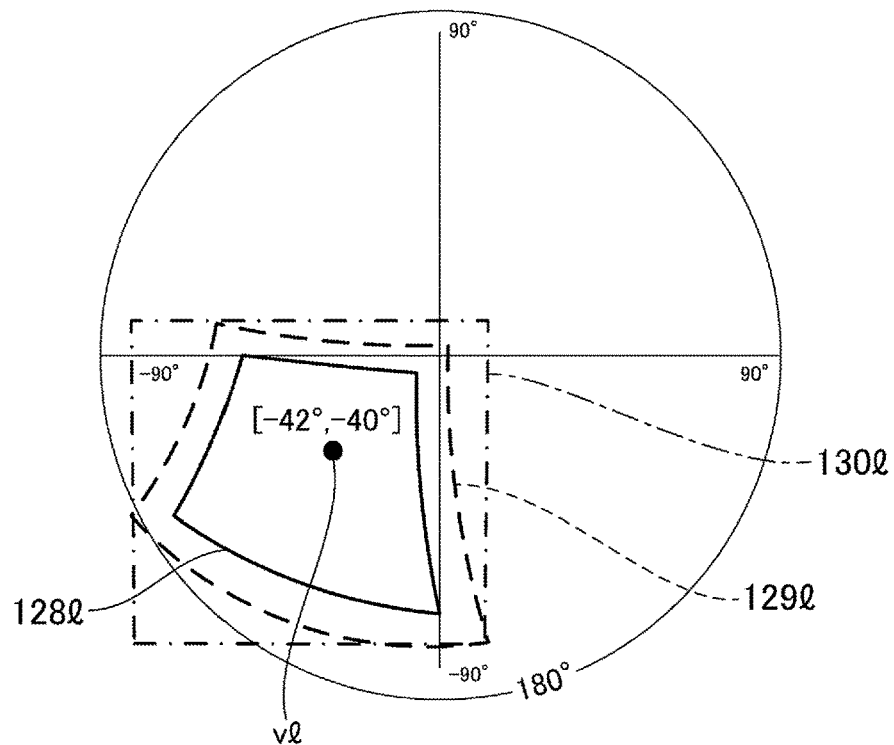
FIG. 12G is a diagram illustrating an example of imparting a reserve region of an image stabilization level, which is the same as that of the reserve region in FIG. 12E, to the perimeter of the aiming field of view illustrated in FIG. 12D.

Also, even when the observation direction vl (vector information [−42°,−40°]) is the same as the aiming field of view 125*l*, in a case in which the angle-of-view settings value ang is 45°, the aiming field of view will be an aiming field of view 128*l* that is one size smaller than the aiming field of view 125*l*, as illustrated in FIG. 12D. Further, an image stabilization reserve pixel frame 129I and a picture recording frame 130I, such as illustrated in FIG. 12G, are set for the aiming field of view 128*l*.

Step S400 is basic operations of image-capturing, and since a common sequence of the shooting unit 40 is used, details will be left to other literature and description will be omitted here. Note that in the preset embodiment, the image-capturing signal processing circuit 43 in the shooting unit 40 also performs processing of converting signals in unique output formats (examples of such standards include Mobile Industry Processor Interface (MIPI) and Scalable Low Voltage Signaling (SLVS)) that are output from the solid-state image-capturing device 42 into image-capturing data of a common sensor readout format.

Note that in a case in which the mode selected by the image-capturing mode switch 12 is the moving image mode, the shooting unit 40 starts recording in accordance with the start switch 14 being pressed. Thereafter, the recording ends when the stop switch 15 is pressed. Conversely, in a case in which the mode selected by the image-capturing mode switch 12 is the still image mode, the shooting unit 40 performs image-capturing of a still image each time the start switch 14 is pressed.

Figure 7E:
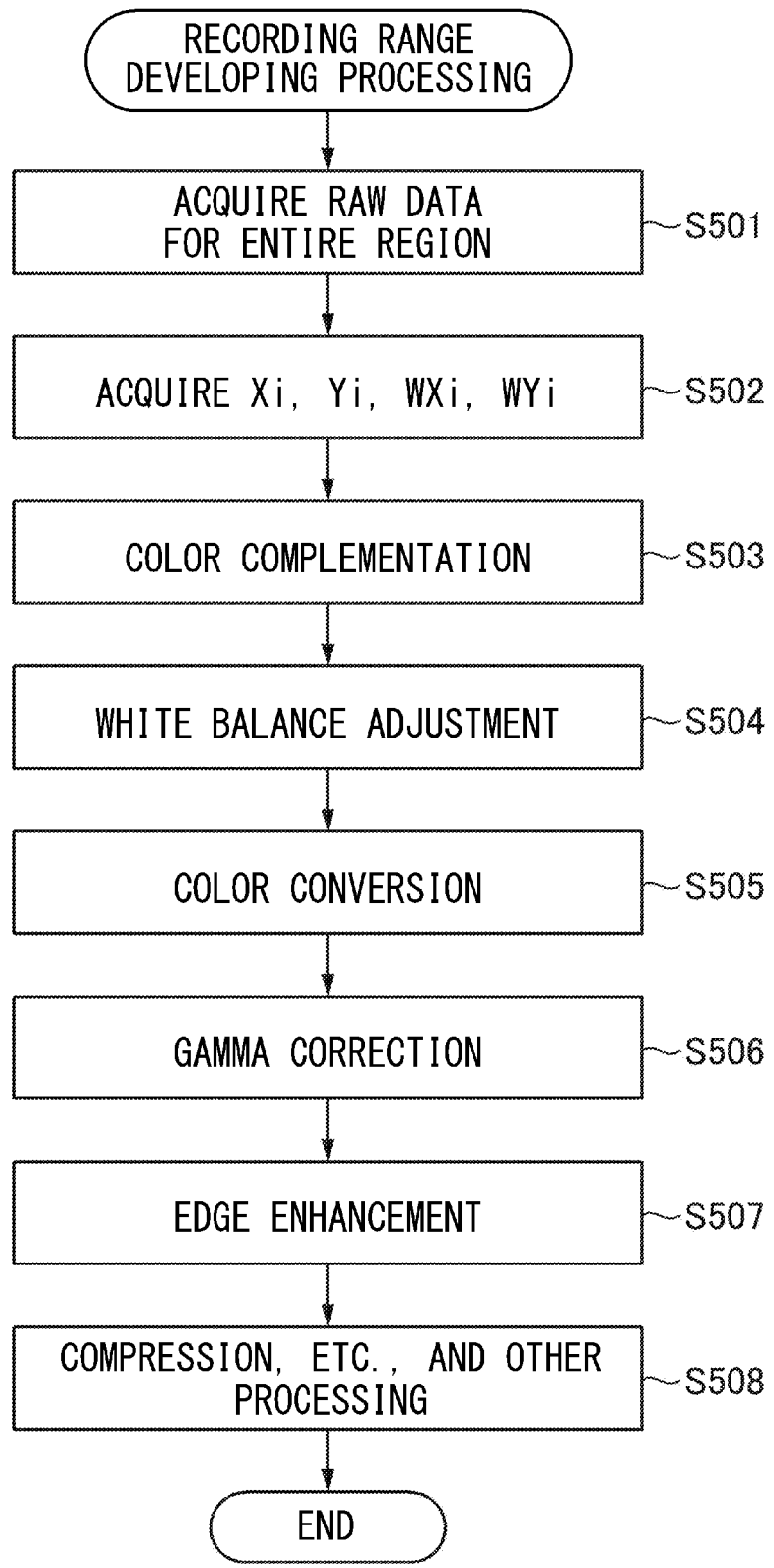
FIG. 7E is a flowchart of a subroutine for recording range developing processing of step S500 in FIG. 7A according to the first embodiment.

FIG. 7E is a flowchart of a subroutine for recording range developing processing of step S500 in FIG. 7A.

In step S501, raw data is acquired for the entire region of the image-capturing data (ultrawide angle picture) generated by the shooting unit 40 in step S400, and is input to a picture intake portion of the general control CPU 101, called a head portion, which is omitted from illustration.

Next, in step S502, clipping is performed to obtain the portion of the picture recording frame 127*i* from the ultrawide angle picture acquired in step S501 on the basis of the coordinates Xi, Yi and the lateral width WXi and vertical width WYi recorded in the primary memory 103 in step S305. After this clipping, crop developing processing (FIG. 7F) that is made up of the steps S503 to S508 executed thereafter is started with respect to only pixels in the image-stabilization reserve pixel frame 126*i*. This enables the computation amount to be markedly reduced as compared to a case of performing developing processing on the entire region of the ultrawide angle picture read in step S501, and computing time and electric power consumption can be reduced.

Figure 7F:
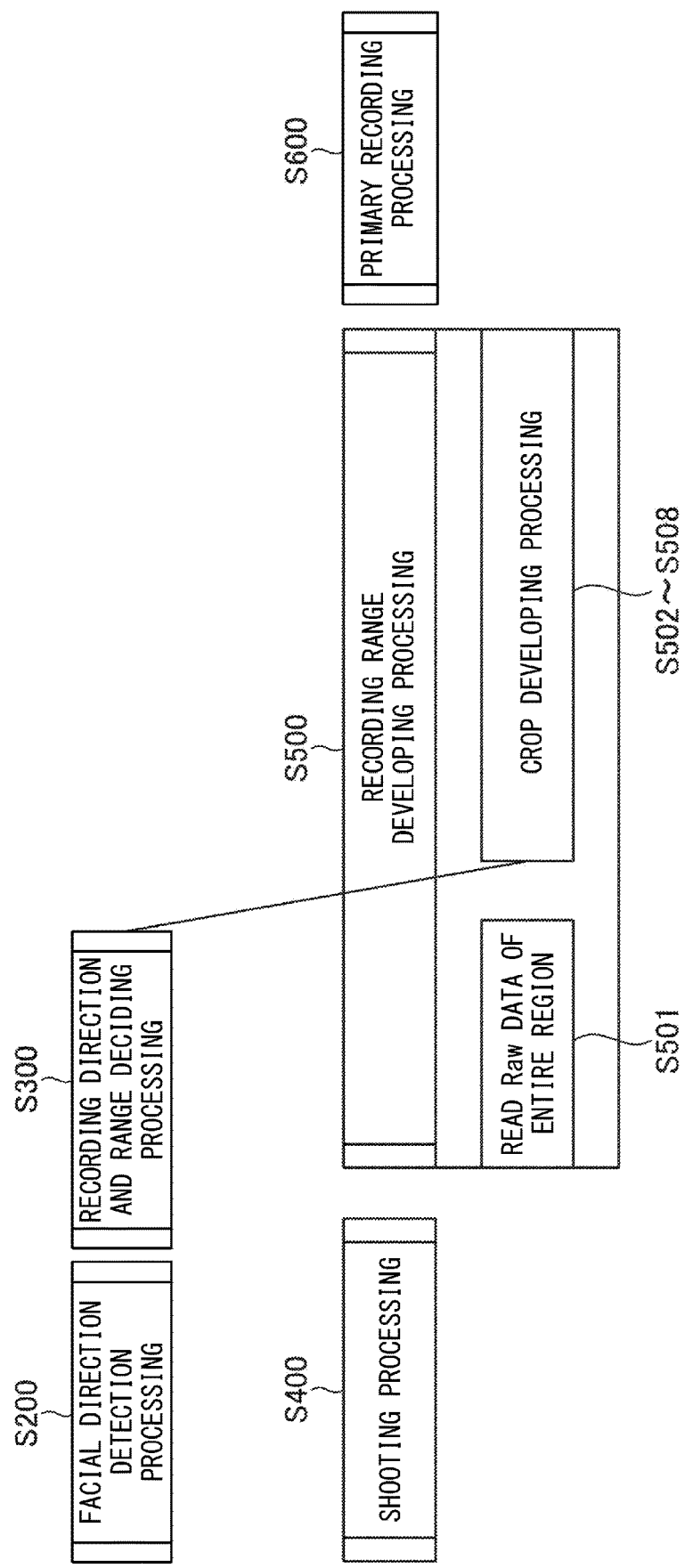
FIG. 7F is a diagram for describing processing of steps S200 to S500 in FIG. 7A in a moving image mode.

Note that in a case in which the mode selected by the image-capturing mode switch 12 is the moving image mode, the processing of steps S200 and S300, and the processing of step S400, are executed in parallel as illustrated in FIG. 7F, at the same framerate as each other or different framerates from each other. That is to say, each time that the entire region of one frame worth of raw data generated by the shooting unit 40 is acquired, crop developing processing is performed on the basis of the coordinates Xi, Yi and the lateral width WXi and vertical width WYi recorded in the primary memory 103 at that point in time.

Upon the crop developing processing being started with respect to pixels in the image-stabilization reserve pixel frame 126*i*, first, color complementation is performed in step S503 to complement color pixel information arrayed according to a Bayer filter array.

Following white balance adjustment being performed in step S504, color conversion is performed in step S505.

In step S506, gamma correction is performed, in which gradients are corrected in accordance with a gamma correction value that is set in advance.

In step S507, edge enhancement is performed in accordance with image size.

In step S508, compression and other processing are performed, thereby converting into a data format capable of primary saving, and following recording thereof in the primary memory 103, the flow exits this subroutine. Details of this data format capable of primary saving will be described later.

Note that the order and presence/absence of processing in the crop developing processing executed in steps S503 to S508 can be performed in accordance with the camera system, and do not limit the present invention.

Also, in a case in which the moving image mode is selected, the processing of steps S200 to S500 is repeatedly executed until recording ends.

According to the present processing, the computation amount can be markedly reduced as compared to a case of performing developing processing on the entire region read in step S501. This enables a microcontroller that is inexpensive and has low electric power consumption to be used as the general control CPU 101. Also, heat generated at the general control CPU 101 can be suppressed, and the life of the batteries 94 can be extended.

Also, in the present embodiment, optical correction processing (step S800 in FIG. 7A) and image stabilization processing (step S900 in FIG. 7A) of the picture are not performed at the camera main unit 1, but rather are performed at the display device control unit 801 following transfer thereof to the display device 800, in order to lighten the control load on the general control CPU 101. Accordingly, if only data of the picture that has been partially clipped from the projected ultrawide angle picture is sent to the display device 800, optical correction processing and image stabilization processing cannot be performed. That is to say, if only data of the picture that has been partially clipped is available, such processing cannot be correctly executed at the display device 800, since there is no position information to be used for substituting into the expression for optical correction processing or to be referenced by the correction table at the time of image stabilization processing. Accordingly, in the present embodiment, not only the data of the picture that has been clipped, but correction data including the information of the position of clipping this picture from the ultrawide angle picture, and so forth, is also transmitted from the camera main unit 1 to the display device 800.

Now, in a case in which the picture that has been clipped is a still image picture, the data of the still image picture and the correction data are in a one-on-one relation, and accordingly even if the data of the still image picture and the correction data are separately transmitted to the display device 800, optical correction processing and image stabilization processing can be correctly performed at the display device 800. Conversely, in a case in which the picture that has been clipped is a moving image picture, and the data of the moving image picture and the correction data are separately transmitted to the display device 800, judging which of the frames of the moving image picture the transmitted correction data corresponds to is difficult. In particular, if the clock rate of the general control CPU 101 in the camera main unit 1 and the clock rate of the display device control unit 801 in the display device 800 are slightly different, synchronization between the general control CPU 101 and the display device control unit 801 will be lost after a few minutes' worth of moving image image-capturing. As a result, problems occur such as the display device control unit 801 correcting a frame to be processed using correction data that is different from the correction data corresponding to the frame to be processed.

Accordingly, in the present embodiment, at the time of transmitting data of a moving image picture that is clipped, from the camera main unit 1 to the display device 800, the correction data thereof is appropriately imparted to the data of the moving image picture. A method thereof will be described below.

Figure 14:
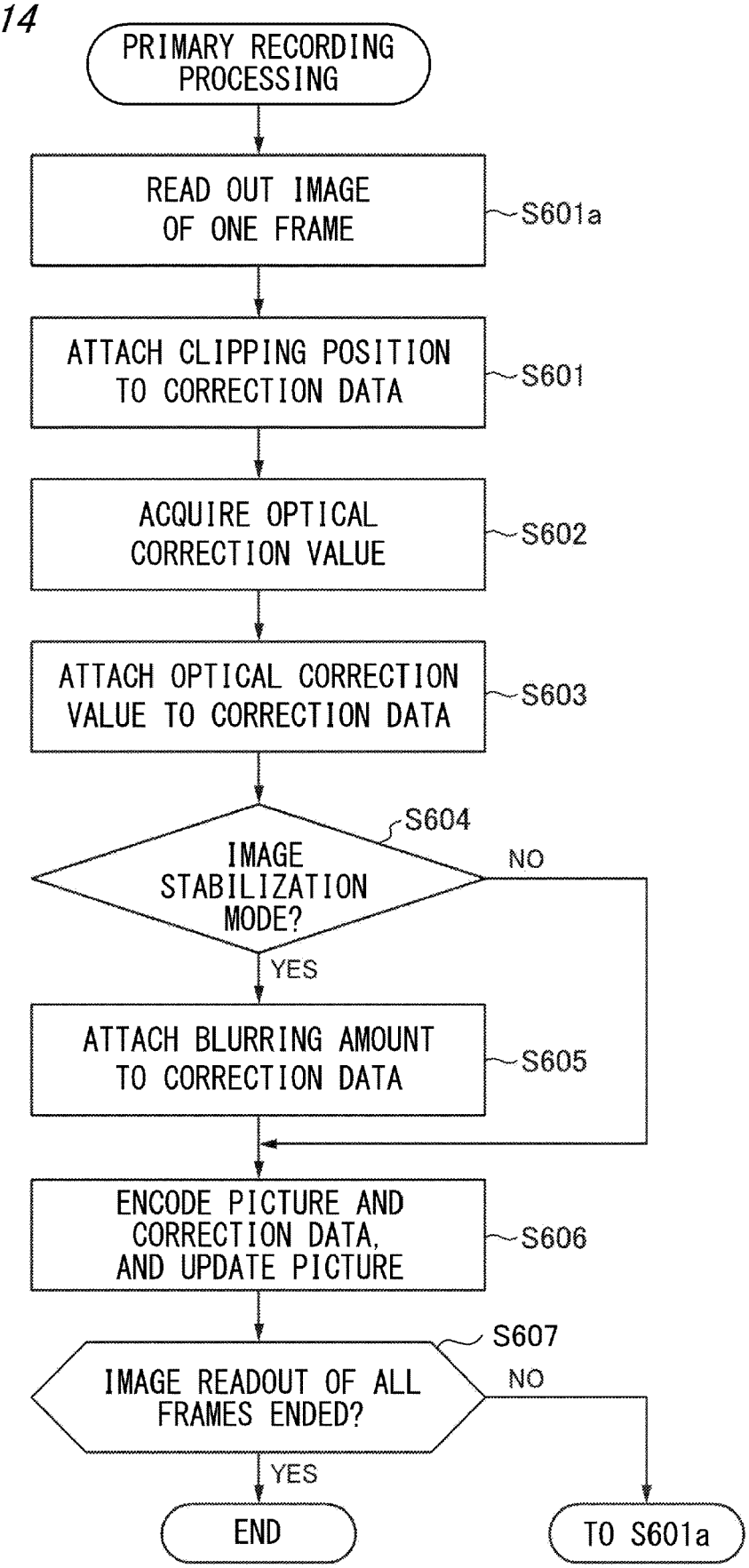
FIG. 14 is a flowchart of a subroutine for primary recording processing of step S600 in FIG. 7A.

FIG. 14 is a flowchart of a subroutine for primary recording processing of step S600 in FIG. 7A. This processing will be described below with reference to FIG. 15. FIG. 14 shows processing in a case in which the mode selected by the image-capturing mode switch 12 is the moving image mode. Note that in a case in which the mode selected by the image-capturing mode switch 12 is the still image mode, this processing starts from the processing of step S601 and ends when the processing of step S606 ends.

In step S601*a*, the general control CPU 101 reads out, from a moving image picture developed in the recording range developing processing (FIG. 7E), an image of one frame that is unprocessed with regard to the processing of steps S601 to S606. Also, the general control CPU 101 generates correction data, which is metadata of the frame that is read out.

In step S601, the general control CPU 101 attaches information of the clipping position of the image of the frame read out in step S600 to the correction data. The information attached here is the coordinates Xi, Yi of the picture recording frame 127*i* acquired in step S305. Note that the information attached here may be vector information indicating the observation direction vi.

In step S602, the general control CPU 101 acquire an optical correction value. The optical correction value is the optical distortion value set in step S303. Alternatively, the optical correction value may be a correction value in accordance with lens optical characteristics, such as a relative illuminance correction value, diffraction correction, or the like.

In step S603, the general control CPU 101 attaches the optical correction value used for distortion transform in step S303, which is acquired in step S602, to the correction data.

In step S604, the general control CPU 101 judges whether in the image stabilization mode or not. Specifically, in a case in which the image stabilization mode set in advance is "medium" or "strong", judgment is made of being in the image stabilization mode, and the flow advances to step S605. Conversely, in a case in which the image stabilization mode set in advance is "off", judgment is made of not being in the image stabilization mode, and the flow advances to step S606. Note that the reason why step S605 is skipped in a case in which the image stabilization mode is "off" is to reduce the computation data amount for the general control CPU 101 and the amount of data wirelessly transmitted, which consequently enables electric power conservation and reduced heat generation at the camera main unit 1. While description has been made here regarding reduction of data used for image stabilization processing, data reduction may also be performed regarding relative illuminance correction value, presence/absence of diffraction correction, and so forth, included in the optical correction value acquired in step S602.

Although the image stabilization mode is set in advance by operations performed by the user using the display device 800 in the present embodiment, this may be set as initial settings of the camera main unit 1. Also, in a case of a camera system in which presence/absence of image stabilization is switched after transfer to the display device 800, step S604 is omitted, and the flow advances from step S603 directly to step S605.

In step S605, the general control CPU 101 attaches the image stabilization mode acquired in step S302, and gyro data in the moving image being image-captured associated with the frame read out in step S600 in the primary memory 813, to the correction data.

In step S606, a picture file 1000 (FIG. 15) is updated by data obtained by encoding data of the image of the frame read out in step S600, and the correction data to which various types of data are attached in steps S601 to S605. Note that in a case in which the first frame of the moving image picture is read out in step S601*a*, the picture file 1000 is generated in step S606.

Whether reading out of images of all frames of the moving image picture developed in the recording range developing processing (FIG. 7E) has ended is distinguished in step S607, and if not ended, the flow returns to step S601*a*. Conversely, in a case of the reading having ended, the flow exits this subroutine. The picture file 1000 that is generated is saved in the built-in nonvolatile memory 102. Saving may be performed to not only the primary memory 813 and the built-in nonvolatile memory 102 that are described above, but performed in the large-capacity nonvolatile memory 51 as well. Transfer processing of the picture file 1000 that is generated to the display device 800 (step S700 in FIG. 7A) may be immediately performed, and saved in the primary memory 813 of the display device 800 after transfer thereto.

Now, in the present embodiment, "encoding" refers to integrating picture data and correction data into a single file, but at this time, compression of the picture data, or compression of the integrated picture data and correction data, may be performed.

Figure 15:
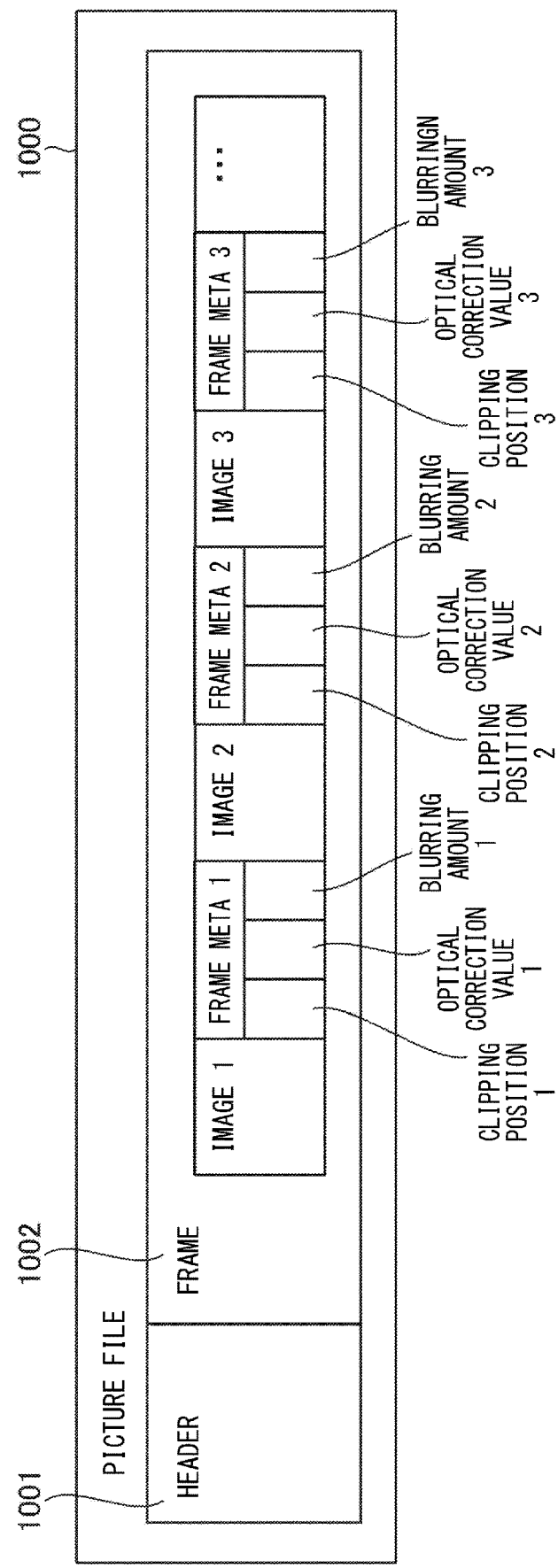
FIG. 15 is a diagram illustrating a data structure of a picture file generated by the primary recording processing.

FIG. 15 is a diagram illustrating a data structure of the picture file 1000.

The picture file 1000 is made up of a header 1001 and a frame 1002. The frame 1002 is made up of frame datasets in which each image of a frame making up the moving image picture, and frame meta corresponding thereto, form a set. That is to say, there is a count of frame datasets in the frame 1002 corresponding to the total count of frames of the moving image picture.

In the present embodiment, the frame meta is information in which are encoded the clipping position (in-picture position information), and correction data in which optical correction value and gyro data are attached as necessary, but is not limited to this. For example, other information may be attached to the frame meta in accordance with the image-capturing mode selected by the image-capturing mode switch 12, or the amount of information of the frame meta may be changed by deleting information in the frame meta, or the like.

An offset value to the frame dataset of each frame, or a top address, is recorded in the header 1001. Alternatively, metadata such as time and size, corresponding to the picture file 1000, may be saved therein.

Thus, in the primary recording processing (FIG. 14), the picture file 1000 in which the frames of the moving image picture developed in the recording range developing processing (FIG. 7E), and metadata thereof, form a set, is transferred to the display device 800. Accordingly, even if the clock rate of the general control CPU 101 in the camera main unit 1 and the clock rate of the display device control unit 801 in the display device 800 are slightly different, the display device control unit 801 can accurately execute correction processing of the moving image picture developed at the camera main unit 1.

Note that in the present embodiment, the optical correction value is included in the frame meta, but the optical correction value may be imparted to the entire picture.

Figure 16:
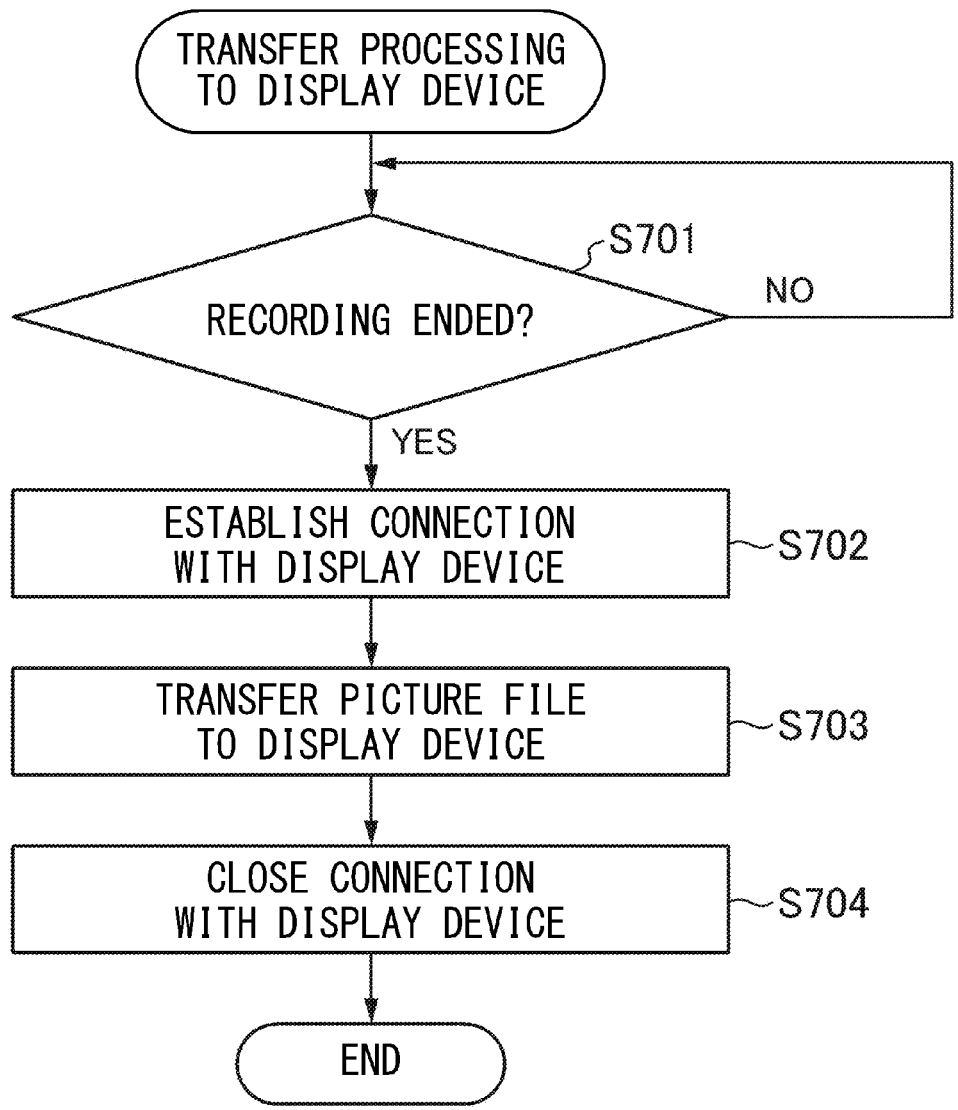
FIG. 16 is a flowchart of a subroutine for transfer processing to the display device of step S700 in FIG. 7A.

FIG. 16 is a flowchart of a subroutine for transfer processing to the display device 800 in step S700 in FIG. 7A. FIG. 16 shows processing in a case in which the mode selected by the image-capturing mode switch 12 is the moving image mode. Note that in a case in which the mode selected by the image-capturing mode switch 12 is the still image mode, this processing starts from the processing of step S702.

In step S701, judgment is made regarding whether recording of the moving image picture by the shooting unit 40 (step S400) has ended, or recording is continuing. In a case in which the moving image picture is being recorded (during moving image image-capturing) here, this is a state in which recording range developing processing for each frame (step S500), and updating of the picture file 1000 (step S606) in the primary recording processing (step S600) are being sequentially performed. The electric power load of wireless transmission is great, and accordingly performing in conjunction with recording necessitates a larger battery capacity for the batteries 94, requires separate heatproofing measures, and so forth. Also, from the perspective of computation capabilities, performing wireless transfer in conjunction with recording increases the computing load, which requires a general control CPU 101 with high specs to be prepared, raising costs. In light of the above, in the present embodiment, the flow advances to step S702 after awaiting recording of the moving image picture to end (YES in step S701), and thereupon establishes a connection with the display device 800. Note however, that in a case in which the camera system according to the preset embodiment has leeway in electric power supplied from the batteries 94, and there is no need for separate heatproofing measures, the display device 800 may be connected thereto in advance, such as at the time of activating the camera main unit 1, prior to starting recording, or the like.

In step S702, a connection is established with the display device 800 via the high-speed wireless unit 72, in order to transfer the picture file 1000 with a great data amount to the display device 800. Note that the small power wireless unit 71 is used for transfer of low-resolution pictures (or pictures) to the display device 800 for confirmation of angle of view, or for exchange of various types of settings values with the display device 800, but is not used for transfer of the picture file 1000 since this would take time for transferring.

In step S703, the picture file 1000 is transferred to the display device 800 via the high-speed wireless unit 72, and at the potin of ending transfer, the flow advances to step S704. After closing the connection to the display device 800, the flow exits this subroutine.

Although a case has been described so far in which a single picture file containing images of all frames of a single moving image picture is transferred, a plurality of picture files segmented in time increments may be transferred in a case in which the moving image picture is long and spans several minutes. Even in a case of transferring a single moving image picture to the display device 800 as a plurality of picture files, employing the data structure illustrated in FIG. 15 for the picture file enables the moving image picture to be corrected at the display device 800 with no timing discrepancy with regard to the correction data.

Figure 17:
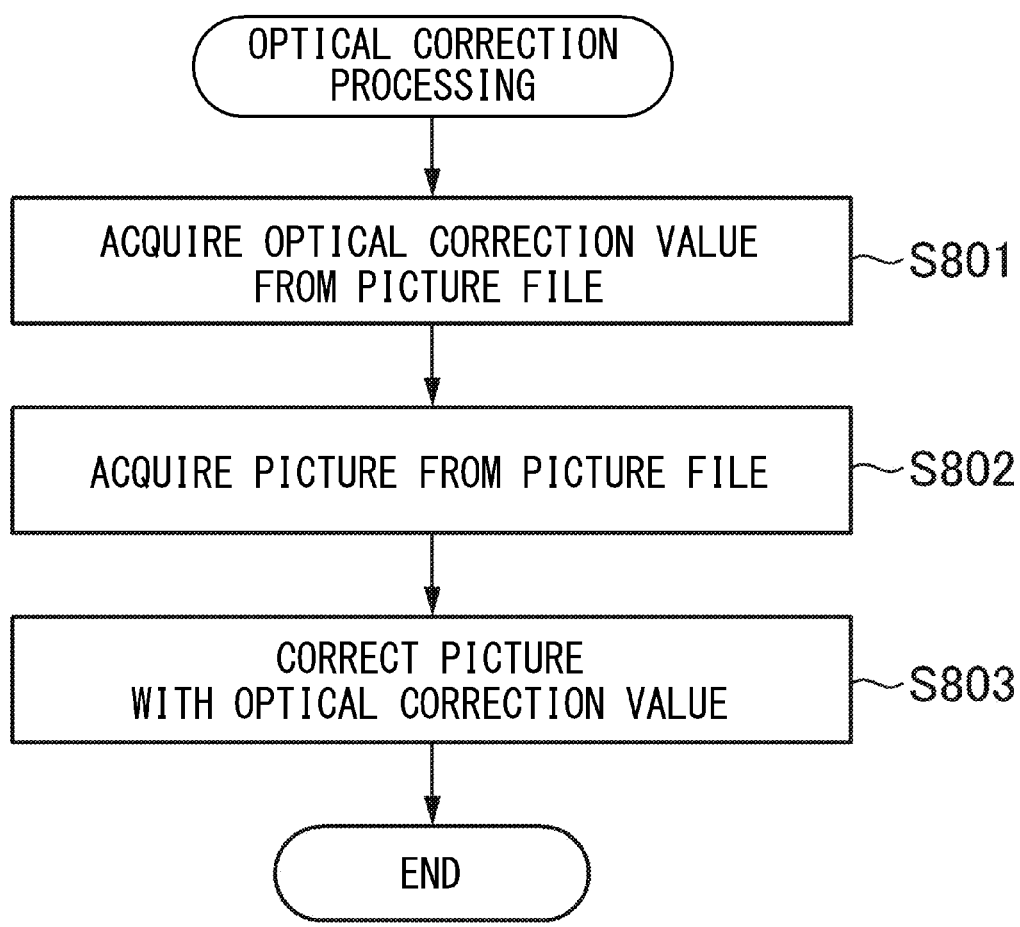
FIG. 17 is a flowchart of a subroutine for optical correction processing of step S800 in FIG. 7A.

FIG. 17 is a flowchart of a subroutine for optical correction processing of step S800 in FIG. 7A. This processing will be described below with reference to FIGS. 18A to 18F. Note that as described above, this processing is processing that the display device control unit 801 of the display device 800 executes.

In step S801, first, the display device control unit 801 receives, from the camera main unit 1, the picture file 1000, which was transferred to the display device 800 in the transfer processing (step S700). Thereafter, the display device control unit 801 acquires the optical correction value extracted from the picture file 1000 that has been received.

Next, in step S802, the display device control unit 801 acquires a picture (an image of one frame obtained in the moving image image-capturing) from the picture file 1000.

In step S803, the display device control unit 801 performs optical correction of the picture acquired in step S802, using the optical correction value acquired in step S801, and saves the corrected picture in the primary memory 813. In a case of performing clipping from the picture that is acquired in step S802 at the time of performing optical correction, clipping is performed in a range of the image that is narrower than the developing range decided in step S303 (aiming field of view 125i), and processing is performed (clipping and developing region).

FIGS. 18A to 18F are diagrams for describing a case of implementing distortion aberration correction in step S803 of FIG. 17.

Figure 18C:
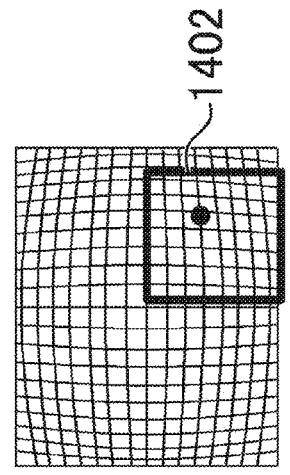
FIGS. 18A to 18F are diagrams for describing a case of implementing distortion aberration correction in step S803 of FIG. 17.
Figure 18B:
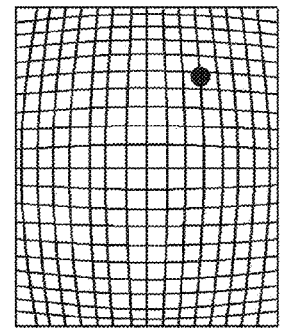
Figure 18A:
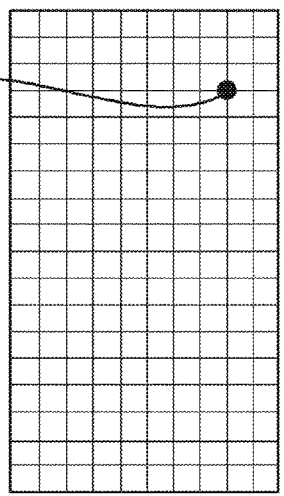

FIG. 18A is a diagram illustrating the position of a subject 1401 as viewed by the naked eye of the user at the time of image-capturing, and FIG. 18B is a diagram illustrating an image of the subject 1401 formed on the solid-state image-capturing device 42.

FIG. 18C is a diagram illustrating a developing region 1402 in the image in FIG. 18B. The developing region 1402 here is the clipping and developing region described earlier.

Figure 18F:
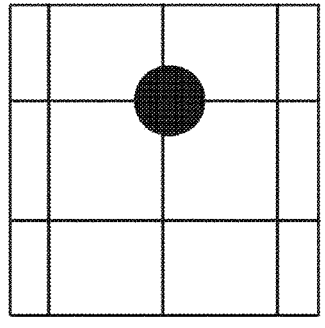
Figure 18E:
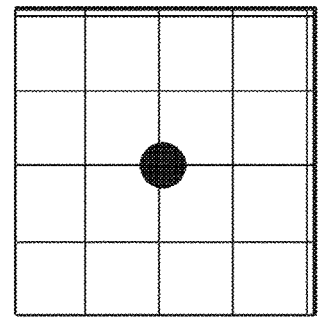
Figure 18D:
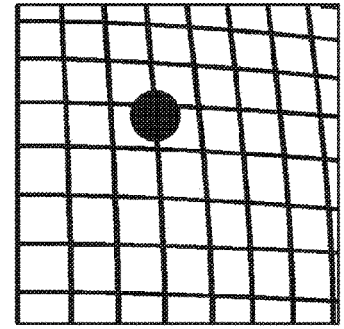

FIG. 18D is a diagram illustrating the clipping and developing region in which the image of the developing region 1402 has been clipped, and FIG. 18E is a diagram illustrating a picture in which the clipping and developing region of FIG. 18D has been subjected to distortion aberration correction. Clipping processing is performed on the clipping and developing picture at the time of performing distortion aberration correction, and accordingly, the picture illustrated in FIG. 18E has an even smaller angle of view than the clipping and developing region illustrated in FIG. 18D.

Figure 19:
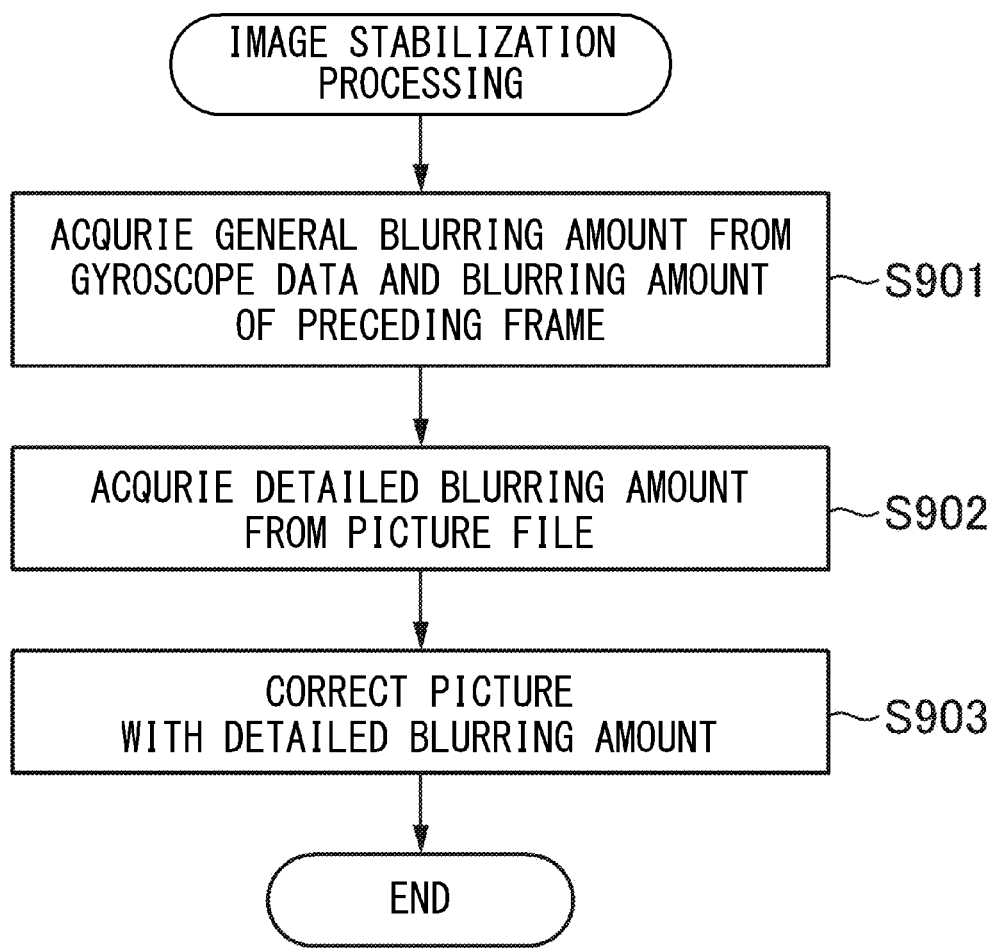
FIG. 19 is a flowchart of a subroutine for image stabilization processing of step S900 in FIG. 7A.

FIG. 19 is a flowchart of a subroutine for image stabilization processing of step S900 in FIG. 7A. This processing will be described below with reference to FIG. 25. Note that as described above, this processing is processing that the display device control unit 801 of the display device 800 executes.

In step S901, the gyro data of the current frame and the preceding frame, and a blurring amount $V_{n-1}^{Det}$ calculated in later-described step S902 with respect to the preceding frame, are acquired from the frame meta of the picture file 1000. Thereafter, a general blurring amount $V_n^{Pre}$ is calculated from these pieces of information. Note that in the present embodiment, the current frame is the frame currently being processed, and the preceding frame is the frame one frame before the current frame.

In step S902, a detailed blurring amount $V_n^{Det}$ is found from the picture. Detection of the blurring amount is performed by calculating how far feature points in the image of the current frame have moved as compared to the preceding frame.

Known methods can be employed for extracting the feature points. For example, an arrangement may be made in which only luminance information is extracted from the image of the frame and a luminance information image is generated, an image obtained by performing shifting thereof by one to several pixels is subtracted from the original image, and pixels of which an absolute value thereof is no smaller than a threshold value are extracted as the feature points. Alternatively, an arrangement may be made in which an image, obtained by subjecting the above luminance information image to a high-pass filter, is subtracted from the original luminance information image, and extracted edges are extracted as the feature points.

The amount of movement is calculated by calculating the difference for a plurality of number of times while shifting the luminance information images of the current frame and the preceding frame one to several pixels at a time, and calculating positions where difference is small at pixels of feature points.

A plurality of feature points are necessary, as described later, and accordingly, the images of the current frame and the preceding frame are preferably divided into a plurality of blocks to perform extraction of feature points. Although block division depends on the number of pixels and aspect ratio of the image, generally, 4×3 for 12 blocks, to 96×64 blocks, is preferable. The reason is that when the number of blocks is too small, correction of trapezoidal distortion due to the tilt angle of the shooting unit 40 of the camera main unit 1, rotation of optical axis direction, and so forth, cannot be accurately performed, but when the number of blocks is too great, the size of each block becomes small and the feature points are close to each other, and accordingly include error. Accordingly, an optimal number of blocks is appropriately selected in accordance with pixel count, ease of finding feature points, angle of view of the subject, and so forth.

Calculation of the amount of moment requires calculating difference a plurality of number of times while shifting the luminance information images of the current frame and the preceding frame one to several pixels at a time, and accordingly the amount of calculations is great. Accordingly, the amount of calculations for the actual movement amount can be markedly reduced by performing difference calculations for just the neighborhood thereof, in order to calculate just how many pixels away from the blurring amount $V_n^{Pre}$.

Next, in step S903, image stabilization correction is performed using the detailed blurring amount $V_n^{Det}$ acquired in step S902, and thereafter the flow exits this subroutine.

Note that Euclidean transformation that is capable of rotation and translation, affine transformation that is capable of the same, and further projective transformation that is capable of trapezoidal correction, and so forth, are conventionally known as methods for image stabilization processing.

Euclidean transformation is capable of handling cases of movement and rotation on the X axis and Y axis, but blurring that actually occurs when performing image-capturing by the shooting unit 40 of the camera main unit 1 also includes camera shaking in the front and back directions, and in the panning and tilting directions. Accordingly, image stabilization correction is performed in the present embodiment using affine transformation that is capable of correcting enlargement, skewing, and so forth as well. In affine transformation, movement of a coordinates (x, y) of a reference feature point to coordinates (x', y') is expressed in the following Expression 100.

[Math. 1]

$$\begin{pmatrix} x' \\ y' \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix} \quad \text{(Expression 100)}$$

Affine transformation is capable of calculating the 3×3 matrix in Expression 100 as long as displacement of at least three feature points can be detected. However, in a case in which the detected feature points are at close distance from each other, or are on a straight line, image stabilization correction at positions further away from the feature points, or positions away from the straight line become inaccurate. Accordingly, the detected feature points are preferably selected so as to be at distances far away from each other, and not on a straight line. Thus, in a case in which a plurality of feature points are detected, feature points that are close to each other are omitted, and the remainder is subjected to normalization by the method of least squares.

FIG. 18F is an image illustrating a picture obtained by subjecting the distortion-aberration-corrected picture illustrated in FIG. 18E to the image stabilization correction of step S903. Clipping processing is performed at the time of image stabilization correction, and accordingly the picture illustrated in FIG. 18F has a smaller angle of view than the picture illustrated in FIG. 18E.

Performing such image stabilization processing enables a quality picture, with blurring corrected, to be obtained.

The series of operations executed at the camera main unit 1 and the display device 800 included in the camera system according to the present embodiment have been described so far.

Figure 11B:
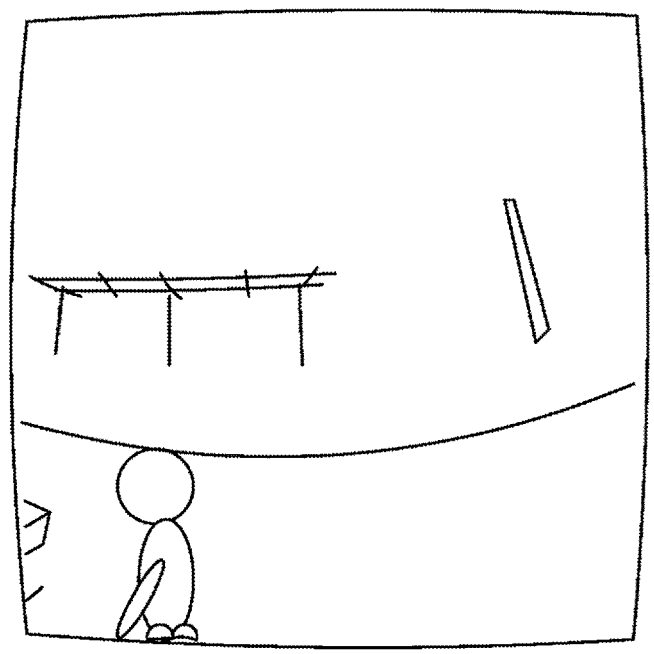
FIG. 11B is a diagram illustrating a picture of the aiming field of view in FIG. 11A, obtained by clipping from the ultrawide angle picture.

When a user turns the power switch 11 to on, and thereafter selects the moving image mode with the image-capturing mode switch 12, and simply performs observation to the front, without directing his/her face to the up or down, or right or left directions, the facial direction detecting unit 20 first detects the observation direction vo (vector information [0°,0°]) (FIG. 12A). Thereafter, the recording direction and angle-of-view deciding unit 30 clips the picture (FIG. 11B) of the aiming field of view 125o illustrated in FIG. 12A, from the ultrawide angle picture projected on the solid-state image-capturing device 42.

Figure 11C:
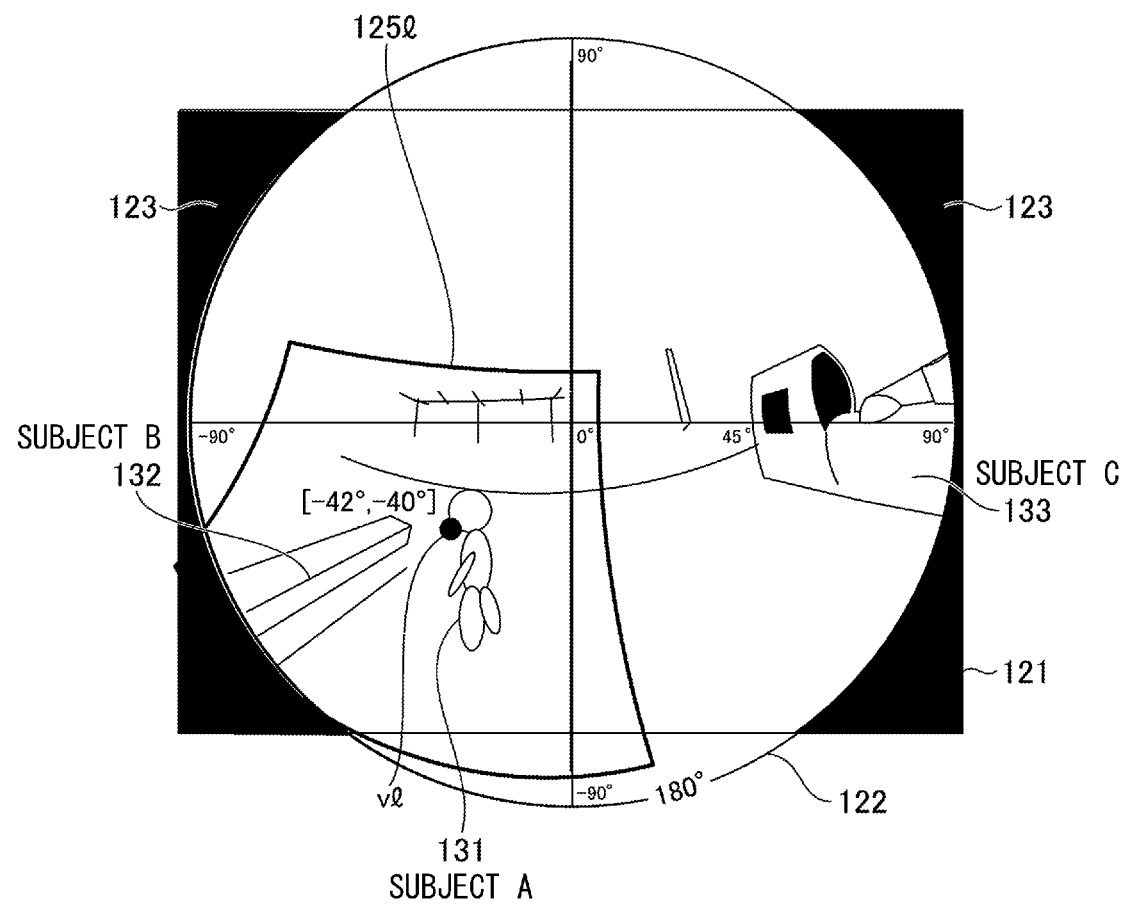
FIG. 11C is a diagram illustrating the aiming field of view in the ultrawide angle picture in a case in which the user is observing a subject A.

Thereafter, upon the user starting to observe the child (subject A 131) in FIG. 11A, for example, without operating the camera main unit 1 at all, the facial direction detecting unit 20 first detects the observation direction v1 (vector information [−42°,−40° ]) (FIG. 11C). Subsequently, the recording direction and angle-of-view deciding unit 30 clips the picture of the aiming field of view 125l (FIG. 11C) from the ultrawide angle picture image-captured by the shooting unit 40.

Figure 11D:
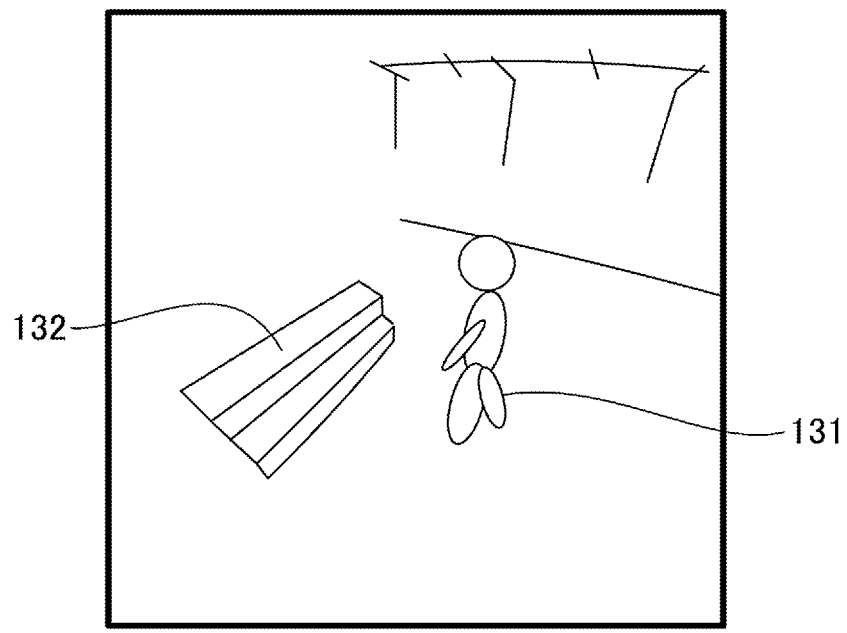
FIG. 11D is a diagram illustrating a picture in which a picture of the aiming field of view in FIG. 11C, obtained by clipping from the ultrawide angle picture, has been subjected to correction of distortion and blurring.

In this way, in steps S800 and S900, optical correction processing and image stabilization processing are performed by the display device 800 on pictures clipped in various types of shapes in accordance with the observation direction. Thus, even in a case of clipping a picture with a great amount of distortion, such as the aiming field of view 125l (FIG. 11C), a picture can be obtained with distortion and blurring corrected, in which the child (subject A 131) is at the center, such as in FIG. 11D, even if the general control CPU 101 of the camera main unit 1 is a low-spec item. That is to say, the user can obtain pictures in which his/her observation direction is image-captured, without touching the camera main unit 1, other than turning the power switch 11 on and selecting the mode by the image-capturing mode switch 12.

Now, the Pri setting mode will be described. As described earlier, the camera main unit 1 is a small-size wearable device, and accordingly no operating switches, settings screen, or the like for changing the detailed settings thereof are provided to the camera main unit 1. Accordingly, detailed settings of the camera main unit 1 are changed by external equipment such as the display device 800 (the settings screen (FIG. 13) of the display device 800 in the present embodiment).

A case will be considered in which, for example, the user desires to perform the same moving image image-capturing consecutively, once at an angle of view of 90°, and then once at an angle of view of 45°. In the normal moving image mode, the angle of view of 90° is set, so in a case of performing such image-capturing, there is a need to perform image-capturing first in the normal moving image mode, following which the moving image image-capturing is temporarily ended, a settings screen for the camera main unit 1 is brought up on the display device 800, and operations for switching the angle of view to 45° are performed. However, in a case performing continuous image-capturing, operations at the display device 800 are bothersome, and a chance to shoot a desired picture may be missed.

Conversely, by setting the Pri setting mode to a mode for performing moving image image-capturing at the angle of view of 45° in advance, the mode can be instantaneously switched to zoomed-in moving image image-capturing at the angle of view of 45° after moving image image-capturing at the angle of view of 90° has ended, simply by sliding the image-capturing mode switch 12 to "Pri". That is to say, the user does not need to interrupt his/her current activities of image-capturing and perform the above-described bothersome operations.

Note that the contents that are set in the Pri setting mode are not limited to changing the angle of view, and may include the image stabilization level that is specified by "strong" "medium", "off", and so forth, changing settings for speech recognition which are not described in the present embodiment, and so on.

Figure 11E:
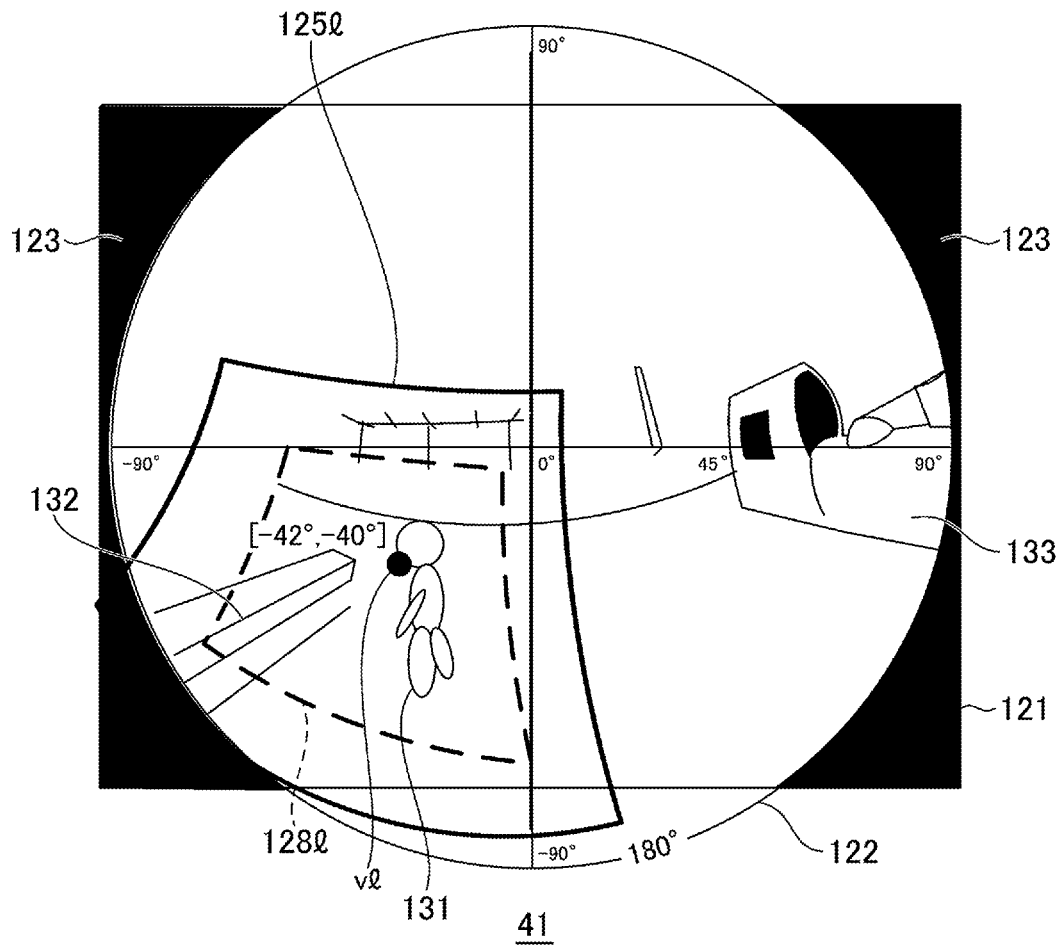
FIG. 11E is a diagram illustrating the aiming field of view in the ultrawide angle picture in a case in which the user is observing the subject A, at an angle of view settings value that is smaller than that in FIG. 11C.

For example, when the user is in the above-described state of performing image-capturing, and switches from the moving image mode to the Pri setting mode by the image-capturing mode switch 12, while continuing to observe the child (subject A 131), the angle-of-view settings value ang is changed from 90° to 45°. In this case, the recording direction and angle-of-view deciding unit 30 clips the picture of the aiming field of view 128l indicated by the dotted line frame in FIG. 11E, from the ultrawide angle picture image-captured by the shooting unit 40.

Figure 11F:
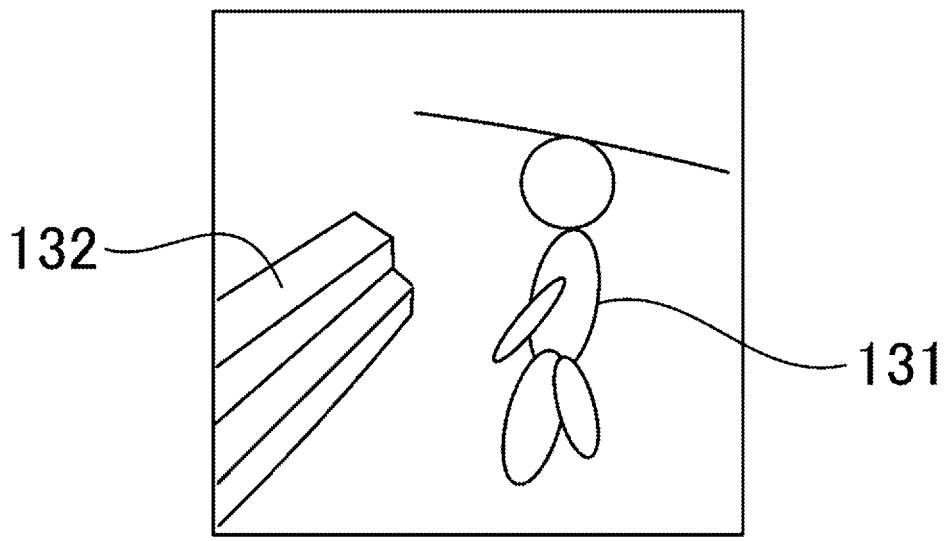
FIG. 11F is a diagram illustrating a picture in which a picture of the aiming field of view in FIG. 11E, obtained by clipping from the ultrawide angle picture, has been subjected to correction of distortion and blurring.

Optical correction processing and image stabilization processing are performed by the display device 800 in steps S800 and S900 in the Pri setting mode, as well. Thus, a picture can be obtained with distortion and blurring corrected, in which the child (subject A 131) is zoomed in on at the center, such as in FIG. 11F, even if the general control CPU 101 of the camera main unit 1 is a low-spec item. Although description has been made by way of an example in which the angle-of-view settings value ang is changed from 90° to 45° in the moving image mode, the same is true for the still image mode as well. Also, the same is true in a case in which the angle-of-view settings value ang for moving images is 90° and the angle-of-view settings value ang for still images is 45°, as well.

Thus, the user can obtain zoom pictures image-captured in his/her observation direction, simply by switching the mode of the camera main unit 1 with the image-capturing mode switch 12.

Note that while description is made in the present embodiment regarding a configuration in which the facial direction detecting unit 20 and the shooting unit 40 are integrated in the camera main unit 1, this is not limiting, as long as the facial direction detecting unit 20 is worn somewhere on the body of the user other than the head, and the shooting unit 40 is worn on the body of the user. For example, the shooting and detecting unit 10 according to the present embodiment may be disposed on a shoulder or the abdomen. However, in the case of a shoulder, it is conceivable that disposing the shooting unit 40 on the right shoulder would result in subjects to the left side being shielded by the head, and accordingly a configuration is preferable in which a plurality of shooting means are disposed for supplementation, at parts of the body including the left shoulder and so forth. Also, in the case of the abdomen, disparity occurs spatially between the shooting unit 40 and the head, and accordingly it is preferable to be able to perform correction calculation of the observation direction, in order to correct this disparity.

Second Embodiment

A second embodiment is an embodiment that enables image-capturing of a desired picture, even when the user directs his/her line of sight (face) away from the direction of the subject while performing image-capturing of a moving image. In the second embodiment, even in a case in which the user directs his/her face toward the display device 800 displaying the state of the camera main unit 1, for example, the camera main unit 1 can continue to perform image-capturing of a picture in the direction of view of the user before changing his/her facial direction.

An image-capturing system according to the second embodiment will be described with reference to FIGS. 20 to 26. The image-capturing system includes the camera main unit 1, and the display device 800 that is communicable with the camera main unit 1. Configurations of the camera main unit 1 and the display device 800 according to the second embodiment that are the same as the configurations in the first embodiment will be denoted using the same signs, and repetitive description will be omitted. Configurations of which processing is different from in the first embodiment will be described by additionally providing details.

The camera main unit 1 is worn on the neck portion of the user, and accordingly the user does not see a display portion (screen, LED lamp, etc.) displaying the state of the camera main unit 1 while performing image-capturing. The user can confirm the state of the camera main unit 1 by the display device 800 being communicably connected to the camera main unit 1, and a menu screen for various types of settings of the moving image mode, such as described with reference to FIG. 13, being displayed. The display device 800 can exchange various types of data with the camera main unit 1 by applications or firmware for cooperation with the camera main unit 1. The state of the camera main unit 1 includes, for example, confirmation of whether performing image-capturing or image-capturing is stopped, remaining charge of the batteries 94, remaining capacity of the built-in nonvolatile memory 102, and so forth.

However, when the user directs his/her face toward the display device 800 while performing image-capturing, the camera main unit 1 records a range including the display device 800 that exists in the facial direction of the user as a clipping range. Accordingly, image-capturing of the picture in the direction that the user originally desired is not performed. Further, there is a possibility that the display device 800 is displaying a screen including personal information, such as credit card information or the like, besides the screen for confirming the state of the camera main unit 1, and there are cases in which the user does not want to leave the picture of the display device 800 recorded.

In order to keep the display device 800 from being an object of image-capturing, the user is forced to hold the display device 800 at a position where it is not readily image-captured by the camera main unit 1, and to direct his/her line of sight toward the display device 800 without changing the orientation of his/her face. Confirming the state of the camera main unit 1 displayed on the display device 800 without changing the orientation of the face during image-capturing is a tiring action for the user, and visual confirmation of information of the camera main unit 1 that the user wants to confirm is not easy.

The camera main unit 1 according to the present embodiment is arranged so that a desired picture can continue to be recorded even when the user directs his/her facial direction toward the display device 800 to confirm the state of the camera main unit 1, without interrupting image-capturing. Note that the object of the user directing his/her face toward the display device 800 is not limited to state confirmation of the camera main unit 1, and may be for operations or the like to respond to a telephone call, an email, or the like. In the example below, description will be made assuming a flow in which the user directs his/her face toward the display device 800, displays the state of the camera main unit 1 on the screen of the display device 800, confirms the state of the camera main unit 1, and returns his/her face to the original position.

During a period from the user starting to change his/her facial direction toward the display device 800 up to returning his/her facial direction to the original position, the facial direction of the user is conceivably not agreeing with the direction in which recording is desired. That is to say, during the period from the facial direction of the user starting to change, and then the face of the user being directed toward the display device 800, and the facial direction of the user changing again, and stopping at the original direction (hereinafter referred to as "action period"), the facial direction of the user does not agree with the direction in which the user desires to perform recording.

Accordingly, the image clipping and developing processing unit 50 of the camera main unit 1 performs clipping and recording (developing) in the facial direction that was held at the time of the user starting to change his/her facial direction, during the action period for viewing the display device 800. That is to say, the image clipping and developing processing unit 50 changes the clipping range set with respect to the frame image during the action period, during which the user is performing the action of directing his/her face toward the display device 800, to the clipping range in the frame image before starting the action period.

Whether the user has directed his/her face toward the display device 800 is determined by the display device control unit 801 of the display device 800. In a case of determining that the user has directed his/her face toward the display device 800, the display device control unit 801 notifies the camera main unit 1 that the user has directed his/her face toward the display unit 803 of the display device 800.

The display device control unit 801 can determine that the user has directed his/her face toward the display device 800 in a case in which the display unit 803 switches from an inactive state such as an unlit state, to an active state such as a lit state, and is activated, for example.

Also, the display device control unit 801 is not limited to determination in accordance with switching from an unlit state to a lit state, and may determine that the user has directed his/her face toward the display device 800 by the user being image-captured (detected) by the front camera 805 that the display device 800 is provided with.

Also, the display device control unit 801 may determine that the user has directed his/her face toward the display device 800 by a screen of an application for confirmation of the state of the camera main unit 1, such as the screen described with reference to FIG. 13, being displayed. The screen of the application may be displayed on the display unit 803 by operations performed by the user, or may be displayed on the display unit 803 by an instruction from the camera main unit 1.

Figure 20:
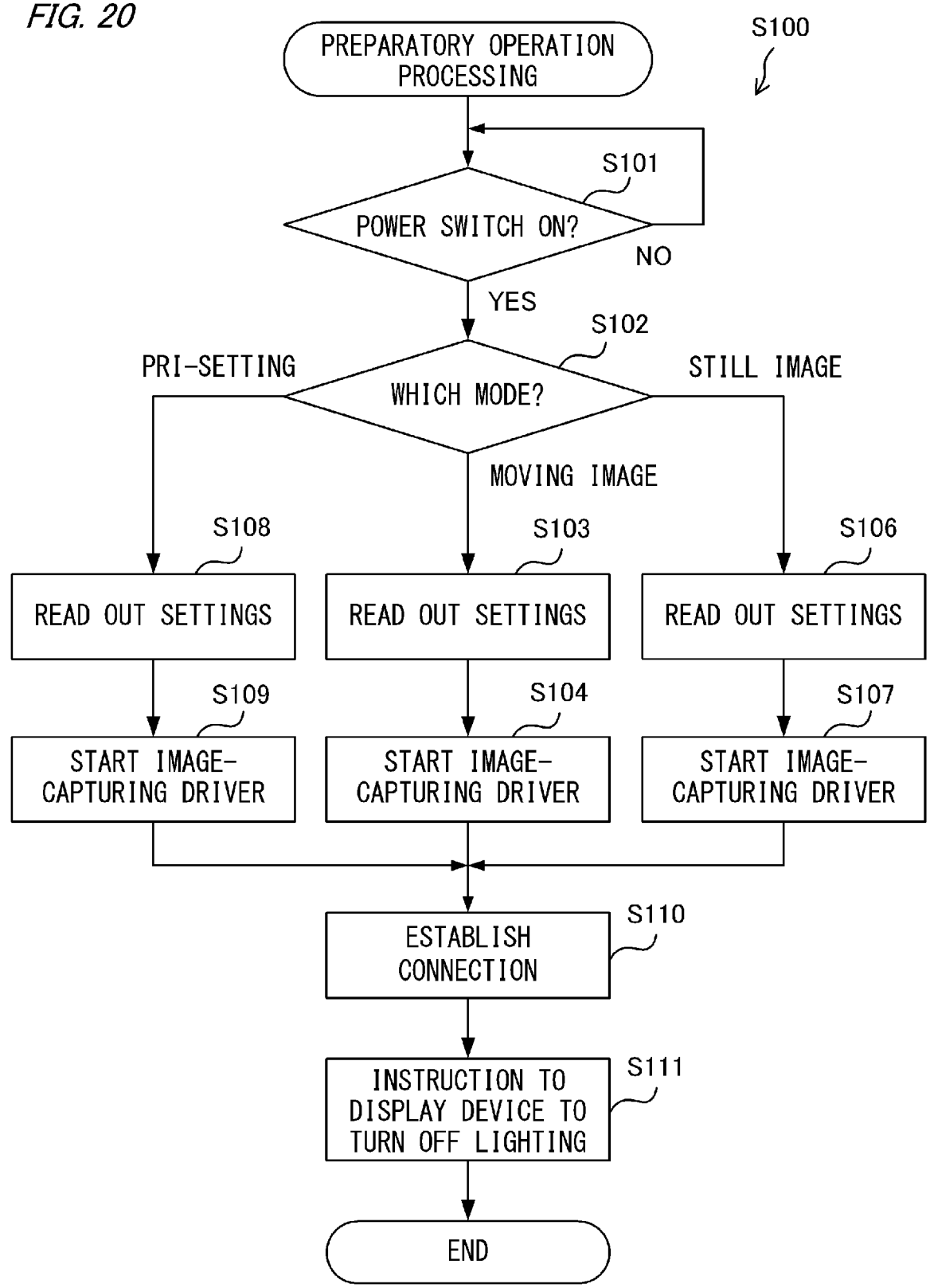
FIG. 20 is a flowchart of preparatory operation processing according to a second embodiment.

Description will be made below regarding processing in FIG. 7A according to the second embodiment that differs from the first embodiment. FIG. 20 is a flowchart of preparatory operation processing according to the second embodiment. The preparatory operation processing shown in FIG. 20 exemplifies detailed processing of step S100 in FIG. 7A. The preparatory operation processing according to the second embodiment is processing in which steps S110 and S111 are added to the preparatory operation processing in FIG. 7B according to the first embodiment.

Upon the power of the camera main unit 1 being turned on and the settings being switched on the basis of the image-capturing mode (steps S101 to S109), the general control CPU 101 establishes a connection with the display device 800 by small power wireless in step S110. In step S111, the general control CPU 101 sends an instruction by small power wireless to turn off the lighting of the screen of the display device 800. The display device control unit 801 of the display device 800 receives the instruction for turning the lighting of the screen off, and changes the state of the screen (display unit 803) to the unlit state.

Figure 21:
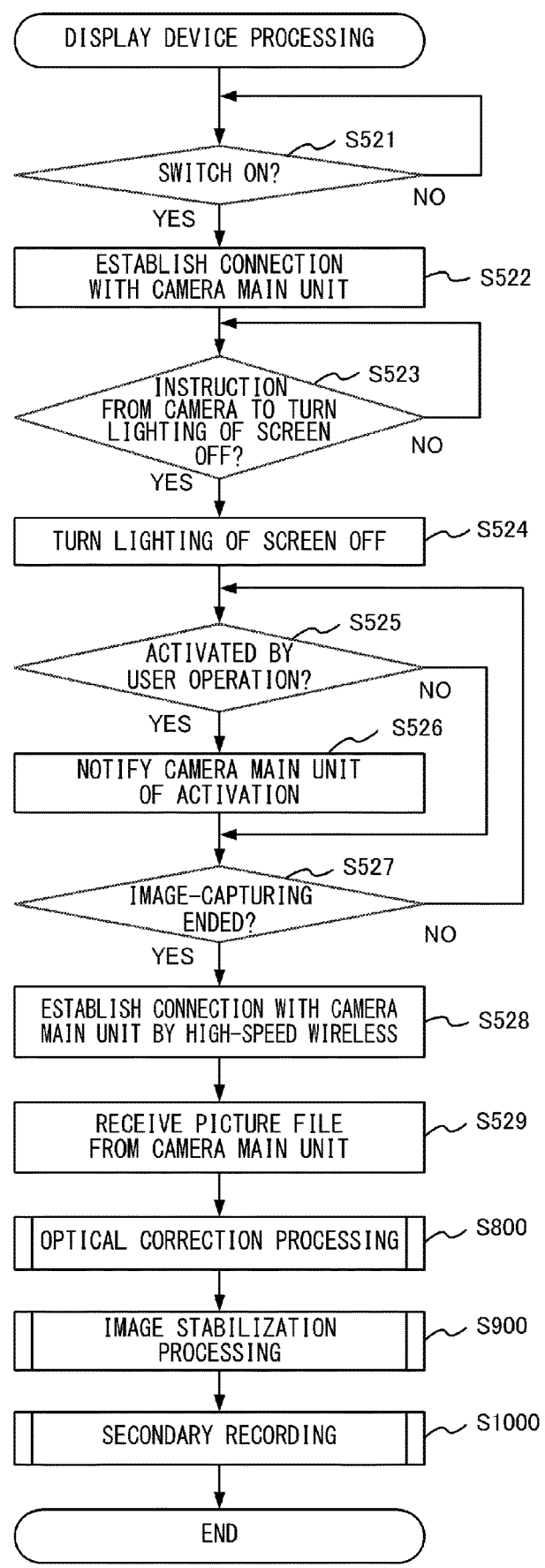
FIG. 21 is a flowchart of processing according to the second embodiment, performed by the display device 800.

The flow of processing at the display device 800 will be described with reference to FIG. 21. The processing of each step in FIG. 21 is realized by the display device control unit 801 of the display device 800 controlling the components of the display device 800 in accordance with programs stored in the built-in nonvolatile memory 812.

In step S521, the display device control unit 801 stands by until the power switch is turned on and the power of the display device 800 goes on. In step S522, the display device control unit 801 establishes a connection with the camera main unit 1. The display device control unit 801 can connect to the camera main unit 1 by small power wireless, for example. The processing in step S522 corresponds to the processing of the camera main unit 1 in step S110 described with reference to FIG. 20.

In step S523, the display device control unit 801 stands by until there is an instruction from the camera main unit 1 to turn the lighting of the screen off in step S111 in FIG. 20. Upon receiving the instruction to turn the lighting of the screen off, the display device control unit 801 advances to step S524. In step S524, the display device control unit 801 turns the lighting of the screen of the display device 800 to the unlit state.

In step S525, the display device control unit 801 determines whether or not the display device 800 has been activated by operations performed by the user. In a case of determining that the display device 800 has been activated, the display device control unit 801 advances to step S526, and in a case of determining that activation has not been performed, advances to step S527. In step S526, the display device control unit 801 notifies the camera main unit 1 that the display device 800 has been activated.

Note that although determination is made here regarding whether or not the display device 800 has been activated, it is sufficient for the display device control unit 801 to be able to determine whether or not the face of the user is directed toward the display device 800. The display device control unit 801 may determine that the user has directed his/her face toward the display device 800 by the user being image-captured (detected) by the front camera 805 that the display device 800 is provided with. The method of determining whether or not the user has been image-captured may be any method as long as a face of a person or the face of the user him/herself can be detected in the image-captured image from the front camera 805. For example, the display device control unit 801 can determine that the user has been image-captured in a case in which the face, or part of the face, of the user registered for facial authentication, is detected from the image-captured image of the front camera 805.

Also, the display device control unit 801 may determine that the user has directed his/her face toward the display device 800 by a screen of an application for confirmation of the state of the camera main unit 1, such as the screen described with reference to FIG. 13, being displayed.

In step S527, the display device control unit 801 determines whether or not there has been notification from the camera main unit 1 that image-capturing has ended. In a case of not receiving the notification of image-capturing ending, the display device control unit 801 returns to step S525, and repeats the processing of steps S525 and S526 until the notification of image-capturing ending is received. In a case of receiving the notification of image-capturing ending, the display device control unit 801 advances to step S528.

In step S528, the display device control unit 801 establishes a connection with the camera main unit 1 by high-speed wireless. In step S529, the display device control unit 801 receives a picture file, in which developing processing of a clipping range has been executed, from the camera main unit 1. The display device control unit 801 executes the processing of steps S800 to S1000, described with reference to FIG. 7A in the first embodiment, with respect to the picture file that is received.

Following the preparatory operation processing in FIG. 20, the general control CPU 101 of the camera main unit 1 executes the facial direction detection processing (step S200), and the recording direction and range deciding processing (step S300), described with reference to FIG. 7A in the first embodiment, and advances to the shooting processing of step S400.

Figure 22:
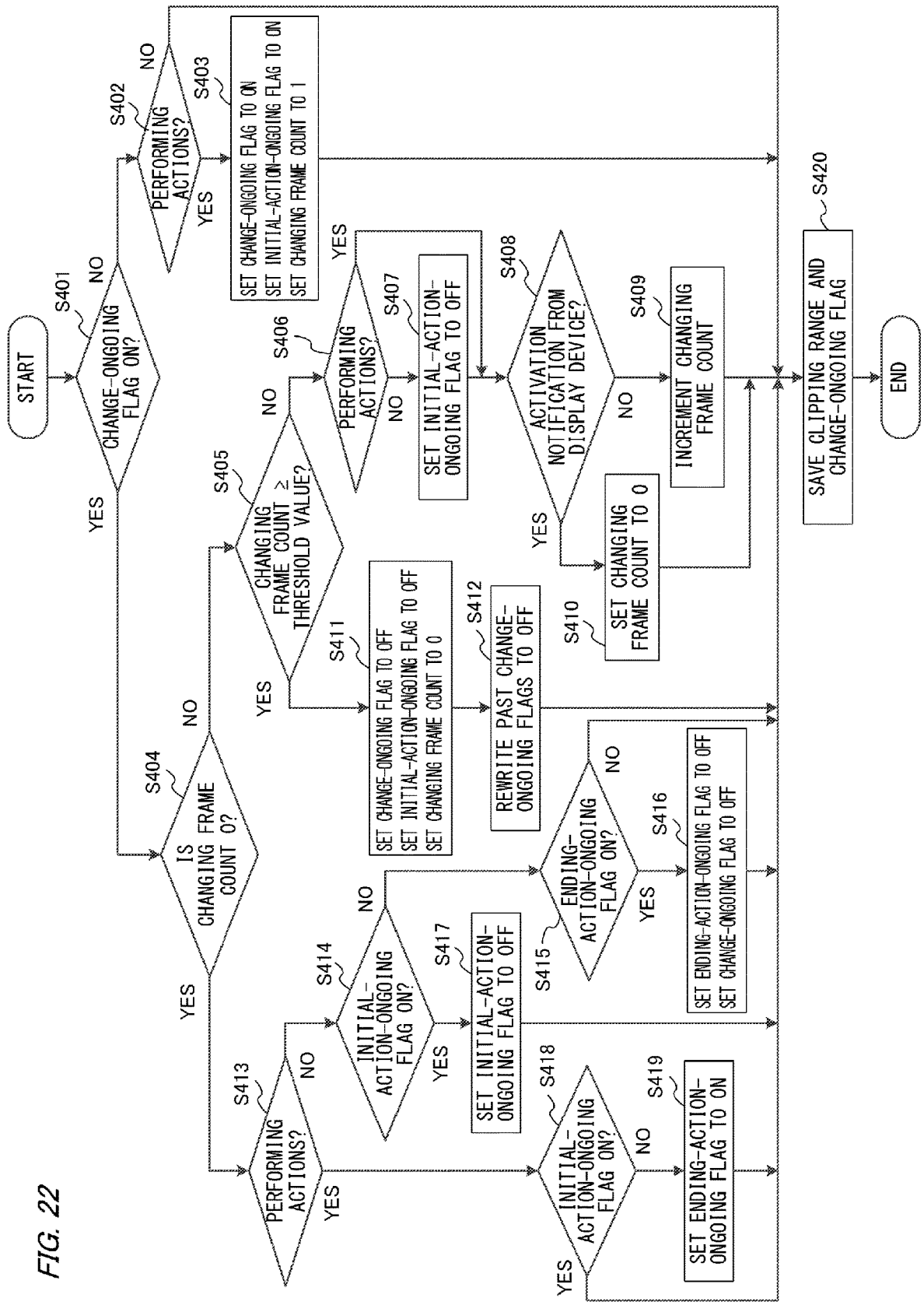
FIG. 22 is a flowchart for determining an action period for viewing the display device.

Processing for determining the action period of the user performing the action for viewing the display device 800 in the shooting processing in step S400 will be described with reference to FIG. 22. The processing shown in FIG. 22 is executed for each frame of the moving image that is image-captured by the shooting unit 40 in step S400. A frame that is the object of the processing in FIG. 22 will be referred to as "current frame". The processing of each step in FIG. 22 is realized by the general control CPU 101 controlling the components of the camera main unit 1 in accordance with programs stored in the built-in nonvolatile memory 102.

In step S401, the general control CPU 101 determines whether or not a change-ongoing flag is on in the image-capturing of the frame preceding the current frame (hereinafter referred to as "preceding frame"). The change-ongoing flag is a flag indicating whether or not the user is performing a series of actions for viewing the display device 800. The initial value of the change-ongoing flag is set to off, indicating that the user is not performing actions for viewing the display device 800. The value of the change-ongoing flag is recorded in the primary memory 103 in step S420, for each frame.

In a case of determining in step S401 that the change-ongoing flag is off in the preceding frame, the general control CPU 101 advances to step S402. In step S402, the general control CPU 101 determines whether or not the face of the user is performing actions. Whether or not the face of the user is performing actions can be detected by change in the facial direction. Change in the facial direction can be detected as change in a directional vector of the facial direction detected in FIG. 7C (observation direction vi), or change in the position and the size of the picture recording frame (clipping range) decided on the basis of the directional vector, for example. The clipping range corresponds to a partial region corresponding to the observation direction of the first moving image image-captured by the image-capturing unit. In a case of detecting change of the directional vector, the general control CPU 101 can determine that the face of the user is performing actions in a case in which the amount of change of the directional vector is no smaller than a threshold value angle.

In a case of detecting change in the clipping range, the general control CPU 101 acquires the position and the size (clipping range) of the picture recording frame recording in the primary memory 103 in the recording direction and range deciding processing (step S300) for the current frame and the preceding frame.

The general control CPU 101 determines whether or not the difference in clipping ranges between the current frame and the preceding frame (e.g., distance between the position of the clipping range of the current frame and the position of the clipping range of the preceding frame) is no smaller than a threshold value. The general control CPU 101 can determine that the face of the user is performing actions in a case in which the difference in clipping ranges between the current frame and the preceding frame is no smaller than the threshold value. On the basis of blurring (amount of change) of the facial direction in a case in which the user is not intentionally moving his/her face, the threshold value can be set as the greatest value, the average value, or the like, of this amount of change, for example. In a case of determining that the face of the user is performing actions, the processing advances to step S403. In a case of determining that the face of the user is not performing actions, the processing advances to step S420.

In step S403, the general control CPU 101 sets the change-ongoing flag and an initial-action-ongoing flag to on, and sets a changing frame count to 1. An initial action is an action of the user directing his/her facial direction from the subject toward the display device 800, before the user views the display device 800. The initial-action-ongoing flag is a flag indicating a state in which the facial direction of the user is changing toward the display device 800 before the user views the display device 800, and the setting thereof is carried on from the preceding frame.

Even when the facial direction changes, this is not necessarily an action to view the display device 800, so the change-ongoing flag is tentatively set to on. In a case in which determination is made that the change in facial direction is not an action to view the display device 800, the change-ongoing flag is changed to off in step S411.

The changing frame count is a variable for counting the number of frames from the facial direction of the user starting to change up to receiving the notification of activation from the display device 800. In a case of not receiving notification of activation from the display device 800 for a predetermined period, it is conceivable that the user was not trying to confirm the state of the camera main unit 1 using the display device 800, but changed the direction of his/her face to change the image-capturing direction. In a case of receiving notification of activation from the display device 800 while the changing frame count is smaller than the threshold value, the general control CPU 101 determines that the change in the facial direction was an action to view the display device 800. Also, in a case in which the changing frame count reaches or exceeds the threshold value without reception of notification of activation from the display device 800, the general control CPU 101 determines that the change in the facial direction was not an action to view the display device 800. In step S403, the current frame is the first frame in which the face of the user starts to move, and accordingly the changing frame count is set to 1.

In a case of determining in step S401 that the change-ongoing flag of the preceding frame is on, the general control CPU 101 advances to step S404. In step S404, the general control CPU 101 determines whether or not the changing frame count is 0. In a case of determining that the changing frame count is not 0, the processing advances to step S405.

In step S405, the general control CPU 101 determines whether or not the changing frame count is no smaller than the threshold value, and if smaller than the threshold value, advances to step S406. In a case in which the changing frame count is smaller than the threshold value, determination is made that the change in facial direction is an action for the user to view the display device 800. In a case in which the changing frame count is not smaller than the threshold value, determination is made that the change in facial direction is not an action for the user to view the display device 800.

The threshold value for the changing frame count can be decided by, for example, multiplying a threshold value time from the user starting the action period for viewing the display device 800 up to reception of the notification of activation, by the framerate. The threshold value time may be around three to five seconds or so, for example, and may be optionally set by the user.

In a case in which the notification of activation is received from the display device 800 within the threshold value time by the determination in step S405, the general control CPU 101 can change the clipping range of frames during the action period to the clipping range before moving the face. Also, in a case in which the notification of activation is not received from the display device 800 within the threshold value time, the general control CPU 101 determines that the change in facial direction was not an action to view the display device 800, and does not change the clipping range.

In step S406, the general control CPU 101 determines whether or not the face of the user is performing actions, in the same way as in step S402. In a case of determining that the face of the user is not performing actions, the general control CPU 101 changes the initial-action-ongoing flag to off in step S407, and in a case of determining that the face of the user is performing actions, leaves the initial-action-ongoing flag on without being changed, and advances to step S408.

In step S408, the general control CPU 101 determines whether or not the notification of activation has been received from the display device 800 between the image-capturing of the preceding frame and the image-capturing of the current frame. In a case of receiving the notification of activation from the display device 800, in step S410 the general control CPU 101 sets the changing frame count to 0. In a case of not receiving the notification of activation from the display device 800, in step S409 the general control CPU 101 increments the changing frame count. Upon setting the changing frame count in either step S409 or step S410, the general control CPU 101 advances to step S420.

In a case in which the changing frame count is no smaller than the threshold value in step S405, the general control CPU 101 determines that the change in facial direction is not an action for the user to view the display device 800, and the processing advances to step S411. In step S411, the general control CPU 101 sets the change-ongoing flag and the initial-action-ongoing flag to off, and returns the changing frame count to 0.

In step S412, the general control CPU 101 rewrites the change-ongoing flag, which had been continuously set to on up to the preceding frame, to off. That is to say, in a case in which the display device 800 does not go to an active state by the time that the number of frames image-captured from when the facial direction of the user starts to change reaches the threshold value, the general control CPU 101 determines that the actions of the user were not a series of actions for viewing the display device 800. Accordingly, the general control CPU 101 rewrites the change-ongoing flag for each frame, which had been set to on from the time of the facial direction of the user starting to change, to off.

In a case in which the changing frame count is determined to be 0 in step S404, the general control CPU 101 advances to step S413, and determines whether or not the face of the user is performing actions, in the same way as in steps S402 and S406. In a case of determining that the face of the user is not performing actions, the general control CPU 101 advances to step S414.

In step S414, the general control CPU 101 determines whether or not the initial-action-ongoing flag is on. In a case in which the initial-action-ongoing flag is on, the general control CPU 101 advances to step S417, and changes the initial-action-ongoing flag to off. That is to say, in a case in which the facial direction starts to change and is directed toward the display device 800, and the change in facial direction stops, i.e., the initial action ends, before the user views the display device 800, the general control CPU 101 sets the initial-action-ongoing flag to off.

In a case of determining in step S413 that the face of the user is performing actions, the general control CPU 101 advances to step S418, and determines whether or not the initial-action-ongoing flag is on. In a case in which the initial-action-ongoing flag is on, the general control CPU 101 advances to step S420, and in a case in which the initial-action-ongoing flag is off, advances to step S419.

In step S419, the general control CPU 101 sets an ending-action-ongoing flag to on and advances to step S420. An ending action is an action in which, after viewing the display device 800, the user directs his/her facial direction away from the display device 800 and toward the subject. The ending-action-ongoing flag is a flag indicating the state from the facial direction of the user starting to move again after viewing the display device 800, up to stopping thereof, and the setting thereof is carried on from the preceding frame.

In a case in which the initial-action-ongoing flag is not on in step S414, the general control CPU 101 advances to step S415, and determines whether or not the ending-action-ongoing flag is on. In a case in which the ending-action-ongoing flag is off, the general control CPU 101 advances to step S420, and in a case in which the ending-action-ongoing flag is on, the general control CPU 101 advances to step S416. In step S416, the general control CPU 101 determines that the ending action has ended, sets the ending-action-ongoing flag, and the change-ongoing flag of the current frame, to off, and advances to step S420.

In step S420, the general control CPU 101 records, for each frame, the information of the clipping range, and the setting of the change-ongoing flag, in the primary memory 103, as frame management information. FIG. 23 is a diagram conceptually exemplifying frame management information after moving image image-capturing up to frame No. j+2.

The frame management information includes information of the frame No., the clipping range, and the change-ongoing flag. The frame No. is a number indicating what number in the moving image the frame is. The clipping range is indicated by the position and size of the picture recording frame with respect to this frame, for example. The change-ongoing flag is a flag indicating whether or not the user is performing an action for viewing the display device 800 (changing the facial direction) when performing image-capturing of this frame.

Note that the frame management information is stored in the primary memory 103 separately from the picture file (moving image), but may be stored as metadata of the picture file. In this case, the frame meta described with reference to FIG. 15 further has an item of change-ongoing flag, and the values of the clipping range (clipping position) and the change-ongoing flag are saved in step S420 as metadata of the picture file, in the same way as with the frame management information.

Figure 24:
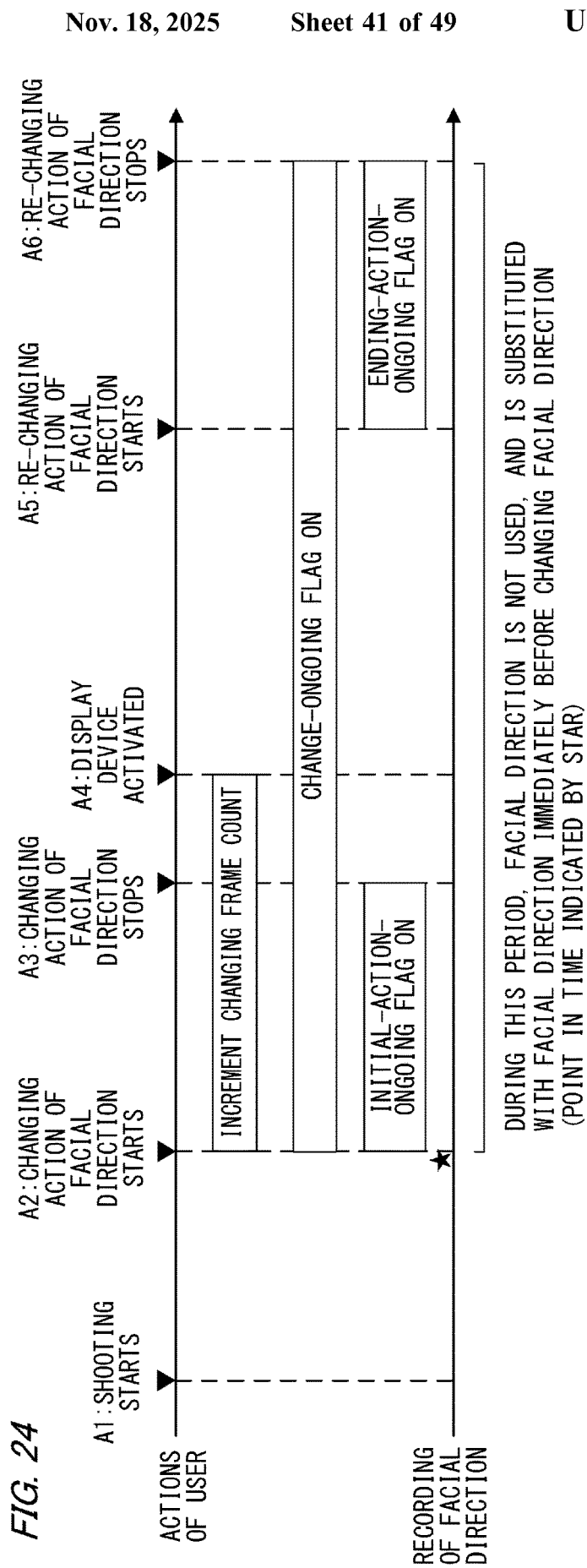
FIG. 24 is a diagram for describing states of flags in the action period.

The states of the changing frame count, the change-ongoing flag, the initial-action-ongoing flag, and the ending-action-ongoing flag, during the action period in which the user was performing actions to direct his/her face toward the display device 800, will be described with reference to FIG. 24. The states of the various types of flags will be described, assuming a flow in which the user directs his/her face toward the display device 800 to confirm the state of the camera main unit 1 and displays the confirmation screen, and after ending confirmation, returns his/her facial direction to the original position. FIG. 24 shows the states of the actions of the user, recording of facial direction, the various types of flags used in the processing in FIG. 22, and the changing frame count, in time sequence.

The user starts shooting (A1), and in a case of confirming the state of the camera main unit 1 for example, starts changing actions of the facial direction to view the display device 800 (A2). The change-ongoing flag is off until the changing actions of the facial direction start, and accordingly the processing of FIG. 22 advances from step S401 to step S402. At the frame in which the changing actions of the facial direction start, in step S403 the general control CPU 101 sets the change-ongoing flag and the initial-action-ongoing flag to on, and sets the changing frame count to 1.

In each frame from the start of the changing actions of the facial direction until the display device 800 is activated (A4), the changing frame count is incremented by the processing of steps S404 to S409. During this time, the change-ongoing flag is in the on state.

When the changing actions of the facial direction for viewing the display device 800 stop (A3), the initial-action-ongoing flag is set to off in step S407. Upon receiving a notification of activation from the display device 800 (A4), the changing frame count is initialized to 0 in step S410.

Note that in a case in which the changing frame count is no smaller than the threshold value in step S405, the changing actions of the facial direction are determined to not be actions for viewing the display device 800, even if the notification of activation of the display device 800 is received. In this case, the change-ongoing flag recorded as on in the frames after start of the changing actions of the facial direction (A2) is rewritten to off in the frame management information in FIG. 23, in step S412.

In a case in which changing actions of the facial direction are started again (A5) after the user ends confirmation of the screen of the display device 800, the processing in FIG. 22 advances in the order of steps S404, S413, and S418. The initial-action-ongoing flag is set to off when starting re-changing actions of the facial direction (A5), and accordingly the ending-action-ongoing flag is set to on in step S419.

When the re-changing actions of the facial direction stop (A6), the processing in FIG. 22 advances in the order of steps S404, S413, S414, and S415. The ending-action-ongoing flag is set to on when the re-changing actions of the facial direction stop (A6), and accordingly the ending-action-ongoing flag and the change-ongoing flag are set to off in step S416.

Figure 25:
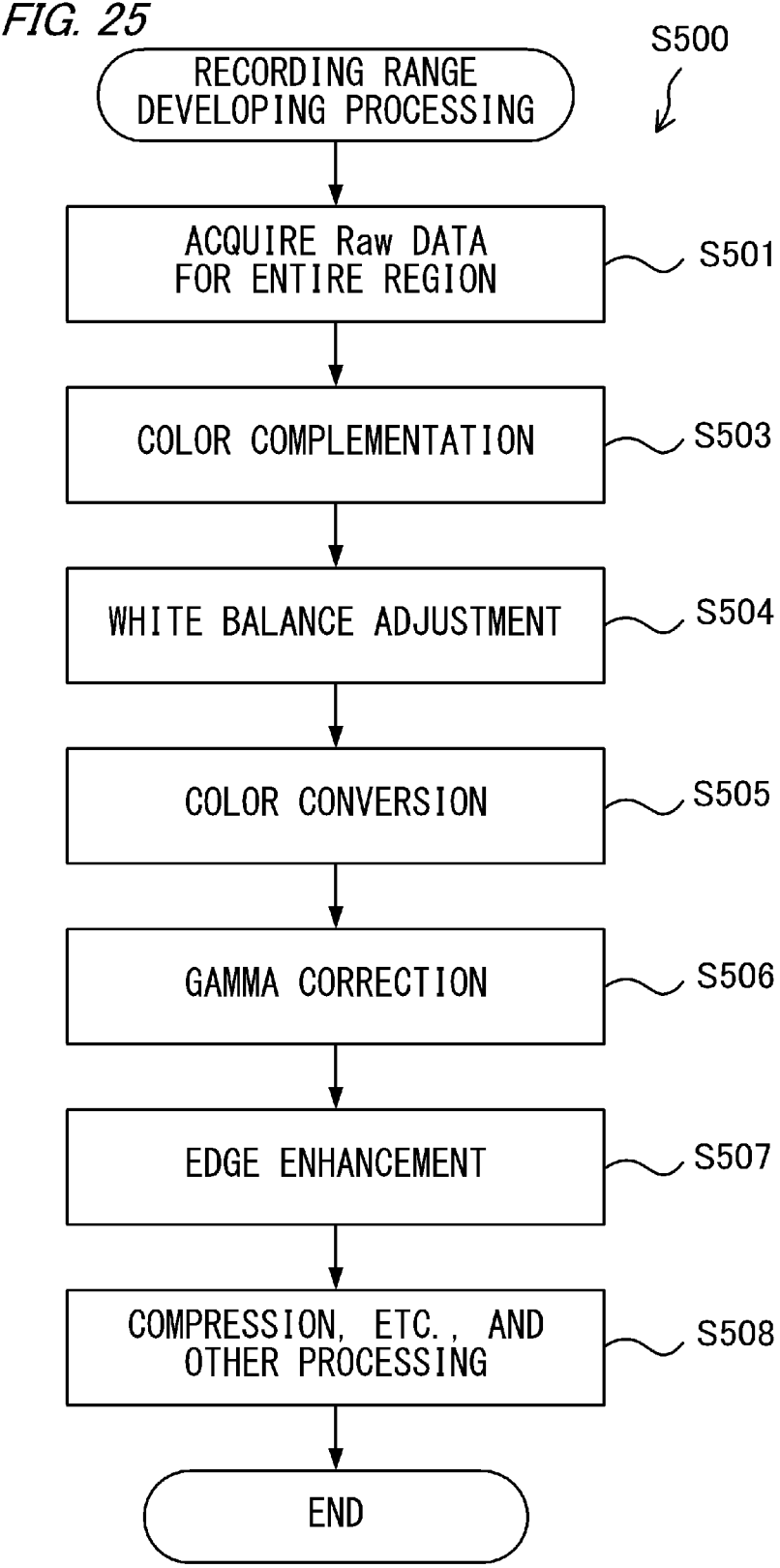
FIG. 25 is a flowchart of recording range developing processing according to the second embodiment.

Recording range developing processing according to the second embodiment will be described with reference to FIG. 25. The recording range developing processing according to the second embodiment is detailed processing of step S500 in FIG. 7A. In the second embodiment, the recording range developing processing shown in FIG. 25 is executed instead of the recording range developing processing in FIG. 7E described in the first embodiment. The recording range developing processing according to the second embodiment differs from the recording range developing processing in FIG. 7E with respect to the point that the processing of step S502, in which the part of the picture recording frame 127i is clipped from the ultrawide angle picture, is not executed.

In the recording range developing processing according to the second embodiment, developing processing is executed on the entire region of the ultrawide angle picture read in step S501, and accordingly, the computation amount and the usage amount of the primary memory 103 increase. In a case in which the primary memory 103 is insufficient, the general control CPU 101 may perform recording to the built-in nonvolatile memory 102.

Also, an arrangement may be made in which the general control CPU 101 retains the processing of step S502, and clips a range that is larger than the picture recording frame 127i described in the first embodiment, thereby limiting the computation amount and the usage amount of the primary memory 103 as compared to a case of developing the entire region. In this case, the general control CPU 101 can change the clipping range in the action period for viewing the display device 800, within the range of the picture clipped as part of the entire range.

In a case of clipping a range that is larger than that in the first embodiment in step S502, a facial direction that is assumed for the when the user views the display device 800 may be set in advance, and the clipping range may be decided so as to include the actual observation direction Vi and the picture in the facial direction that is set.

Figure 26:
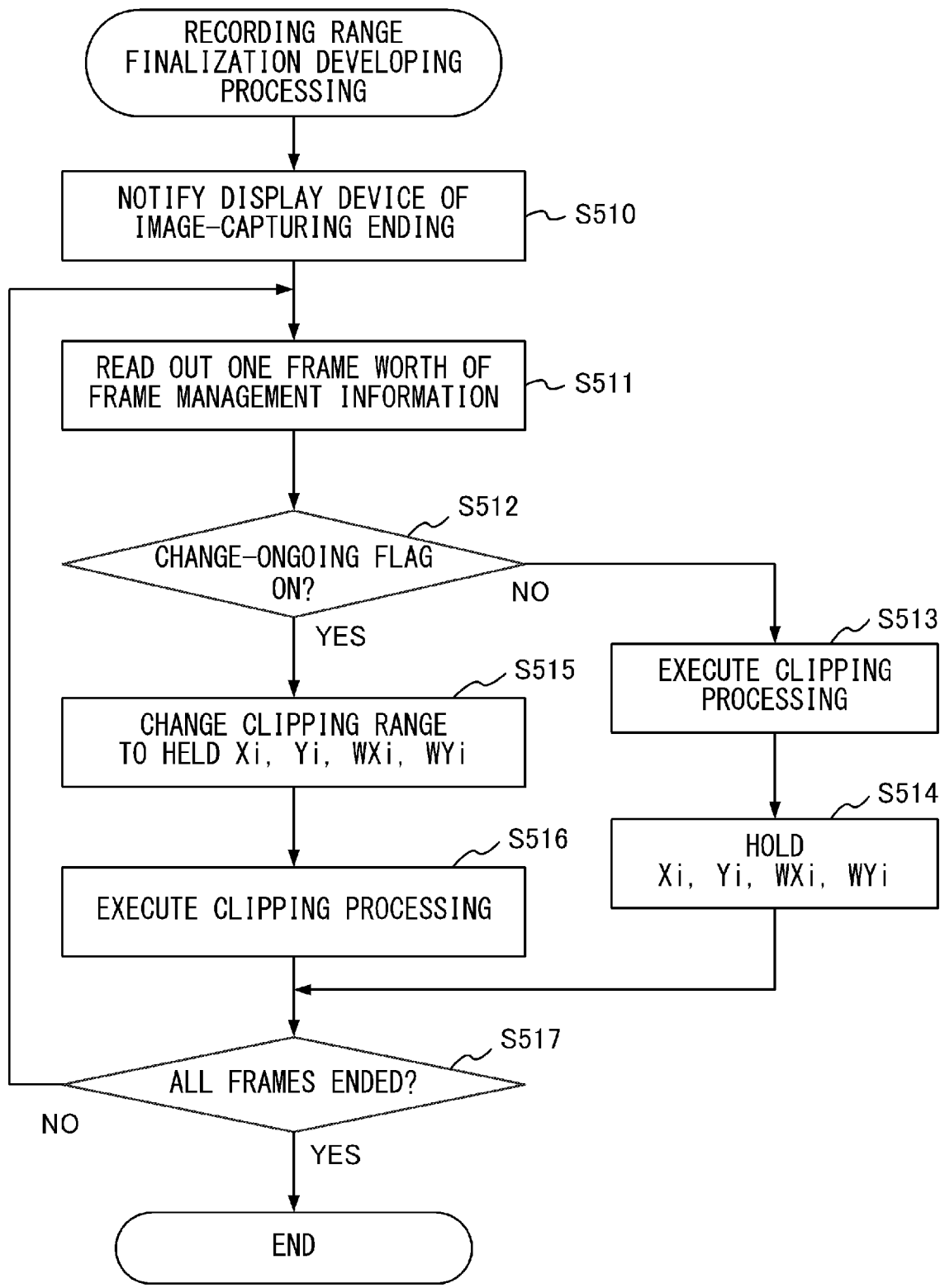
FIG. 26 is a flowchart of recording range finalization developing processing.
Figure 27A:
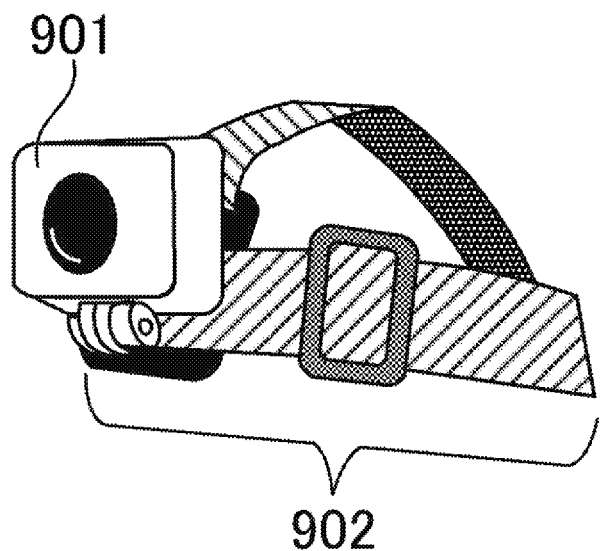
FIGS. 27A and 27B are diagrams illustrating a configuration example of a camera fixed to a head using a head-fixation accessory according to conventional art.
Figure 27B:
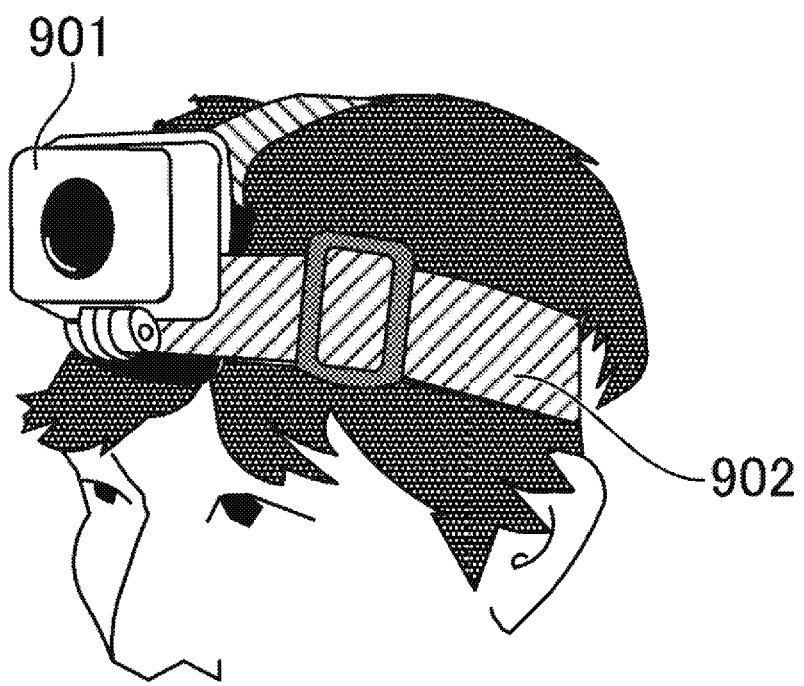
Figure 28:
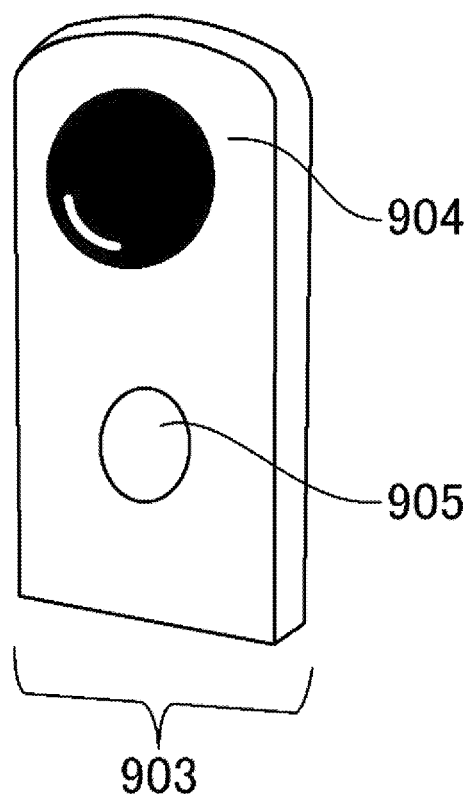
FIG. 28 is a diagram illustrating a configuration example of an omnidirectional shooting camera according to conventional art.
Figure 29A:
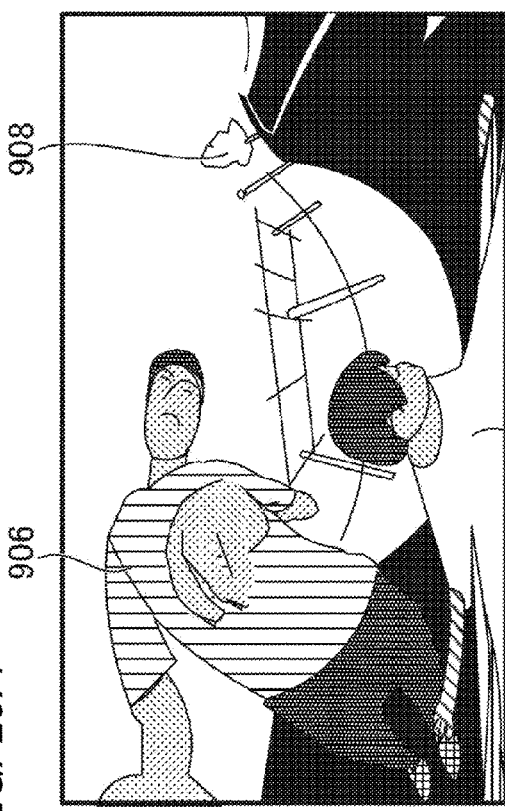
FIGS. 29A to 29C are diagrams illustrating an example of conversion work performed on a picture that is image-captured by the omnidirectional-shooting camera in FIG. 28.
Figure 29B:
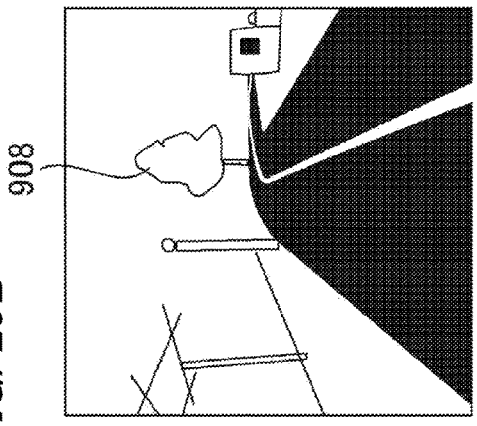
Figure 29C:
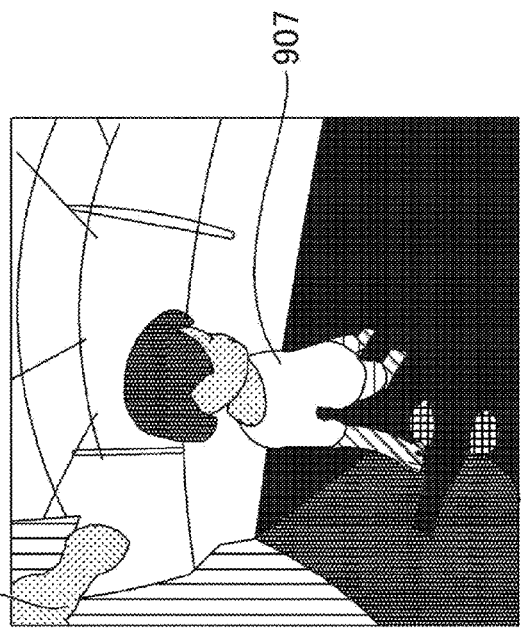

The processing of steps S200 to S500 in FIG. 7A according to the second embodiment is repeatedly executed until recording ends. Recording range finalization developing processing that is executed after the recording range developing processing of step S500 ends will be described with reference to FIG. 26. The processing of each step in FIG. 26 is realized by the general control CPU 101 controlling the components of the camera main unit 1 in accordance with programs stored in the built-in nonvolatile memory 102.

In step S510, the general control CPU 101 notifies the display device 800 that image-capturing has ended. In step S511, the general control CPU 101 reads out information of one frame worth of the frame management information described with reference to FIG. 23 from the primary memory 103. The general control CPU 101 sequentially reads out the frame management information from the first frame, and repeats the processing of steps S512 to S516 for the frames that are read out.

In step S512, the general control CPU 101 determines whether or not the change-ongoing flag is on. In a case in which the change-ongoing flag is not on, the general control CPU 101 advances to step S513, and executes the clipping processing for the clipping range that is read out. In step S514, the general control CPU 101 holds the clipping range (Xi, Yi, WXi, WYi) clipped in step S513. The clipping range that is held is used for changing the clipping range during the action period in which the user views the display device 800, as the clipping range immediately before the change-ongoing flag changing to on.

In a case in which the change-ongoing flag is on in step S512, the general control CPU 101 advances to step S515, and changes the clipping range of the frame that is currently the object of processing to the clipping range (Xi, Yi, WXi, WYi) held in step S514. In step S516, the general control CPU 101 executes clipping processing in the clipping range set in step S515.

In step S517, the general control CPU 101 determines whether or not clipping processing has ended for all frames, and in a case in which this has not ended, repeats the processing of steps S511 to S516 until the last frame.

A case of applying the processing in FIG. 26 to the frame management information in FIG. 23 will be described. The change-ongoing flag is off at frame 1 to frame i, and accordingly the general control CPU 101 advances from step S512 to step S513. Upon the processing of step S514 being executed with respect to frame i, the clipping range that is held is (Xi, Yi, WXi, WYi).

At frame i+1, the change-ongoing flag is on, and accordingly the general control CPU 101 advances to step S515. The general control CPU 101 sets the clipping range of frame i+1 to (Xi, Yi, WXi, WYi), and executes clipping processing. The change-ongoing flag is on at frame i+2 to frame j+2 as well, and accordingly the general control CPU 101 sets the clipping range of frame i+2 to frame j+2 to (Xi, Yi, WXi, WYi) in the same way as with frame i+1, and executes clipping processing.

When the recording range finalization developing processing in FIG. 26 ends, the general control CPU 101 executes the processing of steps S600 to S1000 in FIG. 7A in the same way as in the first embodiment.

According to the second embodiment above, the camera main unit 1 can perform clipping in the facial direction in which the face of the user was directed when the facial direction started to change, from the user starting image-capturing through the course of the action period for viewing the display device 800. Accordingly, even when the user directs his/her line of sight away from the direction of the subject, and directs his/her facial direction toward the display device 800 and confirms the state of the camera main unit 1 during image-capturing of the moving image, the user can continue to record a desired picture without interrupting image-capturing.

Third Embodiment

A third embodiment is an embodiment in which control is performed such that, even in a case in which an object that the camera operator originally does not desire to be recorded in the experience enters the angle of view while performing image-capturing of a moving image, the object that is undesirable to be recorded is not included in the angle of view in trimming results. In the third embodiment, even in a case in which the user directs his/her face toward the display device 800 that displays the state of the camera main unit 1, for example, the camera main unit 1 sets a region that includes the housing of the display device 800 and that also has a sufficient size, as the trimming-forbidden region that is a clipping-forbidden region. Accordingly, the camera main unit 1 can keep the trimming-forbidden region from being included in the recording range of the camera main unit 1.

Figure 31:
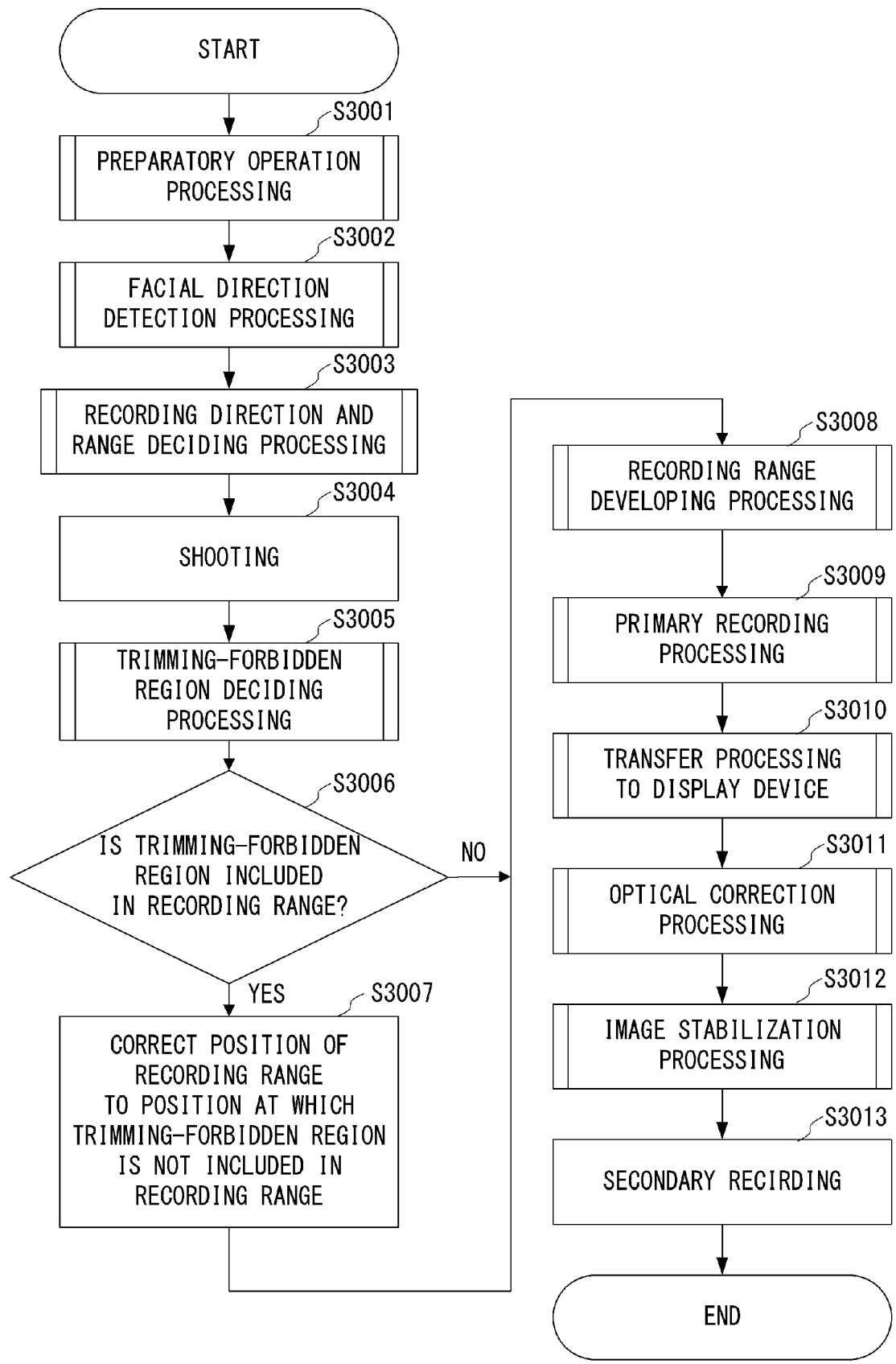
FIG. 31 is a flowchart of correction processing of a trimming range according to a third embodiment.
Figure 32:
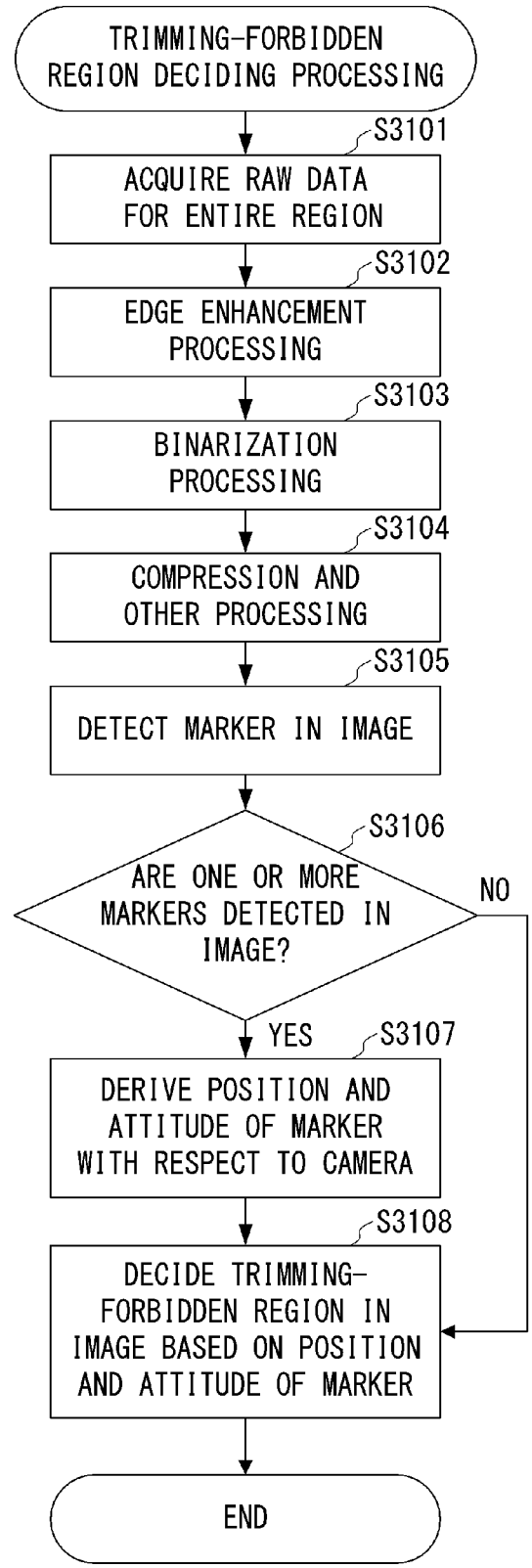
FIG. 32 is a flowchart of a subroutine of trimming-forbidden-region deciding processing in step S3005 in FIG. 31.

An image-capturing system according to the third embodiment will be described with reference to FIGS. 30 to 32. The image-capturing system includes the camera main unit 1, and the display device 800 that is communicable with the camera main unit 1.

Configurations of the camera main unit 1 and the display device 800 according to the third embodiment that are the same as the configurations in the first embodiment will be denoted using the same signs, and repetitive description will be omitted. Configurations of which processing is different from in the first embodiment will be described by additionally providing details.

The camera main unit 1 is worn on the neck portion of the user, and accordingly the user does not see the display portion (screen, LED lamp, etc.) displaying the state of the camera main unit 1 while performing image-capturing. The user can confirm the state of the camera main unit 1 by the display device 800 being communicably connected to the camera main unit 1, and the menu screen for various types of settings of the moving image mode, such as described with reference to FIG. 13, being displayed. The display device 800 can exchange various types of data with the camera main unit 1 by applications or firmware for cooperation with the camera main unit 1. The state of the camera main unit 1 includes, for example, confirmation of whether performing image-capturing or image-capturing is stopped, remaining charge of the batteries 94, remaining capacity of the built-in nonvolatile memory 102, and so forth.

However, when the user unavoidably directs his/her face toward the display device 800 while performing image-capturing in order to confirm the state of the camera main unit 1, the camera main unit 1 records a range including the display device 800 that exists in the facial direction of the user as a trimming range. In this case, image-capturing of the picture in the direction originally desired is not performed. Further, there is a possibility that the screen of the display device 800 is displaying a screen including personal information, such as credit card information or the like, for example, besides the screen for confirming the state of the camera main unit 1, and there are cases in which the user does not desire to leave the picture of the display device 800 recorded.

In order to keep the display device 800 from being an object of recording, the user needs to hold the display device 800 at a position where it is not readily image-captured by the camera main unit 1, and to direct his/her line of sight toward the display device 800 without changing the orientation of his/her face. However, confirming the state of the camera main unit 1 displayed on the display device 800 without changing the orientation of the face during image-capturing is a troublesome action for the user, and further, in this case, visual confirmation of information of the camera main unit 1 that the user desires to confirm is not easy.

Accordingly, the camera main unit 1 according to the present embodiment is arranged so that a desired picture can continue to be recorded even when the user directs his/her facial direction toward the display device 800 to confirm the state of the camera main unit 1, without interrupting image-capturing. Note that the object of the user directing his/her face toward the display device 800 is not limited to state confirmation of the camera main unit 1, and may be for operations or the like to respond to a telephone call, an email, or the like.

In the present embodiment, a marker is placed on an object regarding which recording is undesirable, and the camera main unit 1 sets a certain region including this marker as a trimming-forbidden region, thereby performing control such that the object regarding which recording is undesirable is not included in the trimming range that is a clipping range. That is to say, the camera main unit 1 detects, in a moving image that is image-captured by the shooting unit 40, a marker 840 displayed on the display unit 803 of the display device 800, as exemplified in FIG. 30. The camera main unit 1 then calculates the position and attitude of the marker 840 with respect to the camera main unit 1, thereby deciding a trimming-forbidden region 841, and corrects the trimming range such that the trimming-forbidden region 841 is not included in the trimming range.

With respect to the trimming-forbidden region 841, the display position and display dimensions of the marker 840 on the display unit 803 of the display device 800 are stored in advance in the built-in nonvolatile memory 102 of the camera main unit 1 or the built-in nonvolatile memory 812 of the display device 800. The camera main unit 1 acquires that which is stored in the built-in nonvolatile memory 102 or 812 by communication, and performs calculation of the trimming-forbidden region 841 in combination with the position and attitude of the marker 840 with respect to the camera main unit 1. Thus, the camera main unit 1 can decide the trimming-forbidden region 841 of an optional shape that includes the entire display device 800. An arrangement may be made in which correspondence relations between a plurality of types of the markers, and the shape and size of the trimming-forbidden region 841, are stored in the camera main unit 1 in advance, such that not only the shape but also the size of the trimming-forbidden region 841 is decided in accordance with the type of the marker that is detected.

Note that while the display unit 803 of the display device 800 has been described as an example of placing the marker 840 in the present embodiment, this is not restrictive, and can be also applied to cases of placing printed markers on optional objects that do not have display units or the like, for example. Note that in this case, with respect to the trimming-forbidden region 841, the placement position and placement dimensions of the marker are stored in the built-in nonvolatile memory 102 of the camera main unit 1 or the built-in nonvolatile memory 812 of the display device 800 in advance. The camera main unit 1 can acquire that which is stored in the built-in nonvolatile memory 102 or 812 by communication, and derive the trimming-forbidden region 841 through calculation in combination with the position and attitude of the marker with respect to the camera main unit 1.

Figure 30:
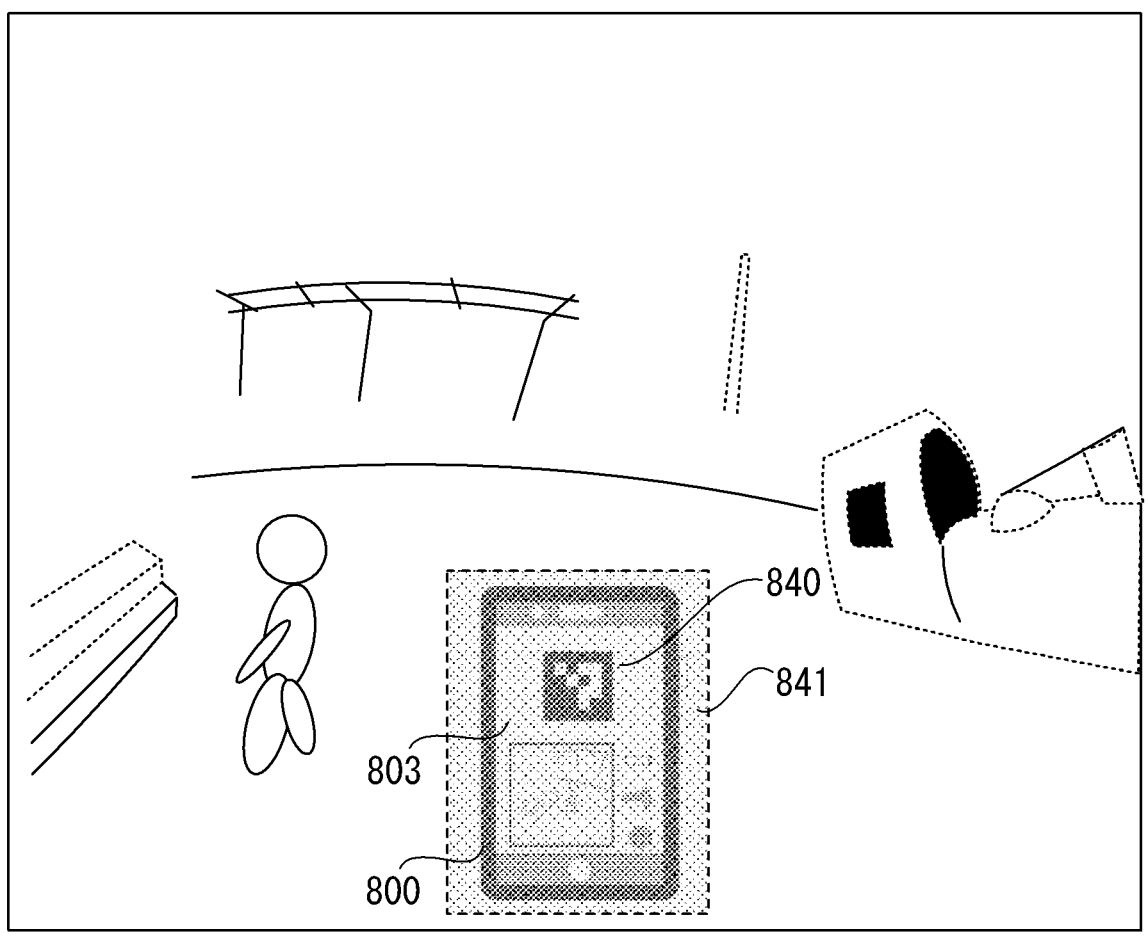
FIG. 30 is a diagram describing a trimming-forbidden region set so as to cover the display device.

Note that while using a black-and-white geometric pattern marker image (augmented reality (AR) marker) such as illustrated in FIG. 30 is described in the present embodiment as an example of the marker 840, this is not restrictive. For example, any shape that has non-rotational symmetry, and of which the position and attitude of the marker with respect to the camera can be easily derived by calculation from an image shot thereof, can be used instead, as the marker 840.

Next, correction processing of the trimming range according to the present embodiment will be described in detail with reference to the flowchart in FIG. 31.

In step S3001, upon the power switch 11 being turned on and power being turned on to the camera main unit 1, the general control CPU 101 is activated and reads an activation program out from the built-in nonvolatile memory 102. Thereafter, the general control CPU 101 executes preparatory operation processing for performing settings of the camera main unit 1 before image-capturing. Details of the preparatory operation processing are the same as those described with reference to FIG. 7B in the first embodiment.

In step S3002, facial direction detection processing, in which the observation direction is inferred, is executed by the facial direction detecting unit 20 detecting the facial direction. Details of the facial direction detection processing are the same as those described with reference to FIG. 7C in the first embodiment. This processing is executed at a predetermined framerate.

In step S3003, the recording direction and angle-of-view deciding unit 30 executes recording direction and range deciding processing. Details of the recording direction and range deciding processing are the same as those described with reference to FIG. 7D in the first embodiment.

In step S3004, the shooting unit 40 performs image-capturing, and generates image-captured data.

In step S3005, processing is executed as a range-setting step, for deciding a trimming-forbidden region in the image-captured data generated in step S3004, in order to exclude objects that the user does not desire to record from within the angle of view of the trimming results. Trimming-forbidden-region deciding processing will be described later with reference to FIG. 32.

In step S3006, the general control CPU 101 determines whether or not the trimming-forbidden region decided in step S3005 is included in the recording range decided in step S3003, in the image-captured data. In a case in which the results of the determination are that the trimming-forbidden region is included in the recording range, the flow advances to step S3007. Conversely, in a case in which the trimming-forbidden region is not included in the recording range, the flow advances to step S3008.

In step S3007, the general control CPU 101 corrects the recording direction and range decided in step S3003 such that the trimming-forbidden region is not included in the recording range. That is to say, a case will be assumed in which, partway through movement of the direction in which the user is looking, in a horizontal or vertical direction, or in an oblique direction, the general control CPU 101 determines that a trimming-forbidden region is included in the recording range. In this case, the general control CPU 101 moves the position of the recording range to a position at which the recording range does not include part or the entire region of the trimming-forbidden region, and also the distance between the center position of the recording range before correction and the center position of the recording range after correction is the shortest.

Note that there are cases in which part or the entirety of the recording range following correction is situated outside of the effective projection portion. In this case, the general control CPU 101 corrects the position of the recording range to the inner side, following a line connecting the center position of the recording range before correction and an optical center of the image-captured data, up to a position at which the recording range does not include part or the entire region of the trimming-forbidden region.

Note that besides the method of correcting the position of the recording range such as described above, a method of correcting by changing the scale of the recording range, or a method of combining correction by moving the position and correction by scale (changing the size), may be used for the correction method of the recording range. For example, when correcting the recording range so as not to include the entire trimming-forbidden region, in a case in which the movement distance of the recording range from the recording range before correction is not a predetermined direction or more, moving of the recording range is performed, and changing of the size of the recording range is not performed. In a case in which the movement distance of the recording range from the recording range before correction needs to be the predetermined direction or more in order for the recording range to not include the entire trimming-forbidden region, not only is the recording range moved, but also the size of the recording range is also reduced. Such a correction method may be applied so that the movement distance is not great. The movement distance of the recording range, due to correction from the recording range before correction, corresponding to the observation direction decided on the basis of the facial direction detected in steps S3002 and S3003, can be prevented from becoming great.

In this way, after the recording direction and range are decided such that the trimming-forbidden region is not included in the recording range, the flow advances to step S3008, and developing processing of the recording range is performed.

Note that whether or not the user is gripping the display device 800 for confirmation can be determined using attitude estimation values of the display device 800 that can be derived by calculation from output values of the acceleration sensor 808. In a case in which determination is made that the user is not gripping the display device 800, the flow may directly advance to step S3008, skipping the trimming-forbidden-region deciding processing of step S3005, the determining processing of step S3006, and the correction processing of step S3007. Thus, unnecessary computation amount can be markedly reduced, and computation time and electric power consumption can be reduced.

Note that the recording range developing processing of step S3008 through secondary recording of step S3013 is the same as steps S500 through S1000 in FIG. 7A described in the first embodiment, and accordingly description thereof will be omitted. Also, image-captured data generated in step S3004 is an example of a first moving image, and image-captured data clipped in step S3008 is an example of a second moving image clipped from the first moving image.

Next, the trimming-forbidden-region deciding processing executed by the general control CPU 101 in step S3005 will be described with reference to the flowchart in FIG. 32.

First, in step S3101, raw data is acquired for the entire region of the image-captured data (ultrawide angle picture) generated by the shooting unit 40 in step S3004, input to a picture intake portion of the general control CPU 101, called a head portion, which is omitted from illustration, and thereafter developing processing of the ultrawide angle picture is performed.

In step S3102, edge enhancement processing is performed on the image developed in step S3101 in accordance with image size.

In step S3103, binarization processing is performed on the output image from step S3102, thereby generating a black-and-white binary image.

In step S3104, the binary image generated in step S3103 is subjected to compression and other processing, thereby performing conversion into a format that is suitable for subsequent marker detection.

Note that the order of image processing executed in steps S3102 to S3104, and whether or not such processing is performed, can be implemented in accordance with the camera system, and is not restrictive regarding the present invention.

In step S3105, the general control CPU 101 performs detection of markers in the binary image that is generated.

In step S3106, the general control CPU 101 determines whether or not the number of markers that are detected in step S3105 is one or more. In a case in which the results of the determination are that number of markers that are detected is one or more, the flow advances to step S3107. Conversely, in a case in which not even one marker is detected, the trimming-forbidden-region deciding processing ends.

In step S3107, the position and attitude of the marker detected in step S3105 with respect to the camera main unit 1 is derived by calculation.

In step S3108, the trimming-forbidden region is decided on the basis of the position and attitude of the marker with respect to the camera main unit 1, derived in step S3107. That is to say, the general control CPU 101 acquires the display position and the display dimensions of the marker 840 on the display unit 803 of the display device 800, from those stored in the built-in nonvolatile memory 102 of the camera main unit 1 or the built-in nonvolatile memory 812 of the display device 800 in advance. The general control CPU 101 then performs calculation in combination with the position and attitude of the marker 840 with respect to the camera main unit 1. Accordingly, the general control CPU 101 can decide the trimming-forbidden region 841 of an optional shape that includes the entire display device 800.

Note that in a case of detecting a plurality of types of markers in step S3105, a plurality of types of trimming-forbidden regions can be set at the same time by calculation, using information of the display position and display dimensions of a plurality of markers stored in advance, in accordance with each of the markers detected. Thus, even in a case in which a plurality of types of display devices are image-captured, a trimming-forbidden region corresponding to each one can be set.

According to the present invention, even in a case in which an object that the camera operator originally does not desire to be recorded in the experience enters the angle of view while performing image-capturing of a moving image, the trimming frame can be set such that the object that is undesirable to be recorded is not included in the angle of view in the trimming results.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-053952, filed on Mar. 29, 2023, which is hereby incorporated by reference herein in its entirety.

What is claimed is:

1. An image-capturing apparatus comprising at least one memory and at least one processor which function as:
   an image-capturing unit;
   an observation direction detecting unit configured to detect an observation direction of a user with respect to the image-capturing apparatus;
   a setting unit configured to set a clipping range that is a partial region corresponding to the observation direction of a first moving image image-captured by the image-capturing unit, on a basis of the observation direction that is detected by the observation direction detecting unit;
   a generating unit configured to generate a second moving image, in which the clipping range set by the setting unit is clipped from the first moving image; and
   a marker detecting unit configured to detect a marker, set in advance, from the first moving image, wherein
   the setting unit sets the clipping range such that a certain region, including the marker detected from the first moving image by the marker detecting unit, is not included therein.

2. The image-capturing apparatus according to claim 1, wherein, in a case where the marker detecting unit detects a plurality of types of the marker, the setting unit sets the clipping range such that clipping-forbidden regions of a plurality of shapes that are set in advance in accordance with each of the markers that are detected, are not included therein.

3. The image-capturing apparatus according to claim 1, wherein, in a case where determination can be made that the marker cannot be image-captured by the image-capturing unit, the setting unit does not implement processing of setting the clipping range such that a certain region, including the marker detected from the first moving image by the marker detecting unit, is not included therein.

4. The image-capturing apparatus according to claim 1, wherein, in a case where a position of the clipping range is situated outside of an effective projection portion, the setting unit sets the certain region to be on an inner side of the effective projection portion, following a line connecting the observation direction and an optical center of the image-capturing apparatus.

5. The image-capturing apparatus according to claim 1, wherein, in a case where a position of the clipping range is situated outside of an effective projection portion, the setting unit sets the certain region to be on an inner side of the effective projection portion, by narrowing the clipping range.

6. The image-capturing apparatus according to claim 1, wherein, in a case where the certain region is included in the clipping range decided on a basis of the observation direction, the setting unit corrects the clipping range such that the certain region is not included therein, and
   the generating unit generates the second moving image, in which a portion, included in the clipping range following correction, is clipped from the first moving image.

7. The image-capturing apparatus according to claim 6, wherein the setting unit corrects the clipping range by moving a position of or changing a size of the clipping range decided on a basis of the observation direction.

8. The image-capturing apparatus according to claim 7, wherein the setting unit
   corrects the clipping range by moving the position of the clipping range decided on a basis of the observation direction without changing the size of the clipping range, in a case where there is no need to move the clipping range by at least a predetermined distance in order to correct the clipping range such that the certain region is not included therein, and
   corrects the clipping range by moving the position of the clipping range decided on a basis of the observation direction and also reducing the size of the clipping range, in a case where there is a need to move the clipping range by at least the predetermined distance in order to correct the clipping range such that the certain region is not included therein.

9. The image-capturing apparatus according to claim 1, wherein the setting unit decides a shape of or a size of the certain region in accordance with a type of the marker detected by the marker detecting unit, and sets the clipping range such that the certain region that is decided is not included therein.

10. A control method of an image-capturing apparatus, the control method comprising:

performing image-capturing;

detecting an observation direction of a user with respect to the image-capturing apparatus;

setting a clipping range that is a partial region corresponding to the observation direction of a first moving image image-captured in the image-capturing, on a basis of the observation direction that is detected in the detecting;

detecting a marker, set in advance, from the first moving image;

setting the clipping range such that a certain region, including the marker detected from the first moving image in the detecting of the marker, is not included therein; and generating a second moving image, in which the clipping range set in the setting of the range is clipped from the first moving image.

11. A non-transitory computer-readable medium that stores a program for causing a computer to execute a control method of an image-capturing apparatus, the control method comprising:

executing image-capturing;

detecting an observation direction of a user with respect to the image-capturing apparatus;

setting a clipping range that is a partial region corresponding to the observation direction of a first moving image that is image-captured in the image capturing, on a basis of the observation direction that is detected in the detecting of the observation direction;

detecting a marker, set in advance, from the first moving image;

setting the clipping range such that a certain region, including the marker that is detected from the first moving image in the detecting of the marker, is not included therein; and generating a second moving image, in which the clipping range that is set in the setting is clipped from the first moving image.

* * * * *